US006587459B1

(12) United States Patent
Suda et al.

(10) Patent No.: US 6,587,459 B1
(45) Date of Patent: Jul. 1, 2003

(54) TIME SLOT ASSIGNMENT CIRCUIT

(75) Inventors: Yukio Suda, Yokohama (JP); Satoshi Nemoto, Yokohama (JP); Masahiro Shioda, Kawasaki (JP); Takashi Kuwabara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/272,503

(22) Filed: Mar. 19, 1999

(30) Foreign Application Priority Data

Mar. 20, 1998 (JP) .......................................... 10-092713

(51) Int. Cl.[7] ............................................... H04L 12/50
(52) U.S. Cl. ...................... 370/369; 370/352; 370/376; 370/380
(58) Field of Search ............................... 370/258, 278, 370/294, 257, 358, 436, 458, 460, 427, 424, 466, 468, 498, 535, 538, 540, 357, 369, 375, 376, 380, 220, 223; 375/288, 293

(56) References Cited

U.S. PATENT DOCUMENTS

| | | | | |
|---|---|---|---|---|
| 3,715,505 A | * | 2/1973 | Gordon et al. ............... | 370/379 |
| 4,999,832 A | * | 3/1991 | Chen et al. .................. | 370/369 |
| 5,406,224 A | * | 4/1995 | Kremer ....................... | 370/224 |
| 5,537,393 A | * | 7/1996 | Shioda et al. ................ | 359/119 |
| 5,546,403 A | * | 8/1996 | Yamamoto et al. .......... | 714/716 |
| 5,627,826 A | * | 5/1997 | Kameda et al. .............. | 370/371 |
| 5,640,387 A | * | 6/1997 | Takahashi et al. ........... | 370/359 |
| 5,754,545 A | * | 5/1998 | Shinbashi et al. ........... | 370/360 |
| 5,909,175 A | * | 6/1999 | Yamasaki et al. ............ | 340/506 |
| 5,909,298 A | * | 6/1999 | Shimada et al. ............. | 359/163 |
| 6,049,525 A | * | 4/2000 | Takahashi et al. ........... | 370/223 |
| 6,330,237 B1 | * | 12/2001 | Suda et al. ................... | 370/369 |

FOREIGN PATENT DOCUMENTS

| | | |
|---|---|---|
| JP | 3-201734 | 9/1991 |
| JP | 5-103356 | 4/1993 |
| JP | 8-111895 | 4/1996 |

\* cited by examiner

*Primary Examiner*—Hassan Kizou
*Assistant Examiner*—David Odland
(74) *Attorney, Agent, or Firm*—Katten Muchin Zavis Rosenman

(57) ABSTRACT

A TSA circuit which receives as input upper side incoming transmission data from a super high speed ring network and lower side incoming transmission data from a high speed ring network and outputs upper side outgoing transmission data to the super high speed ring network and lower side outgoing transmission data to the high speed ring network, provided with a time slot assignment function block which has a time switch and a space switch and produces outgoing transmission data obtained by switching channels for the incoming transmission data in units of bits, whereby high speed and large volume incoming transmission data can be processed for time slot assignment (TSA), interchanged in channels, and sent out as outgoing transmission data by a relatively small sized circuit configuration.

14 Claims, 81 Drawing Sheets

Fig.6

| | | | | | | | | | |
|---|---|---|---|---|---|---|---|---|---|
| From UPPER 10G { | #1 STS-48 (2.4G) | CH 1 | CH 7 | CH 13 | CH 19 | CH 25 | CH 31 | CH 37 | CH 43 | CH 2 | CH 8 |
| | | CH 4 | CH 10 | CH 16 | CH 22 | CH 28 | CH 34 | CH 40 | CH 46 | CH 5 | CH 11 |
| | #2 STS-48 (2.4G) | CH 49 | CH 55 | CH 61 | CH 67 | CH 73 | CH 79 | CH 85 | CH 91 | CH 50 | CH 56 |
| | | CH 52 | CH 58 | CH 64 | CH 70 | CH 76 | CH 82 | CH 88 | CH 94 | CH 53 | CH 59 |
| | #3 STS-48 (2.4G) | CH 97 | CH 103 | CH 109 | CH 115 | CH 121 | CH 127 | CH 133 | CH 139 | CH 98 | CH 104 |
| | | CH 100 | CH 106 | CH 112 | CH 118 | CH 124 | CH 130 | CH 136 | CH 142 | CH 101 | CH 107 |
| | #4 STS-48 (2.4G) | CH 145 | CH 151 | CH 157 | CH 163 | CH 169 | CH 175 | CH 181 | CH 187 | CH 146 | CH 152 |
| | | CH 148 | CH 154 | CH 160 | CH 166 | CH 172 | CH 178 | CH 184 | CH 190 | CH 149 | CH 155 |
| From UPPER 10G { | #5 STS-48 (2.4G) | CH 193 | CH 199 | CH 205 | CH 211 | CH 217 | CH 223 | CH 229 | CH 235 | CH 194 | CH 200 |
| | | CH 196 | CH 202 | CH 208 | CH 214 | CH 220 | CH 226 | CH 232 | CH 238 | CH 197 | CH 203 |
| | #6 STS-48 (2.4G) | CH 241 | CH 247 | CH 253 | CH 259 | CH 265 | CH 271 | CH 277 | CH 283 | CH 242 | CH 248 |
| | | CH 244 | CH 250 | CH 256 | CH 262 | CH 268 | CH 274 | CH 280 | CH 286 | CH 245 | CH 251 |
| | #7 STS-48 (2.4G) | CH 289 | CH 295 | CH 301 | CH 307 | CH 313 | CH 319 | CH 325 | CH 331 | CH 290 | CH 296 |
| | | CH 292 | CH 298 | CH 304 | CH 310 | CH 316 | CH 322 | CH 328 | CH 334 | CH 293 | CH 299 |
| | #8 STS-48 (2.4G) | CH 337 | CH 343 | CH 349 | CH 355 | CH 361 | CH 367 | CH 373 | CH 379 | CH 338 | CH 344 |
| | | CH 340 | CH 346 | CH 352 | CH 358 | CH 364 | CH 370 | CH 376 | CH 382 | CH 341 | CH 347 |

Fig. 7

| CH 14 | CH 17 | CH 20 | CH 23 | CH 26 | CH 29 | CH 32 | CH 35 | CH 38 | CH 41 | CH 44 | CH 47 | CH 3 | CH 6 | CH 9 | CH 12 | CH 15 | CH 18 | CH 21 | CH 24 | CH 27 | CH 30 | CH 33 | CH 36 | CH 39 | CH 42 | CH 45 | CH 48 |
|---|---|---|---|---|---|---|---|---|---|---|---|---|---|---|---|---|---|---|---|---|---|---|---|---|---|---|---|
| CH 62 | CH 65 | CH 68 | CH 71 | CH 74 | CH 77 | CH 80 | CH 83 | CH 86 | CH 89 | CH 92 | CH 95 | CH 51 | CH 54 | CH 57 | CH 60 | CH 63 | CH 66 | CH 69 | CH 72 | CH 75 | CH 78 | CH 81 | CH 84 | CH 87 | CH 90 | CH 93 | CH 96 |
| CH 110 | CH 113 | CH 116 | CH 119 | CH 122 | CH 125 | CH 128 | CH 131 | CH 134 | CH 137 | CH 140 | CH 143 | CH 99 | CH 102 | CH 105 | CH 108 | CH 111 | CH 114 | CH 117 | CH 120 | CH 123 | CH 126 | CH 129 | CH 132 | CH 135 | CH 138 | CH 141 | CH 144 |
| CH 158 | CH 161 | CH 164 | CH 167 | CH 170 | CH 173 | CH 176 | CH 179 | CH 182 | CH 185 | CH 188 | CH 191 | CH 147 | CH 150 | CH 153 | CH 156 | CH 159 | CH 162 | CH 165 | CH 168 | CH 171 | CH 174 | CH 177 | CH 180 | CH 183 | CH 186 | CH 189 | CH 192 |
| CH 206 | CH 209 | CH 212 | CH 215 | CH 218 | CH 221 | CH 224 | CH 227 | CH 230 | CH 233 | CH 236 | CH 239 | CH 195 | CH 198 | CH 201 | CH 204 | CH 207 | CH 210 | CH 213 | CH 216 | CH 219 | CH 222 | CH 225 | CH 228 | CH 231 | CH 234 | CH 237 | CH 240 |
| CH 254 | CH 257 | CH 260 | CH 263 | CH 266 | CH 269 | CH 272 | CH 275 | CH 278 | CH 281 | CH 284 | CH 287 | CH 243 | CH 246 | CH 249 | CH 252 | CH 255 | CH 258 | CH 261 | CH 264 | CH 267 | CH 270 | CH 273 | CH 276 | CH 279 | CH 282 | CH 285 | CH 288 |
| CH 302 | CH 305 | CH 308 | CH 311 | CH 314 | CH 317 | CH 320 | CH 323 | CH 326 | CH 329 | CH 332 | CH 335 | CH 291 | CH 294 | CH 297 | CH 300 | CH 303 | CH 306 | CH 309 | CH 312 | CH 315 | CH 318 | CH 321 | CH 324 | CH 327 | CH 330 | CH 333 | CH 336 |
| CH 350 | CH 353 | CH 356 | CH 359 | CH 362 | CH 365 | CH 368 | CH 371 | CH 374 | CH 377 | CH 380 | CH 383 | CH 339 | CH 342 | CH 345 | CH 348 | CH 351 | CH 354 | CH 357 | CH 360 | CH 363 | CH 366 | CH 369 | CH 372 | CH 375 | CH 378 | CH 381 | CH 384 |

Fig. 8

| | | | | | | | |
|---|---|---|---|---|---|---|---|
| #9 STS-48 (2.4G) | CH 385 | CH 391 | CH 397 | CH 403 | CH 409 | CH 415 | CH 421 | CH 427 |
| | CH 388 | CH 394 | CH 400 | CH 406 | CH 412 | CH 418 | CH 424 | CH 430 |
| #10 STS-48 (2.4G) | CH 433 | CH 439 | CH 445 | CH 451 | CH 457 | CH 463 | CH 469 | CH 475 |
| | CH 436 | CH 442 | CH 448 | CH 454 | CH 460 | CH 466 | CH 472 | CH 478 |
| #11 STS-48 (2.4G) | CH 481 | CH 487 | CH 493 | CH 499 | CH 505 | CH 511 | CH 517 | CH 523 |
| | CH 484 | CH 490 | CH 496 | CH 502 | CH 508 | CH 514 | CH 520 | CH 526 |
| #12 STS-48 (2.4G) | CH 529 | CH 535 | CH 541 | CH 547 | CH 553 | CH 559 | CH 565 | CH 571 |
| | CH 532 | CH 538 | CH 544 | CH 550 | CH 556 | CH 562 | CH 568 | CH 574 |
| #13 STS-48 (2.4G) | CH 577 | CH 583 | CH 589 | CH 595 | CH 601 | CH 607 | CH 613 | CH 619 |
| | CH 580 | CH 586 | CH 592 | CH 598 | CH 604 | CH 610 | CH 616 | CH 622 |
| #14 STS-48 (2.4G) | CH 625 | CH 631 | CH 637 | CH 643 | CH 649 | CH 655 | CH 661 | CH 667 |
| | CH 628 | CH 634 | CH 640 | CH 646 | CH 652 | CH 658 | CH 664 | CH 670 |
| #15 STS-48 (2.4G) | CH 673 | CH 679 | CH 685 | CH 691 | CH 697 | CH 703 | CH 709 | CH 715 |
| | CH 676 | CH 682 | CH 688 | CH 694 | CH 700 | CH 706 | CH 712 | CH 718 |
| #16 STS-48 (2.4G) | CH 721 | CH 727 | CH 733 | CH 739 | CH 745 | CH 751 | CH 757 | CH 763 |
| | CH 724 | CH 730 | CH 736 | CH 742 | CH 748 | CH 754 | CH 760 | CH 766 |

(rightmost column: CH 386/392, CH 389/395, CH 434/440, CH 437/443, CH 482/488, CH 485/491, CH 530/536, CH 533/539, CH 578/584, CH 581/587, CH 626/632, CH 629/635, CH 674/680, CH 677/683, CH 722/728, CH 725/731)

From LOWER 10G (covers #9–#12)
From LOWER 10G (covers #13–#16)

Fig. 9

| CH 398 | CH 404 | CH 410 | CH 416 | CH 422 | CH 428 | CH 387 | CH 393 | CH 399 | CH 405 | CH 411 | CH 417 | CH 423 | CH 429 |
| CH 401 | CH 407 | CH 413 | CH 419 | CH 425 | CH 431 | CH 390 | CH 396 | CH 402 | CH 408 | CH 414 | CH 420 | CH 426 | CH 432 |
| CH 446 | CH 452 | CH 458 | CH 464 | CH 470 | CH 476 | CH 435 | CH 441 | CH 447 | CH 453 | CH 459 | CH 465 | CH 471 | CH 477 |
| CH 449 | CH 455 | CH 461 | CH 467 | CH 473 | CH 479 | CH 438 | CH 444 | CH 450 | CH 456 | CH 462 | CH 468 | CH 474 | CH 480 |
| CH 494 | CH 500 | CH 506 | CH 512 | CH 518 | CH 524 | CH 483 | CH 489 | CH 495 | CH 501 | CH 507 | CH 513 | CH 519 | CH 525 |
| CH 497 | CH 503 | CH 509 | CH 515 | CH 521 | CH 527 | CH 486 | CH 492 | CH 498 | CH 504 | CH 510 | CH 516 | CH 522 | CH 528 |
| CH 542 | CH 548 | CH 554 | CH 560 | CH 566 | CH 572 | CH 531 | CH 537 | CH 543 | CH 549 | CH 555 | CH 561 | CH 567 | CH 573 |
| CH 545 | CH 551 | CH 557 | CH 563 | CH 569 | CH 575 | CH 534 | CH 540 | CH 546 | CH 552 | CH 558 | CH 564 | CH 570 | CH 576 |
| CH 590 | CH 596 | CH 602 | CH 608 | CH 614 | CH 620 | CH 579 | CH 585 | CH 591 | CH 597 | CH 603 | CH 609 | CH 615 | CH 621 |
| CH 593 | CH 599 | CH 605 | CH 611 | CH 617 | CH 623 | CH 582 | CH 588 | CH 594 | CH 600 | CH 606 | CH 612 | CH 618 | CH 624 |
| CH 638 | CH 644 | CH 650 | CH 656 | CH 662 | CH 668 | CH 627 | CH 633 | CH 639 | CH 645 | CH 651 | CH 657 | CH 663 | CH 669 |
| CH 641 | CH 647 | CH 653 | CH 659 | CH 665 | CH 671 | CH 630 | CH 636 | CH 642 | CH 648 | CH 654 | CH 660 | CH 666 | CH 672 |
| CH 686 | CH 692 | CH 698 | CH 704 | CH 710 | CH 716 | CH 675 | CH 681 | CH 687 | CH 693 | CH 699 | CH 705 | CH 711 | CH 717 |
| CH 689 | CH 695 | CH 701 | CH 707 | CH 713 | CH 719 | CH 678 | CH 684 | CH 690 | CH 696 | CH 702 | CH 708 | CH 714 | CH 720 |
| CH 734 | CH 740 | CH 746 | CH 752 | CH 758 | CH 764 | CH 723 | CH 729 | CH 735 | CH 741 | CH 747 | CH 753 | CH 759 | CH 765 |
| CH 737 | CH 743 | CH 749 | CH 755 | CH 761 | CH 767 | CH 726 | CH 732 | CH 738 | CH 744 | CH 750 | CH 756 | CH 762 | CH 768 |

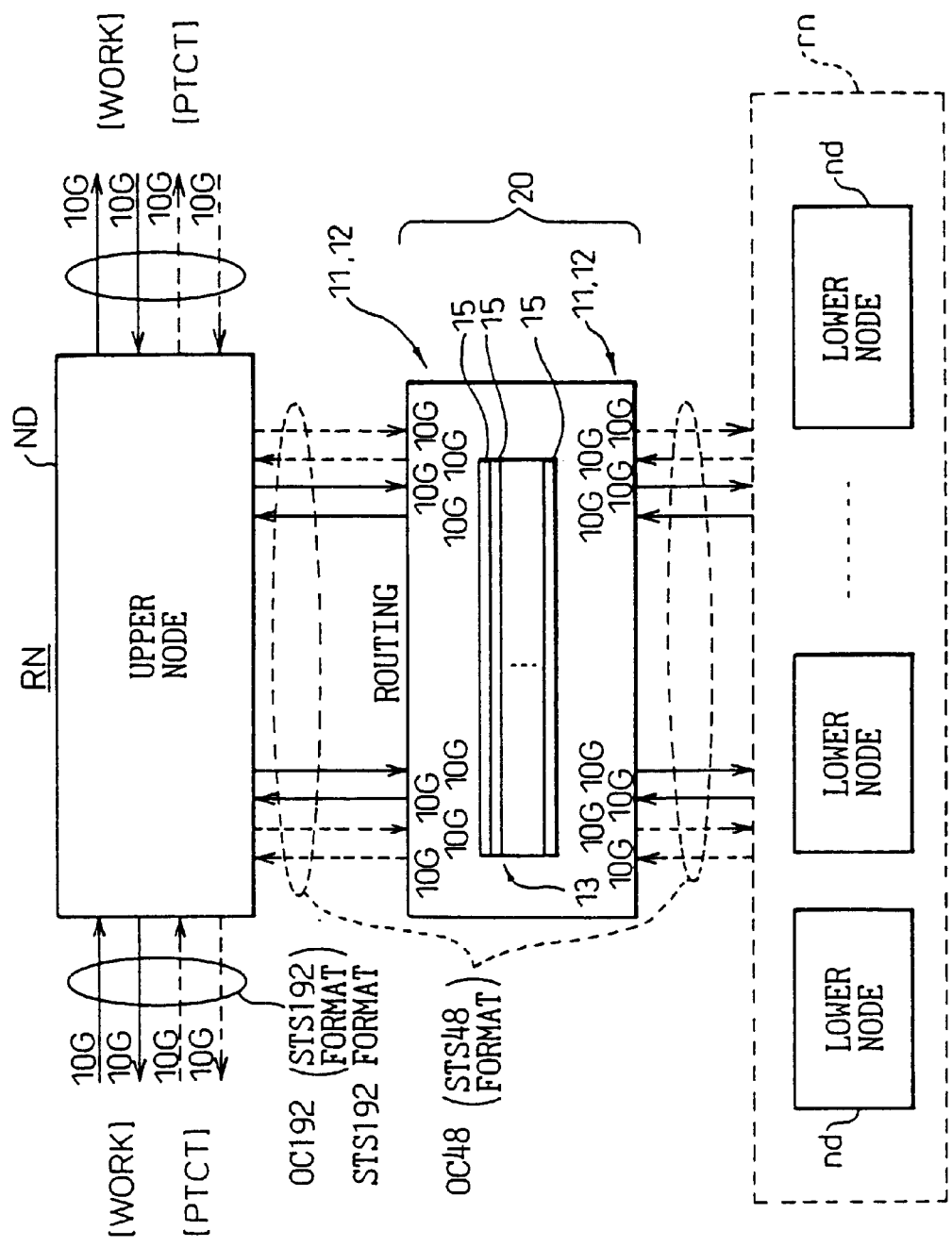

Fig.14

| | | | | | | | | | | |
|---|---|---|---|---|---|---|---|---|---|---|
| #1 | STS-48 (2.4G) | CH 1 | CH 7 | CH 13 | CH 19 | CH 25 | CH 31 | CH 37 | CH 43 | CH 2 | CH 8 |
| | | CH 4 | CH 10 | CH 16 | CH 22 | CH 28 | CH 34 | CH 40 | CH 46 | CH 5 | CH 11 |
| #2 | STS-48 (2.4G) | CH 49 | CH 55 | CH 61 | CH 67 | CH 73 | CH 79 | CH 85 | CH 91 | CH 50 | CH 56 |
| | | CH 52 | CH 58 | CH 64 | CH 70 | CH 76 | CH 82 | CH 88 | CH 94 | CH 53 | CH 59 |
| #3 | STS-48 (2.4G) | CH 97 | CH 103 | CH 109 | CH 115 | CH 121 | CH 127 | CH 133 | CH 139 | CH 98 | CH 104 |
| | | CH 100 | CH 106 | CH 112 | CH 118 | CH 124 | CH 130 | CH 136 | CH 142 | CH 101 | CH 107 |
| #4 | STS-48 (2.4G) | CH 145 | CH 151 | CH 157 | CH 163 | CH 169 | CH 175 | CH 181 | CH 187 | CH 146 | CH 152 |
| | | CH 148 | CH 154 | CH 160 | CH 166 | CH 172 | CH 178 | CH 184 | CH 190 | CH 149 | CH 155 |
| #5 | STS-48 (2.4G) | CH 193 | CH 199 | CH 205 | CH 211 | CH 217 | CH 223 | CH 229 | CH 235 | CH 194 | CH 200 |
| | | CH 196 | CH 202 | CH 208 | CH 214 | CH 220 | CH 226 | CH 232 | CH 238 | CH 197 | CH 203 |
| #6 | STS-48 (2.4G) | CH 241 | CH 247 | CH 253 | CH 259 | CH 265 | CH 271 | CH 277 | CH 283 | CH 242 | CH 248 |
| | | CH 244 | CH 250 | CH 256 | CH 262 | CH 268 | CH 274 | CH 280 | CH 286 | CH 245 | CH 251 |
| #7 | STS-48 (2.4G) | CH 289 | CH 295 | CH 301 | CH 307 | CH 313 | CH 319 | CH 325 | CH 331 | CH 290 | CH 296 |
| | | CH 292 | CH 298 | CH 304 | CH 310 | CH 316 | CH 322 | CH 328 | CH 334 | CH 293 | CH 299 |
| #8 | STS-48 (2.4G) | CH 337 | CH 343 | CH 349 | CH 355 | CH 361 | CH 367 | CH 373 | CH 379 | CH 338 | CH 344 |
| | | CH 340 | CH 346 | CH 352 | CH 358 | CH 364 | CH 370 | CH 376 | CH 382 | CH 341 | CH 347 |

From UPPER 10G: #1–#4

From UPPER 10G: #5–#8

Fig.15

| CH 14 | CH 20 | CH 26 | CH 32 | CH 38 | CH 44 | CH 3 | CH 9 | CH 15 | CH 21 | CH 27 | CH 33 | CH 39 | CH 45 |
|---|---|---|---|---|---|---|---|---|---|---|---|---|---|
| CH 17 | CH 23 | CH 29 | CH 35 | CH 41 | CH 47 | CH 6 | CH 12 | CH 18 | CH 24 | CH 30 | CH 36 | CH 42 | CH 48 |
| CH 62 | CH 68 | CH 74 | CH 80 | CH 86 | CH 92 | CH 51 | CH 57 | CH 63 | CH 69 | CH 75 | CH 81 | CH 87 | CH 93 |
| CH 65 | CH 71 | CH 77 | CH 83 | CH 89 | CH 95 | CH 54 | CH 60 | CH 66 | CH 72 | CH 78 | CH 84 | CH 90 | CH 96 |
| CH 110 | CH 116 | CH 122 | CH 128 | CH 134 | CH 140 | CH 99 | CH 105 | CH 111 | CH 117 | CH 123 | CH 129 | CH 135 | CH 141 |
| CH 113 | CH 119 | CH 125 | CH 131 | CH 137 | CH 143 | CH 102 | CH 108 | CH 114 | CH 120 | CH 126 | CH 132 | CH 138 | CH 144 |
| CH 158 | CH 164 | CH 170 | CH 176 | CH 182 | CH 188 | CH 147 | CH 153 | CH 159 | CH 165 | CH 171 | CH 177 | CH 183 | CH 189 |
| CH 161 | CH 167 | CH 173 | CH 179 | CH 185 | CH 191 | CH 150 | CH 156 | CH 162 | CH 168 | CH 174 | CH 180 | CH 186 | CH 192 |
| CH 206 | CH 212 | CH 218 | CH 224 | CH 230 | CH 236 | CH 195 | CH 201 | CH 207 | CH 213 | CH 219 | CH 225 | CH 231 | CH 237 |
| CH 209 | CH 215 | CH 221 | CH 227 | CH 233 | CH 239 | CH 198 | CH 204 | CH 210 | CH 216 | CH 222 | CH 228 | CH 234 | CH 240 |
| CH 254 | CH 260 | CH 266 | CH 272 | CH 278 | CH 284 | CH 243 | CH 249 | CH 255 | CH 261 | CH 267 | CH 273 | CH 279 | CH 285 |
| CH 257 | CH 263 | CH 269 | CH 275 | CH 281 | CH 287 | CH 246 | CH 252 | CH 258 | CH 264 | CH 270 | CH 276 | CH 282 | CH 288 |
| CH 302 | CH 308 | CH 314 | CH 320 | CH 326 | CH 332 | CH 291 | CH 297 | CH 303 | CH 309 | CH 315 | CH 321 | CH 327 | CH 333 |
| CH 305 | CH 311 | CH 317 | CH 323 | CH 329 | CH 335 | CH 294 | CH 300 | CH 306 | CH 312 | CH 318 | CH 324 | CH 330 | CH 336 |
| CH 350 | CH 356 | CH 362 | CH 368 | CH 374 | CH 380 | CH 339 | CH 345 | CH 351 | CH 357 | CH 363 | CH 369 | CH 375 | CH 381 |
| CH 353 | CH 359 | CH 365 | CH 371 | CH 377 | CH 383 | CH 342 | CH 348 | CH 354 | CH 360 | CH 366 | CH 372 | CH 378 | CH 384 |

Fig. 16

| | | | | | | | | |
|---|---|---|---|---|---|---|---|---|
| #9 STS-48 (2.4G) | CH 385 | CH 391 | CH 397 | CH 403 | CH 409 | CH 415 | CH 421 | CH 427 | CH 386 |
| | CH 388 | CH 394 | CH 400 | CH 406 | CH 412 | CH 418 | CH 424 | CH 430 | CH 395 |
| #10 STS-48 (2.4G) | CH 433 | CH 439 | CH 445 | CH 451 | CH 457 | CH 463 | CH 469 | CH 475 | CH 440 |
| | CH 436 | CH 442 | CH 448 | CH 454 | CH 460 | CH 466 | CH 472 | CH 478 | CH 443 |
| #11 STS-48 (2.4G) | CH 481 | CH 487 | CH 493 | CH 499 | CH 505 | CH 511 | CH 517 | CH 523 | CH 488 |
| | CH 484 | CH 490 | CH 496 | CH 502 | CH 508 | CH 514 | CH 520 | CH 526 | CH 491 |
| #12 STS-48 (2.4G) | CH 529 | CH 535 | CH 541 | CH 547 | CH 553 | CH 559 | CH 565 | CH 571 | CH 536 |
| | CH 532 | CH 538 | CH 544 | CH 550 | CH 556 | CH 562 | CH 568 | CH 574 | CH 539 |
| #13 STS-48 (2.4G) | CH 577 | CH 583 | CH 589 | CH 595 | CH 601 | CH 607 | CH 613 | CH 619 | CH 584 |
| | CH 580 | CH 586 | CH 592 | CH 598 | CH 604 | CH 610 | CH 616 | CH 622 | CH 587 |
| #14 STS-48 (2.4G) | CH 625 | CH 631 | CH 637 | CH 643 | CH 649 | CH 655 | CH 661 | CH 667 | CH 632 |
| | CH 628 | CH 634 | CH 640 | CH 646 | CH 652 | CH 658 | CH 664 | CH 670 | CH 635 |
| #15 STS-48 (2.4G) | CH 673 | CH 679 | CH 685 | CH 691 | CH 697 | CH 703 | CH 709 | CH 715 | CH 680 |
| | CH 676 | CH 682 | CH 688 | CH 694 | CH 700 | CH 706 | CH 712 | CH 718 | CH 683 |
| #16 STS-48 (2.4G) | CH 721 | CH 727 | CH 733 | CH 739 | CH 745 | CH 751 | CH 757 | CH 763 | CH 728 |
| | CH 724 | CH 730 | CH 736 | CH 742 | CH 748 | CH 754 | CH 760 | CH 766 | CH 731 |

From LOWER 10G (#9–#12)

From LOWER 10G (#13–#16)

Fig.17

| CH 398 | CH 404 | CH 410 | CH 416 | CH 422 | CH 428 | CH 387 | CH 393 | CH 399 | CH 405 | CH 411 | CH 417 | CH 423 | CH 429 |
| --- | --- | --- | --- | --- | --- | --- | --- | --- | --- | --- | --- | --- | --- |
| CH 401 | CH 407 | CH 413 | CH 419 | CH 425 | CH 431 | CH 390 | CH 396 | CH 402 | CH 408 | CH 414 | CH 420 | CH 426 | CH 432 |
| CH 446 | CH 452 | CH 458 | CH 464 | CH 470 | CH 476 | CH 435 | CH 441 | CH 447 | CH 453 | CH 459 | CH 465 | CH 471 | CH 477 |
| CH 449 | CH 455 | CH 461 | CH 467 | CH 473 | CH 479 | CH 438 | CH 444 | CH 450 | CH 456 | CH 462 | CH 468 | CH 474 | CH 480 |
| CH 494 | CH 500 | CH 506 | CH 512 | CH 518 | CH 524 | CH 483 | CH 489 | CH 495 | CH 501 | CH 507 | CH 513 | CH 519 | CH 525 |
| CH 497 | CH 503 | CH 509 | CH 515 | CH 521 | CH 527 | CH 486 | CH 492 | CH 498 | CH 504 | CH 510 | CH 516 | CH 522 | CH 528 |
| CH 542 | CH 548 | CH 554 | CH 560 | CH 566 | CH 572 | CH 531 | CH 537 | CH 543 | CH 549 | CH 555 | CH 561 | CH 567 | CH 573 |
| CH 545 | CH 551 | CH 557 | CH 563 | CH 569 | CH 575 | CH 534 | CH 540 | CH 546 | CH 552 | CH 558 | CH 564 | CH 570 | CH 576 |
| CH 590 | CH 596 | CH 602 | CH 608 | CH 614 | CH 620 | CH 579 | CH 585 | CH 591 | CH 597 | CH 603 | CH 609 | CH 615 | CH 621 |
| CH 593 | CH 599 | CH 605 | CH 611 | CH 617 | CH 623 | CH 582 | CH 588 | CH 594 | CH 600 | CH 606 | CH 612 | CH 618 | CH 624 |
| CH 638 | CH 644 | CH 650 | CH 656 | CH 662 | CH 668 | CH 627 | CH 633 | CH 639 | CH 645 | CH 651 | CH 657 | CH 663 | CH 669 |
| CH 641 | CH 647 | CH 653 | CH 659 | CH 665 | CH 671 | CH 630 | CH 636 | CH 642 | CH 648 | CH 654 | CH 660 | CH 666 | CH 672 |
| CH 686 | CH 692 | CH 698 | CH 704 | CH 710 | CH 716 | CH 675 | CH 681 | CH 687 | CH 693 | CH 699 | CH 705 | CH 711 | CH 717 |
| CH 689 | CH 695 | CH 701 | CH 707 | CH 713 | CH 719 | CH 678 | CH 684 | CH 690 | CH 696 | CH 702 | CH 708 | CH 714 | CH 720 |
| CH 734 | CH 740 | CH 746 | CH 752 | CH 758 | CH 764 | CH 723 | CH 729 | CH 735 | CH 741 | CH 747 | CH 753 | CH 759 | CH 765 |
| CH 737 | CH 743 | CH 749 | CH 755 | CH 761 | CH 767 | CH 726 | CH 732 | CH 738 | CH 744 | CH 750 | CH 756 | CH 762 | CH 768 |

Fig. 18

| | | | | | | | | |
|---|---|---|---|---|---|---|---|---|
| #17 STS-48 (2.4G) | CH 769 | CH 775 | CH 781 | CH 787 | CH 793 | CH 799 | CH 805 | CH 811 | CH 770 | CH 776 |
| | CH 772 | CH 778 | CH 784 | CH 790 | CH 796 | CH 802 | CH 808 | CH 814 | CH 773 | CH 779 |
| #18 STS-48 (2.4G) | CH 817 | CH 823 | CH 829 | CH 835 | CH 841 | CH 847 | CH 853 | CH 859 | CH 818 | CH 824 |
| | CH 820 | CH 826 | CH 832 | CH 838 | CH 844 | CH 850 | CH 856 | CH 862 | CH 821 | CH 827 |
| #19 STS-48 (2.4G) | CH 865 | CH 871 | CH 877 | CH 883 | CH 889 | CH 895 | CH 901 | CH 907 | CH 866 | CH 872 |
| | CH 868 | CH 874 | CH 880 | CH 886 | CH 892 | CH 898 | CH 904 | CH 910 | CH 869 | CH 875 |
| #20 STS-48 (2.4G) | CH 913 | CH 919 | CH 925 | CH 931 | CH 937 | CH 943 | CH 949 | CH 955 | CH 914 | CH 920 |
| | CH 916 | CH 922 | CH 928 | CH 934 | CH 940 | CH 946 | CH 952 | CH 958 | CH 917 | CH 923 |
| #21 STS-48 (2.4G) | CH 961 | CH 967 | CH 973 | CH 979 | CH 985 | CH 991 | CH 997 | CH 1003 | CH 962 | CH 968 |
| | CH 964 | CH 970 | CH 976 | CH 982 | CH 988 | CH 994 | CH 1000 | CH 1006 | CH 965 | CH 971 |
| #22 STS-48 (2.4G) | CH 1009 | CH 1015 | CH 1021 | CH 1027 | CH 1033 | CH 1039 | CH 1045 | CH 1051 | CH 1010 | CH 1016 |
| | CH 1012 | CH 1018 | CH 1024 | CH 1030 | CH 1036 | CH 1042 | CH 1048 | CH 1054 | CH 1013 | CH 1019 |
| #23 STS-48 (2.4G) | CH 1057 | CH 1063 | CH 1069 | CH 1075 | CH 1081 | CH 1087 | CH 1093 | CH 1099 | CH 1058 | CH 1064 |
| | CH 1060 | CH 1066 | CH 1072 | CH 1078 | CH 1084 | CH 1090 | CH 1096 | CH 1102 | CH 1061 | CH 1067 |
| #24 STS-48 (2.4G) | CH 1105 | CH 1111 | CH 1117 | CH 1123 | CH 1129 | CH 1135 | CH 1141 | CH 1147 | CH 1106 | CH 1112 |
| | CH 1108 | CH 1114 | CH 1120 | CH 1126 | CH 1132 | CH 1138 | CH 1144 | CH 1150 | CH 1109 | CH 1115 |

From UPPER 10G (#17–#20)

From UPPER 10G (#21–#24)

Fig.19

| CH 782 | CH 788 | CH 794 | CH 800 | CH 806 | CH 812 | CH 771 | CH 777 | CH 783 | CH 789 | CH 795 | CH 801 | CH 807 | CH 813 |
| CH 785 | CH 791 | CH 797 | CH 803 | CH 809 | CH 815 | CH 774 | CH 780 | CH 786 | CH 792 | CH 798 | CH 804 | CH 810 | CH 816 |
| CH 830 | CH 836 | CH 842 | CH 848 | CH 854 | CH 860 | CH 819 | CH 825 | CH 831 | CH 837 | CH 843 | CH 849 | CH 855 | CH 861 |
| CH 833 | CH 839 | CH 845 | CH 851 | CH 857 | CH 863 | CH 822 | CH 828 | CH 834 | CH 840 | CH 846 | CH 852 | CH 858 | CH 864 |
| CH 878 | CH 884 | CH 890 | CH 896 | CH 902 | CH 908 | CH 867 | CH 873 | CH 879 | CH 885 | CH 891 | CH 897 | CH 903 | CH 909 |
| CH 881 | CH 887 | CH 893 | CH 899 | CH 905 | CH 911 | CH 870 | CH 876 | CH 882 | CH 888 | CH 894 | CH 900 | CH 906 | CH 912 |
| CH 926 | CH 932 | CH 938 | CH 944 | CH 950 | CH 956 | CH 915 | CH 921 | CH 927 | CH 933 | CH 939 | CH 945 | CH 951 | CH 957 |
| CH 929 | CH 935 | CH 941 | CH 947 | CH 953 | CH 959 | CH 918 | CH 924 | CH 930 | CH 936 | CH 942 | CH 948 | CH 954 | CH 960 |
| CH 974 | CH 980 | CH 986 | CH 992 | CH 998 | CH 1004 | CH 963 | CH 969 | CH 975 | CH 981 | CH 987 | CH 993 | CH 999 | CH 1005 |
| CH 977 | CH 983 | CH 989 | CH 995 | CH 1001 | CH 1007 | CH 966 | CH 972 | CH 978 | CH 984 | CH 990 | CH 996 | CH 1002 | CH 1008 |
| CH 1022 | CH 1028 | CH 1034 | CH 1040 | CH 1046 | CH 1052 | CH 1011 | CH 1017 | CH 1023 | CH 1029 | CH 1035 | CH 1041 | CH 1047 | CH 1053 |
| CH 1025 | CH 1031 | CH 1037 | CH 1043 | CH 1049 | CH 1055 | CH 1014 | CH 1020 | CH 1026 | CH 1032 | CH 1038 | CH 1044 | CH 1050 | CH 1056 |
| CH 1070 | CH 1076 | CH 1082 | CH 1088 | CH 1094 | CH 1100 | CH 1059 | CH 1065 | CH 1071 | CH 1077 | CH 1083 | CH 1089 | CH 1095 | CH 1101 |
| CH 1073 | CH 1079 | CH 1085 | CH 1091 | CH 1097 | CH 1103 | CH 1062 | CH 1068 | CH 1074 | CH 1080 | CH 1086 | CH 1092 | CH 1098 | CH 1104 |
| CH 1118 | CH 1124 | CH 1130 | CH 1136 | CH 1142 | CH 1148 | CH 1107 | CH 1113 | CH 1119 | CH 1125 | CH 1131 | CH 1137 | CH 1143 | CH 1149 |
| CH 1121 | CH 1127 | CH 1133 | CH 1139 | CH 1145 | CH 1151 | CH 1110 | CH 1116 | CH 1122 | CH 1128 | CH 1134 | CH 1140 | CH 1146 | CH 1152 |

Fig.20

| | | | | | | | | | | |
|---|---|---|---|---|---|---|---|---|---|---|
| #25 STS-48 (2.4G) | CH 1153 | CH 1159 | CH 1165 | CH 1171 | CH 1177 | CH 1183 | CH 1189 | CH 1195 | CH 1154 | CH 1160 |
| | CH 1156 | CH 1162 | CH 1168 | CH 1174 | CH 1180 | CH 1186 | CH 1192 | CH 1198 | CH 1157 | CH 1163 |
| #26 STS-48 (2.4G) | CH 1201 | CH 1207 | CH 1213 | CH 1219 | CH 1225 | CH 1231 | CH 1237 | CH 1243 | CH 1202 | CH 1208 |
| | CH 1204 | CH 1210 | CH 1216 | CH 1222 | CH 1228 | CH 1234 | CH 1240 | CH 1246 | CH 1205 | CH 1211 |
| #27 STS-48 (2.4G) | CH 1249 | CH 1255 | CH 1261 | CH 1267 | CH 1273 | CH 1279 | CH 1285 | CH 1291 | CH 1250 | CH 1256 |
| | CH 1252 | CH 1258 | CH 1264 | CH 1270 | CH 1276 | CH 1282 | CH 1288 | CH 1294 | CH 1253 | CH 1259 |
| #28 STS-48 (2.4G) | CH 1297 | CH 1303 | CH 1309 | CH 1315 | CH 1321 | CH 1327 | CH 1333 | CH 1339 | CH 1298 | CH 1304 |
| | CH 1300 | CH 1306 | CH 1312 | CH 1318 | CH 1324 | CH 1330 | CH 1336 | CH 1342 | CH 1301 | CH 1307 |
| #29 STS-48 (2.4G) | CH 1345 | CH 1351 | CH 1357 | CH 1363 | CH 1369 | CH 1375 | CH 1381 | CH 1387 | CH 1346 | CH 1352 |
| | CH 1348 | CH 1354 | CH 1360 | CH 1366 | CH 1372 | CH 1378 | CH 1384 | CH 1390 | CH 1349 | CH 1355 |
| #30 STS-48 (2.4G) | CH 1393 | CH 1399 | CH 1405 | CH 1411 | CH 1417 | CH 1423 | CH 1429 | CH 1435 | CH 1394 | CH 1400 |
| | CH 1396 | CH 1402 | CH 1408 | CH 1414 | CH 1420 | CH 1426 | CH 1432 | CH 1438 | CH 1397 | CH 1403 |
| #31 STS-48 (2.4G) | CH 1441 | CH 1447 | CH 1453 | CH 1459 | CH 1465 | CH 1471 | CH 1477 | CH 1483 | CH 1442 | CH 1448 |
| | CH 1444 | CH 1450 | CH 1456 | CH 1462 | CH 1468 | CH 1474 | CH 1480 | CH 1486 | CH 1445 | CH 1451 |
| #32 STS-48 (2.4G) | CH 1489 | CH 1495 | CH 1501 | CH 1507 | CH 1513 | CH 1519 | CH 1525 | CH 1531 | CH 1490 | CH 1496 |
| | CH 1492 | CH 1498 | CH 1504 | CH 1510 | CH 1516 | CH 1522 | CH 1528 | CH 1534 | CH 1493 | CH 1499 |

From LOWER 10G (#25–#28)

From LOWER 10G (#29–#32)

Fig. 21

| CH 1166 | CH 1172 | CH 1178 | CH 1184 | CH 1190 | CH 1196 | CH 1155 | CH 1161 | CH 1167 | CH 1173 | CH 1179 | CH 1185 | CH 1191 | CH 1197 |
| --- | --- | --- | --- | --- | --- | --- | --- | --- | --- | --- | --- | --- | --- |
| CH 1169 | CH 1175 | CH 1181 | CH 1187 | CH 1193 | CH 1199 | CH 1158 | CH 1164 | CH 1170 | CH 1176 | CH 1182 | CH 1188 | CH 1194 | CH 1200 |
| CH 1214 | CH 1220 | CH 1226 | CH 1232 | CH 1238 | CH 1244 | CH 1203 | CH 1209 | CH 1215 | CH 1221 | CH 1227 | CH 1233 | CH 1239 | CH 1245 |
| CH 1217 | CH 1223 | CH 1229 | CH 1235 | CH 1241 | CH 1247 | CH 1206 | CH 1212 | CH 1218 | CH 1224 | CH 1230 | CH 1236 | CH 1242 | CH 1248 |
| CH 1262 | CH 1268 | CH 1274 | CH 1280 | CH 1286 | CH 1292 | CH 1251 | CH 1257 | CH 1263 | CH 1269 | CH 1275 | CH 1281 | CH 1287 | CH 1293 |
| CH 1265 | CH 1271 | CH 1277 | CH 1283 | CH 1289 | CH 1295 | CH 1254 | CH 1260 | CH 1266 | CH 1272 | CH 1278 | CH 1284 | CH 1290 | CH 1296 |
| CH 1310 | CH 1316 | CH 1322 | CH 1328 | CH 1334 | CH 1340 | CH 1299 | CH 1305 | CH 1311 | CH 1317 | CH 1323 | CH 1329 | CH 1335 | CH 1341 |
| CH 1313 | CH 1319 | CH 1325 | CH 1331 | CH 1337 | CH 1343 | CH 1302 | CH 1308 | CH 1314 | CH 1320 | CH 1326 | CH 1332 | CH 1338 | CH 1344 |
| CH 1358 | CH 1364 | CH 1370 | CH 1376 | CH 1382 | CH 1388 | CH 1347 | CH 1353 | CH 1359 | CH 1365 | CH 1371 | CH 1377 | CH 1383 | CH 1389 |
| CH 1361 | CH 1367 | CH 1373 | CH 1379 | CH 1385 | CH 1391 | CH 1350 | CH 1356 | CH 1362 | CH 1368 | CH 1374 | CH 1380 | CH 1386 | CH 1392 |
| CH 1406 | CH 1412 | CH 1418 | CH 1424 | CH 1430 | CH 1436 | CH 1395 | CH 1401 | CH 1407 | CH 1413 | CH 1419 | CH 1425 | CH 1431 | CH 1437 |
| CH 1409 | CH 1415 | CH 1421 | CH 1427 | CH 1433 | CH 1439 | CH 1398 | CH 1404 | CH 1410 | CH 1416 | CH 1422 | CH 1428 | CH 1434 | CH 1440 |
| CH 1454 | CH 1460 | CH 1466 | CH 1472 | CH 1478 | CH 1484 | CH 1443 | CH 1449 | CH 1455 | CH 1461 | CH 1467 | CH 1473 | CH 1479 | CH 1485 |
| CH 1457 | CH 1463 | CH 1469 | CH 1475 | CH 1481 | CH 1487 | CH 1446 | CH 1452 | CH 1458 | CH 1464 | CH 1470 | CH 1476 | CH 1482 | CH 1488 |
| CH 1502 | CH 1508 | CH 1514 | CH 1520 | CH 1526 | CH 1532 | CH 1491 | CH 1497 | CH 1503 | CH 1509 | CH 1515 | CH 1521 | CH 1527 | CH 1533 |
| CH 1505 | CH 1511 | CH 1517 | CH 1523 | CH 1529 | CH 1535 | CH 1494 | CH 1500 | CH 1506 | CH 1512 | CH 1518 | CH 1524 | CH 1530 | CH 1536 |

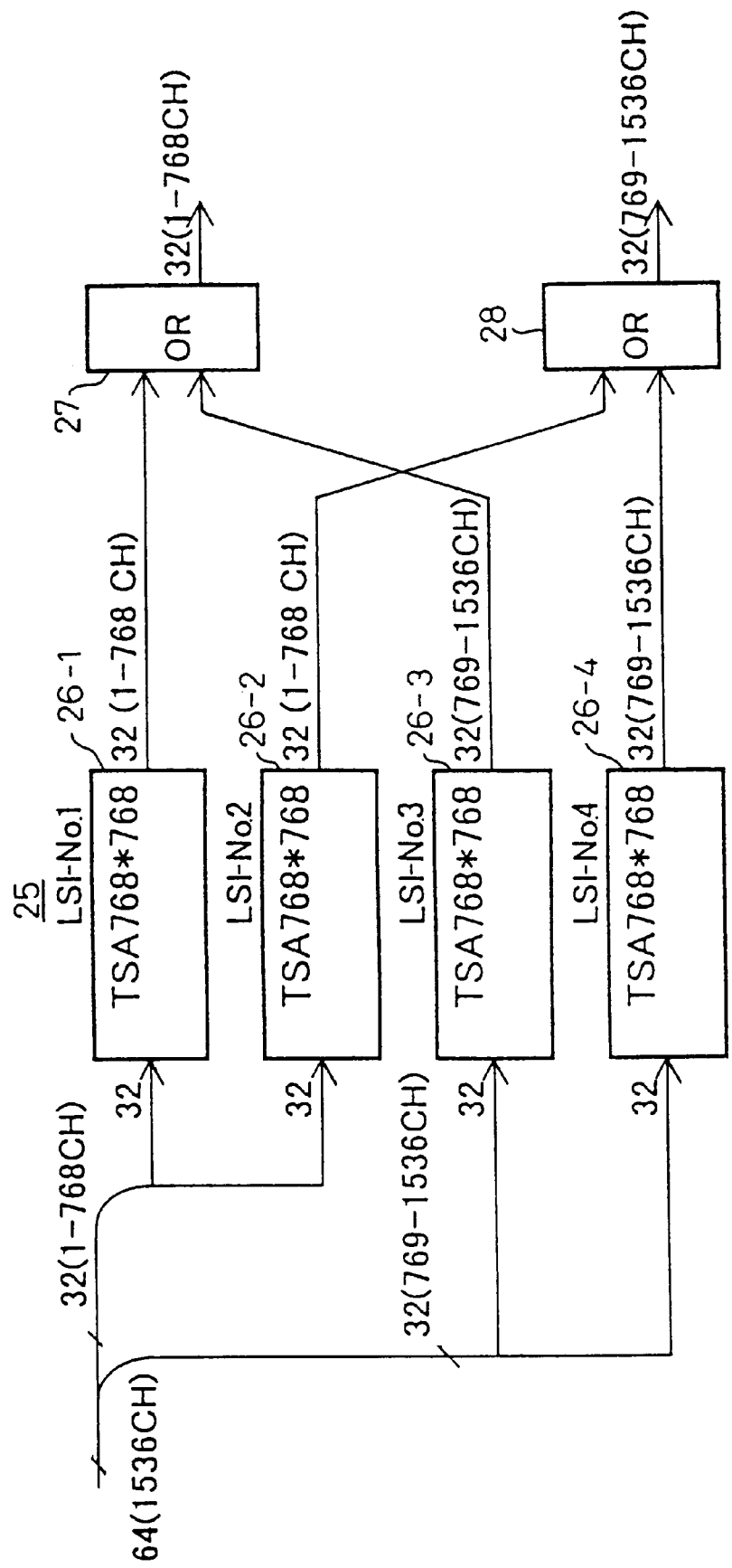

Fig. 32

DTM TIME SLOT No.

| SPACE SW No. | 0 | 1 | 2 | 3 | 4 | 5 | 6 | 7 | 8 | 9 | A | B |
|---|---|---|---|---|---|---|---|---|---|---|---|---|
| 00 | CH 1 | CH 13 | CH 25 | CH 37 | CH 2 | CH 14 | CH 26 | CH 38 | CH 3 | CH 15 | CH 27 | CH 39 |
| 01 | CH 4 | CH 16 | CH 28 | CH 40 | CH 5 | CH 17 | CH 29 | CH 41 | CH 6 | CH 18 | CH 30 | CH 42 |
| 02 | CH 7 | CH 19 | CH 31 | CH 43 | CH 8 | CH 20 | CH 32 | CH 44 | CH 9 | CH 21 | CH 33 | CH 45 |
| 03 | CH 10 | CH 22 | CH 34 | CH 46 | CH 11 | CH 23 | CH 35 | CH 47 | CH 12 | CH 24 | CH 36 | CH 48 |
| 04 | CH 49 | CH 61 | CH 73 | CH 85 | CH 50 | CH 62 | CH 74 | CH 86 | CH 51 | CH 63 | CH 75 | CH 87 |
| 05 | CH 52 | CH 64 | CH 76 | CH 88 | CH 53 | CH 65 | CH 77 | CH 89 | CH 54 | CH 66 | CH 78 | CH 90 |
| 06 | CH 55 | CH 67 | CH 79 | CH 91 | CH 56 | CH 68 | CH 80 | CH 92 | CH 57 | CH 69 | CH 81 | CH 93 |
| 07 | CH 58 | CH 70 | CH 82 | CH 94 | CH 59 | CH 71 | CH 83 | CH 95 | CH 60 | CH 72 | CH 84 | CH 96 |
| 08 | CH 97 | CH 109 | CH 121 | CH 133 | CH 98 | CH 110 | CH 122 | CH 134 | CH 99 | CH 111 | CH 123 | CH 135 |
| 09 | CH 100 | CH 112 | CH 124 | CH 136 | CH 101 | CH 113 | CH 125 | CH 137 | CH 102 | CH 114 | CH 126 | CH 138 |
| 0A | CH 103 | CH 115 | CH 127 | CH 139 | CH 104 | CH 116 | CH 128 | CH 140 | CH 105 | CH 117 | CH 129 | CH 141 |
| 0B | CH 106 | CH 118 | CH 130 | CH 142 | CH 107 | CH 119 | CH 131 | CH 143 | CH 108 | CH 120 | CH 132 | CH 144 |
| 0C | CH 145 | CH 157 | CH 169 | CH 181 | CH 146 | CH 158 | CH 170 | CH 182 | CH 147 | CH 159 | CH 171 | CH 183 |
| 0D | CH 148 | CH 160 | CH 172 | CH 184 | CH 149 | CH 161 | CH 173 | CH 185 | CH 150 | CH 162 | CH 174 | CH 186 |
| 0E | CH 151 | CH 163 | CH 175 | CH 187 | CH 152 | CH 164 | CH 176 | CH 188 | CH 153 | CH 165 | CH 177 | CH 189 |
| 0F | CH 154 | CH 166 | CH 178 | CH 190 | CH 155 | CH 167 | CH 179 | CH 191 | CH 156 | CH 168 | CH 180 | CH 192 |

Fig.33

| SPACE SW No. \ DTM TIME SLOT No. | 0 | 1 | 2 | 3 | 4 | 5 | 6 | 7 |
|---|---|---|---|---|---|---|---|---|
| 10 | CH 193 | CH 205 | CH 217 | CH 229 | CH 194 | CH 206 | CH 218 | CH 230 | CH 195 | CH 207 | CH 219 | CH 231 |
| 11 | CH 196 | CH 208 | CH 220 | CH 232 | CH 197 | CH 209 | CH 221 | CH 233 | CH 198 | CH 210 | CH 222 | CH 234 |
| 12 | CH 199 | CH 211 | CH 223 | CH 235 | CH 200 | CH 212 | CH 224 | CH 236 | CH 201 | CH 213 | CH 225 | CH 237 |
| 13 | CH 202 | CH 214 | CH 226 | CH 238 | CH 203 | CH 215 | CH 227 | CH 239 | CH 204 | CH 216 | CH 228 | CH 240 |
| 14 | CH 241 | CH 253 | CH 265 | CH 277 | CH 242 | CH 254 | CH 266 | CH 278 | CH 243 | CH 255 | CH 267 | CH 279 |
| 15 | CH 244 | CH 256 | CH 268 | CH 280 | CH 245 | CH 257 | CH 269 | CH 281 | CH 246 | CH 258 | CH 270 | CH 282 |
| 16 | CH 247 | CH 259 | CH 271 | CH 283 | CH 248 | CH 260 | CH 272 | CH 284 | CH 249 | CH 261 | CH 273 | CH 285 |
| 17 | CH 250 | CH 262 | CH 274 | CH 286 | CH 251 | CH 263 | CH 275 | CH 287 | CH 252 | CH 264 | CH 276 | CH 288 |
| 18 | CH 289 | CH 301 | CH 313 | CH 325 | CH 290 | CH 302 | CH 314 | CH 326 | CH 291 | CH 303 | CH 315 | CH 327 |
| 19 | CH 292 | CH 304 | CH 316 | CH 328 | CH 293 | CH 305 | CH 317 | CH 329 | CH 294 | CH 306 | CH 318 | CH 330 |
| 1A | CH 295 | CH 307 | CH 319 | CH 331 | CH 296 | CH 308 | CH 320 | CH 332 | CH 297 | CH 309 | CH 321 | CH 333 |
| 1B | CH 298 | CH 310 | CH 322 | CH 334 | CH 299 | CH 311 | CH 323 | CH 335 | CH 300 | CH 312 | CH 324 | CH 336 |
| 1C | CH 337 | CH 349 | CH 361 | CH 373 | CH 338 | CH 350 | CH 362 | CH 374 | CH 339 | CH 351 | CH 363 | CH 375 |
| 1D | CH 340 | CH 352 | CH 364 | CH 376 | CH 341 | CH 353 | CH 365 | CH 377 | CH 342 | CH 354 | CH 366 | CH 378 |
| 1E | CH 343 | CH 355 | CH 367 | CH 379 | CH 344 | CH 356 | CH 368 | CH 380 | CH 345 | CH 357 | CH 369 | CH 381 |
| 1F | CH 346 | CH 358 | CH 370 | CH 382 | CH 347 | CH 359 | CH 371 | CH 383 | CH 348 | CH 360 | CH 372 | CH 384 |

Fig. 34

| SPACE SW No. | DTM TIME SLOT No. | | | | | | | | | | | | | |
|---|---|---|---|---|---|---|---|---|---|---|---|---|---|---|
| 20 | CH 385 | CH 397 | CH 409 | CH 421 | CH 386 | CH 398 | CH 410 | CH 422 | CH 387 | CH 399 | CH 411 | CH 423 |
| 21 | CH 388 | CH 400 | CH 412 | CH 424 | CH 389 | CH 401 | CH 413 | CH 425 | CH 390 | CH 402 | CH 414 | CH 426 |
| 22 | CH 391 | CH 403 | CH 415 | CH 427 | CH 392 | CH 404 | CH 416 | CH 428 | CH 393 | CH 405 | CH 417 | CH 429 |
| 23 | CH 394 | CH 406 | CH 418 | CH 430 | CH 395 | CH 407 | CH 419 | CH 431 | CH 396 | CH 408 | CH 420 | CH 432 |
| 24 | CH 433 | CH 445 | CH 457 | CH 469 | CH 434 | CH 446 | CH 458 | CH 470 | CH 435 | CH 447 | CH 459 | CH 471 |
| 25 | CH 436 | CH 448 | CH 460 | CH 472 | CH 437 | CH 449 | CH 461 | CH 473 | CH 438 | CH 450 | CH 462 | CH 474 |
| 26 | CH 439 | CH 451 | CH 463 | CH 475 | CH 440 | CH 452 | CH 464 | CH 476 | CH 441 | CH 453 | CH 465 | CH 477 |
| 27 | CH 442 | CH 454 | CH 466 | CH 478 | CH 443 | CH 455 | CH 467 | CH 479 | CH 444 | CH 456 | CH 468 | CH 480 |
| 28 | CH 481 | CH 493 | CH 505 | CH 517 | CH 482 | CH 494 | CH 506 | CH 518 | CH 483 | CH 495 | CH 507 | CH 519 |
| 29 | CH 484 | CH 496 | CH 508 | CH 520 | CH 485 | CH 497 | CH 509 | CH 521 | CH 486 | CH 498 | CH 510 | CH 522 |
| 2A | CH 487 | CH 499 | CH 511 | CH 523 | CH 488 | CH 500 | CH 512 | CH 524 | CH 489 | CH 501 | CH 513 | CH 525 |
| 2B | CH 490 | CH 502 | CH 514 | CH 526 | CH 491 | CH 503 | CH 515 | CH 527 | CH 492 | CH 504 | CH 516 | CH 528 |
| 2C | CH 529 | CH 541 | CH 553 | CH 565 | CH 530 | CH 542 | CH 554 | CH 566 | CH 531 | CH 543 | CH 555 | CH 567 |
| 2D | CH 532 | CH 544 | CH 556 | CH 568 | CH 533 | CH 545 | CH 557 | CH 569 | CH 534 | CH 546 | CH 558 | CH 570 |
| 2E | CH 535 | CH 547 | CH 559 | CH 571 | CH 536 | CH 548 | CH 560 | CH 572 | CH 537 | CH 549 | CH 561 | CH 573 |
| 2F | CH 538 | CH 550 | CH 562 | CH 574 | CH 539 | CH 551 | CH 563 | CH 575 | CH 540 | CH 552 | CH 564 | CH 576 |

Fig.35

| SPACE SW No. | DTM TIME SLOT No. | | | | | | | | | | | |
|---|---|---|---|---|---|---|---|---|---|---|---|---|
| 30 | CH 577 | CH 589 | CH 601 | CH 613 | CH 578 | CH 590 | CH 602 | CH 614 | CH 579 | CH 591 | CH 603 | CH 615 |
| 31 | CH 580 | CH 592 | CH 604 | CH 616 | CH 581 | CH 593 | CH 605 | CH 617 | CH 582 | CH 594 | CH 606 | CH 618 |
| 32 | CH 583 | CH 595 | CH 607 | CH 619 | CH 584 | CH 596 | CH 608 | CH 620 | CH 585 | CH 597 | CH 609 | CH 621 |
| 33 | CH 586 | CH 598 | CH 610 | CH 622 | CH 587 | CH 599 | CH 611 | CH 623 | CH 588 | CH 600 | CH 612 | CH 624 |
| 34 | CH 625 | CH 637 | CH 649 | CH 661 | CH 626 | CH 638 | CH 650 | CH 662 | CH 627 | CH 639 | CH 651 | CH 663 |
| 35 | CH 628 | CH 640 | CH 652 | CH 664 | CH 629 | CH 641 | CH 653 | CH 665 | CH 630 | CH 642 | CH 654 | CH 666 |
| 36 | CH 631 | CH 643 | CH 655 | CH 667 | CH 632 | CH 644 | CH 656 | CH 668 | CH 633 | CH 645 | CH 657 | CH 669 |
| 37 | CH 634 | CH 646 | CH 658 | CH 670 | CH 635 | CH 647 | CH 659 | CH 671 | CH 636 | CH 648 | CH 660 | CH 672 |
| 38 | CH 673 | CH 685 | CH 697 | CH 709 | CH 674 | CH 686 | CH 698 | CH 710 | CH 675 | CH 687 | CH 699 | CH 711 |
| 39 | CH 676 | CH 688 | CH 700 | CH 712 | CH 677 | CH 689 | CH 701 | CH 713 | CH 678 | CH 690 | CH 702 | CH 714 |
| 3A | CH 679 | CH 691 | CH 703 | CH 715 | CH 680 | CH 692 | CH 704 | CH 716 | CH 681 | CH 693 | CH 705 | CH 717 |
| 3B | CH 682 | CH 694 | CH 706 | CH 718 | CH 683 | CH 695 | CH 707 | CH 719 | CH 684 | CH 696 | CH 708 | CH 720 |
| 3C | CH 721 | CH 733 | CH 745 | CH 757 | CH 722 | CH 734 | CH 746 | CH 758 | CH 723 | CH 735 | CH 747 | CH 759 |
| 3D | CH 724 | CH 736 | CH 748 | CH 760 | CH 725 | CH 737 | CH 749 | CH 761 | CH 726 | CH 738 | CH 750 | CH 762 |
| 3E | CH 727 | CH 739 | CH 751 | CH 763 | CH 728 | CH 740 | CH 752 | CH 764 | CH 729 | CH 741 | CH 753 | CH 765 |
| 3F | CH 730 | CH 742 | CH 754 | CH 766 | CH 731 | CH 743 | CH 755 | CH 767 | CH 732 | CH 744 | CH 756 | CH 768 |

Fig.36

| | ATM CELL SETTING CODE | | | | | | | | | |
|---|---|---|---|---|---|---|---|---|---|---|
| | CH No. | | | | | | | | | |
| CH1 | 0 | 0 | 0 | 0 | 0 | 0 | 0 | 0 | 0 | 0 |
| CH2 | 0 | 0 | 0 | 0 | 0 | 0 | 0 | 0 | 0 | 1 |
| CH3 | 0 | 0 | 0 | 0 | 0 | 0 | 0 | 0 | 1 | 0 |
| CH4 | 0 | 0 | 0 | 0 | 0 | 0 | 0 | 0 | 1 | 1 |
| CH5 | 0 | 0 | 0 | 0 | 0 | 0 | 0 | 1 | 0 | 0 |
| CH6 | 0 | 0 | 0 | 0 | 0 | 0 | 0 | 1 | 0 | 1 |
| CH7 | 0 | 0 | 0 | 0 | 0 | 0 | 0 | 1 | 1 | 0 |
| CH8 | 0 | 0 | 0 | 0 | 0 | 0 | 0 | 1 | 1 | 1 |
| CH9 | 0 | 0 | 0 | 0 | 0 | 0 | 1 | 0 | 0 | 0 |
| CH10 | 0 | 0 | 0 | 0 | 0 | 0 | 1 | 0 | 0 | 1 |
| | | | | | | | | | | |
| CH767 | 1 | 0 | 1 | 1 | 1 | 1 | 1 | 1 | 1 | 0 |
| CH768 | 1 | 0 | 1 | 1 | 1 | 1 | 1 | 1 | 1 | 1 |
| STS-1 UNEQ | 1 | 1 | 0 | * | * | * | * | * | * | * |
| STS-Nc UNEQ | 1 | 1 | 1 | 0 | * | * | * | * | * | * |
| P-AIS | 1 | 1 | 1 | 1 | * | * | * | * | * | * |

Fig.37

| | ACM CELL CODE | | | | | | | | | |
|---|---|---|---|---|---|---|---|---|---|---|
| | DTM TIME SLOT No. | | | | SPACE SW No. | | | | | |
| 0,00h | 0 | 0 | 0 | 0 | 0 | 0 | 0 | 0 | 0 | 0 |
| 4,00h | 0 | 1 | 0 | 0 | 0 | 0 | 0 | 0 | 0 | 0 |
| 8,00h | 1 | 0 | 0 | 0 | 0 | 0 | 0 | 0 | 0 | 0 |
| 0,01h | 0 | 0 | 0 | 1 | 0 | 0 | 0 | 0 | 0 | 0 |
| 4,01h | 0 | 1 | 0 | 1 | 0 | 0 | 0 | 0 | 0 | 0 |
| 8,01h | 1 | 0 | 0 | 1 | 0 | 0 | 0 | 0 | 0 | 0 |
| 0,02h | 0 | 0 | 1 | 0 | 0 | 0 | 0 | 0 | 0 | 0 |
| 4,02h | 0 | 1 | 1 | 0 | 0 | 0 | 0 | 0 | 0 | 0 |
| 8,02h | 1 | 0 | 1 | 0 | 0 | 0 | 0 | 0 | 0 | 0 |
| 0,03h | 0 | 0 | 1 | 1 | 0 | 0 | 0 | 0 | 0 | 0 |
| | | | | | | | | | | |
| 7,3Fh | 0 | 1 | 1 | 1 | 1 | 1 | 1 | 1 | 1 | 1 |
| B,3Fh | 1 | 0 | 1 | 1 | 1 | 1 | 1 | 1 | 1 | 1 |
| THROUGH | 1 | 1 | 0 | * | * | * | * | * | * | * |
| ⇨ | 1 | 1 | 1 | 0 | * | * | * | * | * | * |
| | 1 | 1 | 1 | 1 | * | * | * | * | * | * |

*:Dont care

Fig.38

CELL No.[0]

| ATM CELL SETTING | ACM WRITE CONTROL | |
|---|---|---|
| CH No. | SELECT No | Address |
| CH1 | 1 | 0h |
| CH2 | 1 | 4h |
| CH3 | 1 | 8h |
| CH4 | 2 | 0h |
| CH5 | 2 | 4h |
| CH6 | 2 | 8h |
| CH7 | 3 | 0h |
| CH8 | 3 | 4h |
| CH9 | 3 | 8h |
| CH10 | 4 | 0h |
| CH11 | 4 | 4h |
| CH12 | 4 | 8h |
| CH13 | 1 | 1h |
| CH14 | 1 | 5h |
| CH15 | 1 | 9h |
| CH16 | 2 | 1h |
| CH17 | 2 | 5h |
| CH18 | 2 | 9h |
| CH19 | 3 | 1h |
| CH20 | 3 | 5h |
| CH21 | 3 | 9h |
| CH22 | 4 | 1h |
| CH23 | 4 | 5h |
| CH24 | 4 | 9h |

Fig. 39

CELL No.[1]

| ATM CELL SETTING | ACM WRITE CONTROL | |
|---|---|---|
| CH No. | SELECT No | Address |
| CH25 | 1 | 2h |
| CH26 | 1 | 6h |
| CH27 | 1 | Ah |
| CH28 | 2 | 2h |
| CH29 | 2 | 6h |
| CH30 | 2 | Ah |
| CH31 | 3 | 2h |
| CH32 | 3 | 6h |
| CH33 | 3 | Ah |
| CH34 | 4 | 2h |
| CH35 | 4 | 6h |
| CH36 | 4 | 3h |
| CH37 | 1 | 3h |
| CH38 | 1 | 7h |
| CH39 | 1 | Bh |
| CH40 | 2 | 3h |
| CH41 | 2 | 7h |
| CH42 | 2 | Bh |
| CH43 | 3 | 3h |
| CH44 | 3 | 7h |
| CH45 | 3 | Bh |
| CH46 | 4 | 3h |
| CH47 | 4 | 7h |
| CH48 | 4 | Bh |

Fig.40

| CH No. | ACM WRITE CONTROL ||
|---|---|---|
| | SELECT No | Address |
| CH49 | 5 | 0h |
| CH50 | 5 | 4h |
| CH51 | 5 | 8h |
| CH52 | 6 | 0h |
| CH53 | 6 | 4h |
| CH54 | 6 | 8h |
| CH55 | 7 | 0h |
| CH56 | 7 | 4h |
| CH57 | 7 | 8h |
| CH58 | 8 | 0h |
| CH59 | 8 | 4h |
| CH60 | 8 | 8h |
| CH61 | 5 | 1h |
| CH62 | 5 | 5h |
| CH63 | 5 | 9h |
| CH64 | 6 | 1h |
| CH65 | 6 | 5h |
| CH66 | 6 | 9h |
| CH67 | 7 | 1h |
| CH68 | 7 | 5h |
| CH69 | 7 | 9h |
| CH70 | 8 | 1h |
| CH71 | 8 | 5h |
| CH72 | 8 | 9h |

CELL No.[2] ATM CELL SETTING

Fig.41

ATM CELL SETTING — CELL No.[3]

| CH No. | ACM WRITE CONTROL | |
|---|---|---|
| | SELECT No | Address |
| CH73 | 5 | 2h |
| CH74 | 5 | 6h |
| CH75 | 5 | Ah |
| CH76 | 6 | 2h |
| CH77 | 6 | 6h |
| CH78 | 6 | Ah |
| CH79 | 7 | 2h |
| CH80 | 7 | 6h |
| CH81 | 7 | Ah |
| CH82 | 8 | 2h |
| CH83 | 8 | 6h |
| CH84 | 8 | 3h |
| CH85 | 5 | 3h |
| CH86 | 5 | 7h |
| CH87 | 5 | Bh |
| CH88 | 6 | 3h |
| CH89 | 6 | 7h |
| CH90 | 6 | Bh |
| CH91 | 7 | 3h |
| CH92 | 7 | 7h |
| CH93 | 7 | Bh |
| CH94 | 8 | 3h |
| CH95 | 8 | 7h |
| CH96 | 8 | Bh |

Fig.42

CELL No.[4] — ATM CELL SETTING

| CH No. | ACM WRITE CONTROL | |
|---|---|---|
| | SELECT No | Address |
| CH97 | 9 | 0h |
| CH98 | 9 | 4h |
| CH99 | 9 | 8h |
| CH100 | 10 | 0h |
| CH101 | 10 | 4h |
| CH102 | 10 | 8h |
| CH103 | 11 | 0h |
| CH104 | 11 | 4h |
| CH105 | 11 | 8h |
| CH106 | 12 | 0h |
| CH107 | 12 | 4h |
| CH108 | 12 | 8h |
| CH109 | 9 | 1h |
| CH110 | 9 | 5h |
| CH111 | 9 | 9h |
| CH112 | 10 | 1h |
| CH113 | 10 | 5h |
| CH114 | 10 | 9h |
| CH115 | 11 | 1h |
| CH116 | 11 | 5h |
| CH117 | 11 | 9h |
| CH118 | 12 | 1h |
| CH119 | 12 | 5h |
| CH120 | 12 | 9h |

Fig.43

ATM CELL SETTING — CELL No.[5]

| CH No. | ACM WRITE CONTROL ||
|---|---|---|
| | SELECT No | Address |
| CH121 | 9 | 2h |
| CH122 | 9 | 6h |
| CH123 | 9 | Ah |
| CH124 | 10 | 2h |
| CH125 | 10 | 6h |
| CH126 | 10 | Ah |
| CH127 | 11 | 2h |
| CH128 | 11 | 6h |
| CH129 | 11 | Ah |
| CH130 | 12 | 2h |
| CH131 | 12 | 6h |
| CH132 | 12 | 3h |
| CH133 | 9 | 3h |
| CH134 | 9 | 7h |
| CH135 | 9 | Bh |
| CH136 | 10 | 3h |
| CH137 | 10 | 7h |
| CH138 | 10 | Bh |
| CH139 | 11 | 3h |
| CH140 | 11 | 7h |
| CH141 | 11 | Bh |
| CH142 | 12 | 3h |
| CH143 | 12 | 7h |
| CH144 | 12 | Bh |

Fig.44

CELL No.[30] — ATM CELL SETTING

| CH No. | ACM WRITE CONTROL ||
|---|---|---|
| | SELECT No | Address |
| CH721 | 61 | 0h |
| CH722 | 61 | 4h |
| CH723 | 61 | 8h |
| CH724 | 62 | 0h |
| CH725 | 62 | 4h |
| CH726 | 62 | 8h |
| CH727 | 63 | 0h |
| CH728 | 63 | 4h |
| CH729 | 63 | 8h |
| CH730 | 64 | 0h |
| CH731 | 64 | 4h |
| CH732 | 64 | 8h |
| CH733 | 61 | 1h |
| CH734 | 61 | 5h |
| CH735 | 61 | 9h |
| CH736 | 62 | 1h |
| CH737 | 62 | 5h |
| CH738 | 62 | 9h |
| CH739 | 63 | 1h |
| CH740 | 63 | 5h |
| CH741 | 63 | 9h |
| CH742 | 64 | 1h |
| CH743 | 64 | 5h |
| CH744 | 64 | 9h |

Fig.45

CELL No.[31] / ATM CELL SETTING

| CH No. | ACM WRITE CONTROL | |
|---|---|---|
| | SELECT No | Address |
| CH745 | 61 | 2h |
| CH746 | 61 | 6h |
| CH747 | 61 | Ah |
| CH748 | 62 | 2h |
| CH749 | 62 | 6h |
| CH750 | 62 | Ah |
| CH751 | 63 | 2h |
| CH752 | 63 | 6h |
| CH753 | 63 | Ah |
| CH754 | 64 | 2h |
| CH755 | 64 | 6h |
| CH756 | 64 | 3h |
| CH757 | 61 | 3h |
| CH758 | 61 | 7h |
| CH759 | 61 | Bh |
| CH760 | 62 | 3h |
| CH761 | 62 | 7h |
| CH762 | 62 | Bh |
| CH763 | 63 | 3h |
| CH764 | 63 | 7h |
| CH765 | 63 | Bh |
| CH766 | 64 | 3h |
| CH767 | 64 | 7h |
| CH768 | 64 | Bh |

Fig. 50

DTM TIME SLOT No.

| SPACE SW No. | 0 | 1 | 2 | 3 | 4 | 5 | 6 | 7 | 8 | 9 | A | B |
|---|---|---|---|---|---|---|---|---|---|---|---|---|
| 00 | CH 1 | CH 13 | CH 25 | CH 37 | CH 2 | CH 14 | CH 26 | CH 38 | CH 3 | CH 15 | CH 27 | CH 39 |
| 01 | CH 4 | CH 16 | CH 28 | CH 40 | CH 5 | CH 17 | CH 29 | CH 41 | CH 6 | CH 18 | CH 30 | CH 42 |
| 02 | CH 7 | CH 19 | CH 31 | CH 43 | CH 8 | CH 20 | CH 32 | CH 44 | CH 9 | CH 21 | CH 33 | CH 45 |
| 03 | CH 10 | CH 22 | CH 34 | CH 46 | CH 11 | CH 23 | CH 35 | CH 47 | CH 12 | CH 24 | CH 36 | CH 48 |
| 04 | CH 49 | CH 61 | CH 73 | CH 85 | CH 50 | CH 62 | CH 74 | CH 86 | CH 51 | CH 63 | CH 75 | CH 87 |
| 05 | CH 52 | CH 64 | CH 76 | CH 88 | CH 53 | CH 65 | CH 77 | CH 89 | CH 54 | CH 66 | CH 78 | CH 90 |
| 06 | CH 55 | CH 67 | CH 79 | CH 91 | CH 56 | CH 68 | CH 80 | CH 92 | CH 57 | CH 69 | CH 81 | CH 93 |
| 07 | CH 58 | CH 70 | CH 82 | CH 94 | CH 59 | CH 71 | CH 83 | CH 95 | CH 60 | CH 72 | CH 84 | CH 96 |
| 08 | CH 97 | CH 109 | CH 121 | CH 133 | CH 98 | CH 110 | CH 122 | CH 134 | CH 99 | CH 111 | CH 123 | CH 135 |
| 09 | CH 100 | CH 112 | CH 124 | CH 136 | CH 101 | CH 113 | CH 125 | CH 137 | CH 102 | CH 114 | CH 126 | CH 138 |
| 0A | CH 103 | CH 115 | CH 127 | CH 139 | CH 104 | CH 116 | CH 128 | CH 140 | CH 105 | CH 117 | CH 129 | CH 141 |
| 0B | CH 106 | CH 118 | CH 130 | CH 142 | CH 107 | CH 119 | CH 131 | CH 143 | CH 108 | CH 120 | CH 132 | CH 144 |
| 0C | CH 145 | CH 157 | CH 169 | CH 181 | CH 146 | CH 158 | CH 170 | CH 182 | CH 147 | CH 159 | CH 171 | CH 183 |
| 0D | CH 148 | CH 160 | CH 172 | CH 184 | CH 149 | CH 161 | CH 173 | CH 185 | CH 150 | CH 162 | CH 174 | CH 186 |
| 0E | CH 151 | CH 163 | CH 175 | CH 187 | CH 152 | CH 164 | CH 176 | CH 188 | CH 153 | CH 165 | CH 177 | CH 189 |
| 0F | CH 154 | CH 166 | CH 178 | CH 190 | CH 155 | CH 167 | CH 179 | CH 191 | CH 156 | CH 168 | CH 180 | CH 192 |
| ... | | | | | | | | | | | | |
| 3C | CH 721 | CH 733 | CH 745 | CH 757 | CH 722 | CH 734 | CH 746 | CH 758 | CH 723 | CH 735 | CH 747 | CH 759 |
| 3D | CH 724 | CH 736 | CH 748 | CH 760 | CH 725 | CH 737 | CH 749 | CH 761 | CH 726 | CH 738 | CH 750 | CH 762 |
| 3E | CH 727 | CH 739 | CH 751 | CH 763 | CH 728 | CH 740 | CH 752 | CH 764 | CH 729 | CH 741 | CH 753 | CH 765 |
| 3F | CH 730 | CH 742 | CH 754 | CH 766 | CH 731 | CH 743 | CH 755 | CH 767 | CH 732 | CH 744 | CH 756 | CH 768 |

Fig. 51

| SPACE SW No. \ DTM TIME SLOT No. | 0 | 1 | 2 | 3 | 4 | 5 | 6 | 7 | 8 | 9 | A | B |
|---|---|---|---|---|---|---|---|---|---|---|---|---|
| 00 | CH 769 | CH 781 | CH 793 | CH 805 | CH 770 | CH 782 | CH 794 | CH 806 | CH 771 | CH 783 | CH 795 | CH 807 |
| 01 | CH 772 | CH 784 | CH 796 | CH 808 | CH 773 | CH 785 | CH 797 | CH 809 | CH 774 | CH 786 | CH 798 | CH 810 |
| 02 | CH 775 | CH 787 | CH 799 | CH 811 | CH 776 | CH 788 | CH 800 | CH 812 | CH 777 | CH 789 | CH 801 | CH 813 |
| 03 | CH 778 | CH 790 | CH 802 | CH 814 | CH 779 | CH 791 | CH 803 | CH 815 | CH 780 | CH 792 | CH 804 | CH 816 |
| 04 | CH 817 | CH 829 | CH 841 | CH 853 | CH 818 | CH 830 | CH 842 | CH 854 | CH 819 | CH 831 | CH 843 | CH 855 |
| 05 | CH 820 | CH 832 | CH 844 | CH 856 | CH 821 | CH 833 | CH 845 | CH 857 | CH 822 | CH 834 | CH 846 | CH 858 |
| 06 | CH 823 | CH 835 | CH 847 | CH 859 | CH 824 | CH 836 | CH 848 | CH 860 | CH 825 | CH 837 | CH 849 | CH 861 |
| 07 | CH 826 | CH 838 | CH 850 | CH 862 | CH 827 | CH 839 | CH 851 | CH 863 | CH 828 | CH 840 | CH 852 | CH 864 |
| 08 | CH 865 | CH 877 | CH 889 | CH 901 | CH 866 | CH 878 | CH 890 | CH 902 | CH 867 | CH 879 | CH 891 | CH 903 |
| 09 | CH 868 | CH 880 | CH 892 | CH 904 | CH 869 | CH 881 | CH 893 | CH 905 | CH 870 | CH 882 | CH 894 | CH 906 |
| 0A | CH 871 | CH 883 | CH 895 | CH 907 | CH 872 | CH 884 | CH 896 | CH 908 | CH 873 | CH 885 | CH 897 | CH 909 |
| 0B | CH 874 | CH 886 | CH 898 | CH 910 | CH 875 | CH 887 | CH 899 | CH 911 | CH 876 | CH 888 | CH 900 | CH 912 |
| 0C | CH 913 | CH 925 | CH 937 | CH 949 | CH 914 | CH 926 | CH 938 | CH 950 | CH 915 | CH 927 | CH 939 | CH 951 |
| 0D | CH 916 | CH 928 | CH 940 | CH 952 | CH 917 | CH 929 | CH 941 | CH 953 | CH 918 | CH 930 | CH 942 | CH 954 |
| 0E | CH 919 | CH 931 | CH 943 | CH 955 | CH 920 | CH 932 | CH 944 | CH 956 | CH 921 | CH 933 | CH 945 | CH 957 |
| 0F | CH 922 | CH 934 | CH 946 | CH 958 | CH 923 | CH 935 | CH 947 | CH 959 | CH 924 | CH 936 | CH 948 | CH 960 |
| ... | | | | | | | | | | | | |
| 3C | CH 1489 | CH 1501 | CH 1513 | CH 1525 | CH 1490 | CH 1502 | CH 1514 | CH 1526 | CH 1491 | CH 1503 | CH 1515 | CH 1527 |
| 3D | CH 1492 | CH 1504 | CH 1516 | CH 1528 | CH 1493 | CH 1505 | CH 1517 | CH 1529 | CH 1494 | CH 1506 | CH 1518 | CH 1530 |
| 3E | CH 1495 | CH 1507 | CH 1519 | CH 1531 | CH 1496 | CH 1508 | CH 1520 | CH 1532 | CH 1497 | CH 1509 | CH 1521 | CH 1533 |
| 3F | CH 1498 | CH 1510 | CH 1522 | CH 1534 | CH 1499 | CH 1511 | CH 1523 | CH 1535 | CH 1500 | CH 1512 | CH 1524 | CH 1536 |

Fig.52

| | ATM CELL SETTING CODE | | | | | | | | | | |
|---|---|---|---|---|---|---|---|---|---|---|---|
| | CH No. | | | | | | | | | | |
| CH1 | 0 | 0 | 0 | 0 | 0 | 0 | 0 | 0 | 0 | 0 | 0 |
| CH2 | 0 | 0 | 0 | 0 | 0 | 0 | 0 | 0 | 0 | 0 | 1 |
| CH3 | 0 | 0 | 0 | 0 | 0 | 0 | 0 | 0 | 0 | 1 | 0 |
| CH4 | 0 | 0 | 0 | 0 | 0 | 0 | 0 | 0 | 0 | 1 | 1 |
| CH5 | 0 | 0 | 0 | 0 | 0 | 0 | 0 | 0 | 1 | 0 | 0 |
| CH767 | 0 | 1 | 0 | 1 | 1 | 1 | 1 | 1 | 1 | 1 | 0 |
| CH768 | 0 | 1 | 0 | 1 | 1 | 1 | 1 | 1 | 1 | 1 | 1 |
| CH769 | 0 | 1 | 1 | 0 | 0 | 0 | 0 | 0 | 0 | 0 | 0 |
| CH770 | 0 | 1 | 1 | 0 | 0 | 0 | 0 | 0 | 0 | 0 | 1 |
| CH771 | 0 | 1 | 1 | 0 | 0 | 0 | 0 | 0 | 0 | 1 | 0 |
| CH772 | 0 | 1 | 1 | 0 | 0 | 0 | 0 | 0 | 0 | 1 | 1 |
| CH773 | 0 | 1 | 1 | 0 | 0 | 0 | 0 | 0 | 1 | 0 | 0 |
| CH1535 | 1 | 0 | 1 | 1 | 1 | 1 | 1 | 1 | 1 | 1 | 0 |
| CH1536 | 1 | 0 | 1 | 1 | 1 | 1 | 1 | 1 | 1 | 1 | 1 |
| STS-1 UNEQ | 1 | 1 | 0 | 1 | * | * | * | * | * | * | * |
| STS-Nc UNEQ | 1 | 1 | 1 | 0 | * | * | * | * | * | * | * |
| P-AIS | 1 | 1 | 1 | 1 | * | * | * | * | * | * | * |

Fig. 53

| | LSI No1 | | | | | | | | | | LSI No2 | | | | | | | | | |
|---|---|---|---|---|---|---|---|---|---|---|---|---|---|---|---|---|---|---|---|---|
| TIME SLOT No. | 1 CH -768 CH ⇨ 1 CH -768 CH | | | | | | | | | | 1 CH -768 CH ⇨ 769 CH-1536 CH | | | | | | | | | |
| | ACM CELL CODE | | | | | | | | | | ACM CELL CODE | | | | | | | | | |
| | | | | | | | SPACE SW No. | | | | | | | | | | | SPACE SW No. | | |
| 0,00h | 0 | 0 | 0 | 0 | 0 | 0 | 0 | 0 | 0 | 0 | 0 | 0 | 0 | 0 | 0 | 0 | 0 | 0 | 0 | 0 |
| 4,00h | 0 | 1 | 0 | 0 | 0 | 0 | 0 | 0 | 0 | 0 | 0 | 1 | 0 | 0 | 0 | 0 | 0 | 0 | 0 | 0 |
| 8,00h | 1 | 0 | 0 | 0 | 0 | 0 | 0 | 0 | 0 | 0 | 1 | 0 | 0 | 0 | 0 | 0 | 0 | 0 | 0 | 0 |
| 0,01h | 0 | 0 | 0 | 1 | 0 | 0 | 0 | 0 | 0 | 0 | 0 | 0 | 0 | 1 | 0 | 0 | 0 | 0 | 0 | 0 |
| 4,01h | 0 | 1 | 0 | 1 | 0 | 0 | 0 | 0 | 0 | 0 | 0 | 1 | 0 | 1 | 0 | 0 | 0 | 0 | 0 | 0 |
| 7,3Fh | 0 | 1 | 1 | 1 | 1 | 1 | 1 | 1 | 1 | 1 | 0 | 1 | 1 | 1 | 1 | 1 | 1 | 1 | 1 | 1 |
| B,3Fh | 1 | 0 | 1 | 1 | 1 | 1 | 1 | 1 | 1 | 1 | 1 | 0 | 1 | 1 | 1 | 1 | 1 | 1 | 1 | 1 |
| 0,00h | | | | | | | | | | | | | | | | | | | | |
| 4,00h | | | | | | | | | | | | | | | | | | | | |
| 8,00h | | | | | | | | | | | | | | | | | | | | |
| 0,01h | | | | | | | | | | | | | | | | | | | | |
| 4,01h | | | INVALIDATION OF ACM CELL CODE (OUTPUT DATA "0") CONVERSION TO ZERO MASKING CODE 1 1 0 0 * * * * * * | | | | | | | | | | | | | | | | |
| 7,3Fh | | | | | | | | | | | | | | | | | | | | |
| B,3Fh | | | | | | | | | | | | | | | | | | | | |
| ⇨ | 1 | 1 | 0 | 1 | * | * | * | * | * | * | 1 | 1 | 0 | 1 | * | * | * | * | * | * |
| | 1 | 1 | 1 | 0 | * | * | * | * | * | * | 1 | 1 | 1 | 0 | * | * | * | * | * | * |
| | 1 | 1 | 1 | 1 | * | * | * | * | * | * | 1 | 1 | 1 | 1 | * | * | * | * | * | * |

THROUGH

Fig.54

| II | TIME SLOT No. | TIME SLOT No. |
|---|---|---|
| | LSI No3<br>769 CH -1536 CH ⇒ 1 CH-768 CH | LSI No4<br>769 CH -1536 CH ⇒ 769 CH-1536 CH |
| | ACM CELL CODE | ACM CELL CODE |
| | SPACE SW No. | SPACE SW No. |

INVALIDATION OF
ACM CELL CODE
(OUTPUT DATA "0")

CONVERSION TO
ZERO MASKING CODE
1 1 0 0 * * * * * *

| 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|
| 0 | 1 | 0 | 0 | 0 | 0 | 0 | 0 | 0 | 0 | 0 | 1 | 0 | 0 | 0 | 0 | 0 | 0 | 0 | 0 |
| 1 | 0 | 0 | 0 | 0 | 0 | 0 | 0 | 0 | 0 | 1 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 1 | 0 | 0 | 0 | 0 | 0 | 0 |
| 0 | 1 | 0 | 1 | 0 | 0 | 0 | 0 | 0 | 0 | 0 | 1 | 0 | 1 | 0 | 0 | 0 | 0 | 0 | 0 |

| 0 | 1 | 1 | 1 | 1 | 1 | 1 | 1 | 1 | 1 | 0 | 1 | 1 | 1 | 1 | 1 | 1 | 1 | 1 | 1 |
|---|---|---|---|---|---|---|---|---|---|---|---|---|---|---|---|---|---|---|---|
| 1 | 0 | 1 | 1 | 1 | 1 | 1 | 1 | 1 | 1 | 1 | 0 | 1 | 1 | 1 | 1 | 1 | 1 | 1 | 1 |
| 1 | 1 | 0 | 1 | * | * | * | * | * | * | 1 | 1 | 0 | 1 | * | * | * | * | * | * |
| 1 | 1 | 1 | 0 | * | * | * | * | * | * | 1 | 1 | 1 | 0 | * | * | * | * | * | * |
| 1 | 1 | 1 | 1 | * | * | * | * | * | * | 1 | 1 | 1 | 1 | * | * | * | * | * | * |

*:Dont care

Fig.55

CELL No.[0]  ATM CELL SETTING

| CH No. | ACM WRITE CONTROL ||
|---|---|---|
|  | SELECT No | Address |
| CH1 | 1 | 0h |
| CH2 | 1 | 4h |
| CH3 | 1 | 8h |
| CH4 | 2 | 0h |
| CH5 | 2 | 4h |
| CH6 | 2 | 8h |
| CH7 | 3 | 0h |
| CH8 | 3 | 4h |
| CH9 | 3 | 8h |
| CH10 | 4 | 0h |
| CH11 | 4 | 4h |
| CH12 | 4 | 8h |
| CH13 | 1 | 1h |
| CH14 | 1 | 5h |
| CH15 | 1 | 9h |
| CH16 | 2 | 1h |
| CH17 | 2 | 5h |
| CH18 | 2 | 9h |
| CH19 | 3 | 1h |
| CH20 | 3 | 5h |
| CH21 | 3 | 9h |
| CH22 | 4 | 1h |
| CH23 | 4 | 5h |
| CH24 | 4 | 9h |

Fig.56

CELL No.[1]  ATM CELL SETTING

| CH No. | ACM WRITE CONTROL | |
|---|---|---|
|  | SELECT No | Address |
| CH25 | 1 | 2h |
| CH26 | 1 | 6h |
| CH27 | 1 | Ah |
| CH28 | 2 | 2h |
| CH29 | 2 | 6h |
| CH30 | 2 | Ah |
| CH31 | 3 | 2h |
| CH32 | 3 | 6h |
| CH33 | 3 | Ah |
| CH34 | 4 | 2h |
| CH35 | 4 | 6h |
| CH36 | 4 | 3h |
| CH37 | 1 | 3h |
| CH38 | 1 | 7h |
| CH39 | 1 | Bh |
| CH40 | 2 | 3h |
| CH41 | 2 | 7h |
| CH42 | 2 | Bh |
| CH43 | 3 | 3h |
| CH44 | 3 | 7h |
| CH45 | 3 | Bh |
| CH46 | 4 | 3h |
| CH47 | 4 | 7h |
| CH48 | 4 | Bh |

Fig.57

CELL No.[30] — ATM CELL SETTING

| CH No. | ACM WRITE CONTROL ||
|---|---|---|
| | SELECT No | Address |
| CH721 | 61 | 0h |
| CH722 | 61 | 4h |
| CH723 | 61 | 8h |
| CH724 | 62 | 0h |
| CH725 | 62 | 4h |
| CH726 | 62 | 8h |
| CH727 | 63 | 0h |
| CH728 | 63 | 4h |
| CH729 | 63 | 8h |
| CH730 | 64 | 0h |
| CH731 | 64 | 4h |
| CH732 | 64 | 8h |
| CH733 | 61 | 1h |
| CH734 | 61 | 5h |
| CH735 | 61 | 9h |
| CH736 | 62 | 1h |
| CH737 | 62 | 5h |
| CH738 | 62 | 9h |
| CH739 | 63 | 1h |
| CH740 | 63 | 5h |
| CH741 | 63 | 9h |
| CH742 | 64 | 1h |
| CH743 | 64 | 5h |
| CH744 | 64 | 9h |

Fig.58

CELL No.[31] ATM CELL SETTING

| CH No. | ACM WRITE CONTROL ||
|---|---|---|
| | SELECT No | Address |
| CH745 | 61 | 2h |
| CH746 | 61 | 6h |
| CH747 | 61 | Ah |
| CH748 | 62 | 2h |
| CH749 | 62 | 6h |
| CH750 | 62 | Ah |
| CH751 | 63 | 2h |
| CH752 | 63 | 6h |
| CH753 | 63 | Ah |
| CH754 | 64 | 2h |
| CH755 | 64 | 6h |
| CH756 | 64 | 3h |
| CH757 | 61 | 3h |
| CH758 | 61 | 7h |
| CH759 | 61 | Bh |
| CH760 | 62 | 3h |
| CH761 | 62 | 7h |
| CH762 | 62 | Bh |
| CH763 | 63 | 3h |
| CH764 | 63 | 7h |
| CH765 | 63 | Bh |
| CH766 | 64 | 3h |
| CH767 | 64 | 7h |
| CH768 | 64 | Bh |

Fig.59

CELL No.[32]　ATM CELL SETTING

| CH No. | ACM WRITE CONTROL | |
|---|---|---|
| | SELECT No | Address |
| CH769 | 1 | 0h |
| CH770 | 1 | 4h |
| CH771 | 1 | 8h |
| CH772 | 2 | 0h |
| CH773 | 2 | 4h |
| CH774 | 2 | 8h |
| CH775 | 3 | 0h |
| CH776 | 3 | 4h |
| CH777 | 3 | 8h |
| CH778 | 4 | 0h |
| CH779 | 4 | 4h |
| CH780 | 4 | 8h |
| CH781 | 1 | 1h |
| CH782 | 1 | 5h |
| CH783 | 1 | 9h |
| CH784 | 2 | 1h |
| CH785 | 2 | 5h |
| CH786 | 2 | 9h |
| CH787 | 3 | 1h |
| CH788 | 3 | 5h |
| CH789 | 3 | 9h |
| CH790 | 4 | 1h |
| CH791 | 4 | 5h |
| CH792 | 4 | 9h |

Fig.60

CELL No.[33]　ATM CELL SETTING

| CH No. | ACM WRITE CONTROL ||
|---|---|---|
| | SELECT No | Address |
| CH793 | 1 | 2h |
| CH794 | 1 | 6h |
| CH795 | 1 | Ah |
| CH796 | 2 | 2h |
| CH797 | 2 | 6h |
| CH798 | 2 | Ah |
| CH799 | 3 | 2h |
| CH800 | 3 | 6h |
| CH801 | 3 | Ah |
| CH802 | 4 | 2h |
| CH803 | 4 | 6h |
| CH804 | 4 | 3h |
| CH805 | 1 | 3h |
| CH806 | 1 | 7h |
| CH807 | 1 | Bh |
| CH808 | 2 | 3h |
| CH809 | 2 | 7h |
| CH810 | 2 | Bh |
| CH811 | 3 | 3h |
| CH812 | 3 | 7h |
| CH813 | 3 | Bh |
| CH814 | 4 | 3h |
| CH815 | 4 | 7h |
| CH816 | 4 | Bh |

Fig.61

CELL No.[62] ATM CELL SETTING

| CH No. | ACM WRITE CONTROL | |
|---|---|---|
| | SELECT No | Address |
| CH1489 | 61 | 0h |
| CH1490 | 61 | 4h |
| CH1491 | 61 | 8h |
| CH1492 | 62 | 0h |
| CH1493 | 62 | 4h |
| CH1494 | 62 | 8h |
| CH1495 | 63 | 0h |
| CH1496 | 63 | 4h |
| CH1497 | 63 | 8h |
| CH1498 | 64 | 0h |
| CH1499 | 64 | 4h |
| CH1500 | 64 | 8h |
| CH1501 | 61 | 1h |
| CH1502 | 61 | 5h |
| CH1503 | 61 | 9h |
| CH1504 | 62 | 1h |
| CH1505 | 62 | 5h |
| CH1506 | 62 | 9h |
| CH1507 | 63 | 1h |
| CH1508 | 63 | 5h |
| CH1509 | 63 | 9h |
| CH1510 | 64 | 1h |
| CH1511 | 64 | 5h |
| CH1512 | 64 | 9h |

Fig.62

CELL No.[63] — ATM CELL SETTING

| CH No. | ACM WRITE CONTROL ||
|---|---|---|
| | SELECT No | Address |
| CH1513 | 61 | 2h |
| CH1514 | 61 | 6h |
| CH1515 | 61 | Ah |
| CH1516 | 62 | 2h |
| CH1517 | 62 | 6h |
| CH1518 | 62 | Ah |
| CH1519 | 63 | 2h |
| CH1520 | 63 | 6h |
| CH1521 | 63 | Ah |
| CH1522 | 64 | 2h |
| CH1523 | 64 | 6h |
| CH1524 | 64 | 3h |
| CH1525 | 61 | 3h |
| CH1526 | 61 | 7h |
| CH1527 | 61 | Bh |
| CH1528 | 62 | 3h |
| CH1529 | 62 | 7h |
| CH1530 | 62 | Bh |
| CH1531 | 63 | 3h |
| CH1532 | 63 | 7h |
| CH1533 | 63 | Bh |
| CH1534 | 64 | 3h |
| CH1535 | 64 | 7h |
| CH1536 | 64 | Bh |

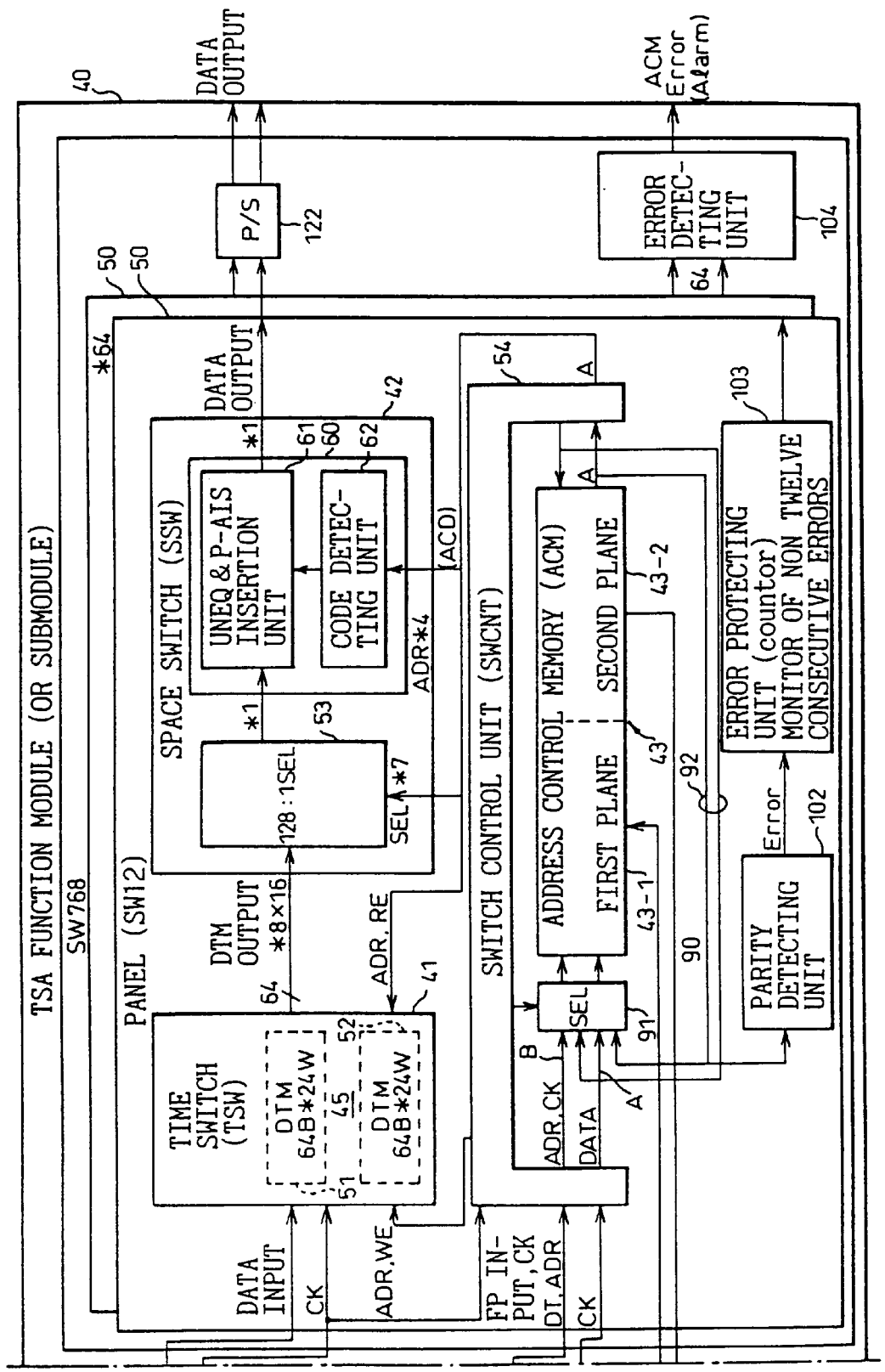

Fig.65

DTM SEQUENTIAL WRITE →T-SW→ DTM RANDOM READ DATA

| | | DTM TIME SLOT No. | | | | | | | | | | | |
|---|---|---|---|---|---|---|---|---|---|---|---|---|---|
| DTM | SPACE SW No. | 0 | 1 | 2 | 3 | 4 | 5 | 6 | 7 | 8 | 9 | A | B |
| STS-48 (2.4G) | 00 | CH 1 | CH 13 | CH 25 | CH 37 | CH 2 | CH 14 | CH 26 | CH 38 | CH 3 | CH 15 | CH 27 | CH 39 |
| | 01 | CH 4 | CH 16 | CH 28 | CH 40 | CH 5 | CH 17 | CH 29 | CH 41 | CH 6 | CH 18 | CH 30 | CH 42 |
| | 02 | CH 7 | CH 19 | CH 31 | CH 43 | CH 8 | CH 20 | CH 32 | CH 44 | CH 9 | CH 21 | CH 33 | CH 45 |
| | 03 | CH 10 | CH 22 | CH 34 | CH 46 | CH 11 | CH 23 | CH 35 | CH 47 | CH 12 | CH 24 | CH 36 | CH 48 |
| STS-48 (2.4G) | 04 | CH 49 | CH 61 | CH 73 | CH 85 | CH 50 | CH 62 | CH 74 | CH 86 | CH 51 | CH 63 | CH 75 | CH 87 |
| | 05 | CH 52 | CH 64 | CH 76 | CH 88 | CH 53 | CH 65 | CH 77 | CH 89 | CH 54 | CH 66 | CH 78 | CH 90 |
| | 06 | CH 55 | CH 67 | CH 79 | CH 91 | CH 56 | CH 68 | CH 80 | CH 92 | CH 57 | CH 69 | CH 81 | CH 93 |
| | 07 | CH 58 | CH 70 | CH 82 | CH 94 | CH 59 | CH 71 | CH 83 | CH 95 | CH 60 | CH 72 | CH 84 | CH 96 |
| STS-48 (2.4G) | 08 | CH 97 | CH 109 | CH 121 | CH 133 | CH 98 | CH 110 | CH 122 | CH 134 | CH 99 | CH 111 | CH 123 | CH 135 |
| | 09 | CH 100 | CH 112 | CH 124 | CH 136 | CH 101 | CH 113 | CH 125 | CH 137 | CH 102 | CH 114 | CH 126 | CH 138 |
| | 0A | CH 103 | CH 115 | CH 127 | CH 139 | CH 104 | CH 116 | CH 128 | CH 140 | CH 105 | CH 117 | CH 129 | CH 141 |
| | 0B | CH 106 | CH 118 | CH 130 | CH 142 | CH 107 | CH 119 | CH 131 | CH 143 | CH 108 | CH 120 | CH 132 | CH 144 |
| STS-48 (2.4G) | 0C | CH 145 | CH 157 | CH 169 | CH 181 | CH 146 | CH 158 | CH 170 | CH 182 | CH 147 | CH 159 | CH 171 | CH 183 |
| | 0D | CH 148 | CH 160 | CH 172 | CH 184 | CH 149 | CH 161 | CH 173 | CH 185 | CH 150 | CH 162 | CH 174 | CH 186 |
| | 0E | CH 151 | CH 163 | CH 175 | CH 187 | CH 152 | CH 164 | CH 176 | CH 188 | CH 153 | CH 165 | CH 177 | CH 189 |
| | 0F | CH 154 | CH 166 | CH 178 | CH 190 | CH 155 | CH 167 | CH 179 | CH 191 | CH 156 | CH 168 | CH 180 | CH 192 |

53 → SEL 128:1 ← 45

Fig.67

DTM TIME SLOT No.

| SPACE SW No. | 0 | 1 | 2 | 3 | 4 | 5 | 6 | 7 | 8 | 9 | A | B |
|---|---|---|---|---|---|---|---|---|---|---|---|---|
| 00 | CH 1 | CH 13 | CH 25 | CH 37 | CH 2 | CH 14 | CH 26 | CH 38 | CH 3 | CH 15 | CH 27 | CH 39 |
| 01 | CH 4 | CH 16 | CH 28 | CH 40 | CH 5 | CH 17 | CH 29 | CH 41 | CH 6 | CH 18 | CH 30 | CH 42 |
| 02 | CH 7 | CH 19 | CH 31 | CH 43 | CH 8 | CH 20 | CH 32 | CH 44 | CH 9 | CH 21 | CH 33 | CH 45 |
| 03 | CH 10 | CH 22 | CH 34 | CH 46 | CH 11 | CH 23 | CH 35 | CH 47 | CH 12 | CH 24 | CH 36 | CH 48 |
| 04 | CH 49 | CH 61 | CH 73 | CH 85 | CH 50 | CH 62 | CH 74 | CH 86 | CH 51 | CH 63 | CH 75 | CH 87 |
| 05 | CH 52 | CH 64 | CH 76 | CH 88 | CH 53 | CH 65 | CH 77 | CH 89 | CH 54 | CH 66 | CH 78 | CH 90 |
| 06 | CH 55 | CH 67 | CH 79 | CH 91 | CH 56 | CH 68 | CH 80 | CH 92 | CH 57 | CH 69 | CH 81 | CH 93 |
| 07 | CH 58 | CH 70 | CH 82 | CH 94 | CH 59 | CH 71 | CH 83 | CH 95 | CH 60 | CH 72 | CH 84 | CH 96 |
| 08 | CH 97 | CH 109 | CH 121 | CH 133 | CH 98 | CH 110 | CH 122 | CH 134 | CH 99 | CH 111 | CH 123 | CH 135 |
| 09 | CH 100 | CH 112 | CH 124 | CH 136 | CH 101 | CH 113 | CH 125 | CH 137 | CH 102 | CH 114 | CH 126 | CH 138 |
| 0A | CH 103 | CH 115 | CH 127 | CH 139 | CH 104 | CH 116 | CH 128 | CH 140 | CH 105 | CH 117 | CH 129 | CH 141 |
| 0B | CH 106 | CH 118 | CH 130 | CH 142 | CH 107 | CH 119 | CH 131 | CH 143 | CH 108 | CH 120 | CH 132 | CH 144 |
| 0C | CH 145 | CH 157 | CH 169 | CH 181 | CH 146 | CH 158 | CH 170 | CH 182 | CH 147 | CH 159 | CH 171 | CH 183 |
| 0D | CH 148 | CH 160 | CH 172 | CH 184 | CH 149 | CH 161 | CH 173 | CH 185 | CH 150 | CH 162 | CH 174 | CH 186 |
| 0E | CH 151 | CH 163 | CH 175 | CH 187 | CH 152 | CH 164 | CH 176 | CH 188 | CH 153 | CH 165 | CH 177 | CH 189 |
| 0F | CH 154 | CH 166 | CH 178 | CH 190 | CH 155 | CH 167 | CH 179 | CH 191 | CH 156 | CH 168 | CH 180 | CH 192 |
| ... | | | | | | | | | | | | |
| 7C | CH 1489 | CH 1501 | CH 1513 | CH 1525 | CH 1490 | CH 1502 | CH 1514 | CH 1526 | CH 1491 | CH 1503 | CH 1515 | CH 1527 |
| 7D | CH 1492 | CH 1504 | CH 1516 | CH 1528 | CH 1493 | CH 1505 | CH 1517 | CH 1529 | CH 1494 | CH 1506 | CH 1518 | CH 1530 |
| 7E | CH 1495 | CH 1507 | CH 1519 | CH 1531 | CH 1496 | CH 1508 | CH 1520 | CH 1532 | CH 1497 | CH 1509 | CH 1521 | CH 1533 |
| 7F | CH 1498 | CH 1510 | CH 1522 | CH 1534 | CH 1499 | CH 1511 | CH 1523 | CH 1535 | CH 1500 | CH 1512 | CH 1524 | CH 1536 |

Fig.68

|  | ATM CELL SETTING CODE |||||||||||
|---|---|---|---|---|---|---|---|---|---|---|---|
|  | CH No. |||||||||||
| CH1 | 0 | 0 | 0 | 0 | 0 | 0 | 0 | 0 | 0 | 0 | 0 |
| CH2 | 0 | 0 | 0 | 0 | 0 | 0 | 0 | 0 | 0 | 0 | 1 |
| CH3 | 0 | 0 | 0 | 0 | 0 | 0 | 0 | 0 | 0 | 1 | 0 |
| CH4 | 0 | 0 | 0 | 0 | 0 | 0 | 0 | 0 | 0 | 1 | 1 |
| CH5 | 0 | 0 | 0 | 0 | 0 | 0 | 0 | 0 | 1 | 0 | 0 |
| ⋮ | | | | | | | | | | | |
| CH767 | 0 | 1 | 0 | 1 | 1 | 1 | 1 | 1 | 1 | 1 | 0 |
| CH768 | 0 | 1 | 0 | 1 | 1 | 1 | 1 | 1 | 1 | 1 | 1 |
| CH769 | 0 | 1 | 1 | 0 | 0 | 0 | 0 | 0 | 0 | 0 | 0 |
| CH770 | 0 | 1 | 1 | 0 | 0 | 0 | 0 | 0 | 0 | 0 | 1 |
| CH771 | 0 | 1 | 1 | 0 | 0 | 0 | 0 | 0 | 0 | 1 | 0 |
| CH772 | 0 | 1 | 1 | 0 | 0 | 0 | 0 | 0 | 0 | 1 | 1 |
| CH773 | 0 | 1 | 1 | 0 | 0 | 0 | 0 | 0 | 1 | 0 | 0 |
| ⋮ | | | | | | | | | | | |
| CH1535 | 1 | 0 | 1 | 1 | 1 | 1 | 1 | 1 | 1 | 1 | 0 |
| CH1536 | 1 | 0 | 1 | 1 | 1 | 1 | 1 | 1 | 1 | 1 | 1 |
| STS-1 UNEQ | 1 | 1 | 0 | * | * | * | * | * | * | * | * |
| STS-Nc UNEQ | 1 | 1 | 1 | 0 | * | * | * | * | * | * | * |
| P-AIS | 1 | 1 | 1 | 1 | * | * | * | * | * | * | * |

Fig.69

TIME SLOT No.

| | LSI No1 -No4 | | | | | | | | | | |
|---|---|---|---|---|---|---|---|---|---|---|---|
| | ACM CELL CODE | | | | | | | | | | |
| | | | | SPACE SW No. | | | | | | | |
| 0,00h | 0 | 0 | 0 | 0 | 0 | 0 | 0 | 0 | 0 | 0 | 0 |
| 4,00h | 0 | 1 | 0 | 0 | 0 | 0 | 0 | 0 | 0 | 0 | 0 |
| 8,00h | 1 | 0 | 0 | 0 | 0 | 0 | 0 | 0 | 0 | 0 | 0 |
| 0,01h | 0 | 0 | 0 | 0 | 0 | 0 | 0 | 0 | 0 | 0 | 1 |
| 4,01h | 0 | 1 | 0 | 0 | 0 | 0 | 0 | 0 | 0 | 0 | 1 |
| 7,3Fh | 0 | 1 | 1 | 1 | 0 | 1 | 1 | 1 | 1 | 1 | 1 |
| B,3Fh | 1 | 0 | 1 | 1 | 0 | 1 | 1 | 1 | 1 | 1 | 1 |
| 0,40h | 0 | 0 | 0 | 0 | 1 | 0 | 0 | 0 | 0 | 0 | 0 |
| 4,40h | 0 | 1 | 0 | 0 | 1 | 0 | 0 | 0 | 0 | 0 | 0 |
| 8,40h | 1 | 0 | 0 | 0 | 1 | 0 | 0 | 0 | 0 | 0 | 0 |
| 0,41h | 0 | 0 | 0 | 0 | 1 | 0 | 0 | 0 | 0 | 0 | 1 |
| 4,41h | 0 | 1 | 0 | 0 | 1 | 0 | 0 | 0 | 0 | 0 | 1 |
| 7,7Fh | 0 | 1 | 1 | 1 | 1 | 1 | 1 | 1 | 1 | 1 | 1 |
| B,7Fh | 1 | 0 | 1 | 1 | 1 | 1 | 1 | 1 | 1 | 1 | 1 |
| | 1 | 1 | 0 | * | * | * | * | * | * | * | * |
| ⇨ | 1 | 1 | 1 | 0 | * | * | * | * | * | * | * |
| | 1 | 1 | 1 | 1 | * | * | * | * | * | * | * |

THROUGH   *:Dont care

Fig. 70

CELL No.[0]  ATM CELL SETTING

| CH No. | ACM WRITE CONTROL | |
|---|---|---|
| | SELECT No | Address |
| CH1 | 1 | 0h |
| CH2 | 1 | 4h |
| CH3 | 1 | 8h |
| CH4 | 2 | 0h |
| CH5 | 2 | 4h |
| CH6 | 2 | 8h |
| CH7 | 3 | 0h |
| CH8 | 3 | 4h |
| CH9 | 3 | 8h |
| CH10 | 4 | 0h |
| CH11 | 4 | 4h |
| CH12 | 4 | 8h |
| CH13 | 1 | 1h |
| CH14 | 1 | 5h |
| CH15 | 1 | 9h |
| CH16 | 2 | 1h |
| CH17 | 2 | 5h |
| CH18 | 2 | 9h |
| CH19 | 3 | 1h |
| CH20 | 3 | 5h |
| CH21 | 3 | 9h |
| CH22 | 4 | 1h |
| CH23 | 4 | 5h |
| CH24 | 4 | 9h |

Fig.71

CELL No.[15]   ATM CELL SETTING

| CH No. | ACM WRITE CONTROL ||
| --- | --- | --- |
| | SELECT No | Address |
| CH361 | 29 | 2h |
| CH362 | 29 | 6h |
| CH363 | 29 | Ah |
| CH364 | 30 | 2h |
| CH365 | 30 | 6h |
| CH366 | 30 | Ah |
| CH367 | 31 | 2h |
| CH368 | 31 | 6h |
| CH369 | 31 | Ah |
| CH370 | 32 | 2h |
| CH371 | 32 | 6h |
| CH372 | 32 | 3h |
| CH373 | 29 | 3h |
| CH374 | 29 | 7h |
| CH375 | 29 | Bh |
| CH376 | 30 | 3h |
| CH377 | 30 | 7h |
| CH378 | 30 | Bh |
| CH379 | 31 | 3h |
| CH380 | 31 | 7h |
| CH381 | 31 | Bh |
| CH382 | 32 | 3h |
| CH383 | 32 | 7h |
| CH384 | 32 | Bh |

Fig.72

CELL No.[30] — ATM CELL SETTING

| CH No. | ACM WRITE CONTROL ||
|---|---|---|
|  | SELECT No | Address |
| CH385 | 1 | 0h |
| CH386 | 1 | 4h |
| CH387 | 1 | 8h |
| CH388 | 2 | 0h |
| CH389 | 2 | 4h |
| CH390 | 2 | 8h |
| CH391 | 3 | 0h |
| CH392 | 3 | 4h |
| CH393 | 3 | 8h |
| CH394 | 4 | 0h |
| CH395 | 4 | 4h |
| CH396 | 4 | 8h |
| CH397 | 1 | 1h |
| CH398 | 1 | 5h |
| CH399 | 1 | 9h |
| CH400 | 2 | 1h |
| CH401 | 2 | 5h |
| CH402 | 2 | 9h |
| CH403 | 3 | 1h |
| CH404 | 3 | 5h |
| CH405 | 3 | 9h |
| CH406 | 4 | 1h |
| CH407 | 4 | 5h |
| CH408 | 4 | 9h |

Fig.73

CELL No.[31]  ATM CELL SETTING

| CH No. | ACM WRITE CONTROL ||
|---|---|---|
| | SELECT No | Address |
| CH745 | 29 | 2h |
| CH746 | 29 | 6h |
| CH747 | 29 | Ah |
| CH748 | 30 | 2h |
| CH749 | 30 | 6h |
| CH750 | 30 | Ah |
| CH751 | 31 | 2h |
| CH752 | 31 | 6h |
| CH753 | 31 | Ah |
| CH754 | 32 | 2h |
| CH755 | 32 | 6h |
| CH756 | 32 | 3h |
| CH757 | 29 | 3h |
| CH758 | 29 | 7h |
| CH759 | 29 | Bh |
| CH760 | 30 | 3h |
| CH761 | 30 | 7h |
| CH762 | 30 | Bh |
| CH763 | 31 | 3h |
| CH764 | 31 | 7h |
| CH765 | 31 | Bh |
| CH766 | 32 | 3h |
| CH767 | 32 | 7h |
| CH768 | 32 | Bh |

Fig.74

CELL No.[32]  — ATM CELL SETTING

| CH No. | ACM WRITE CONTROL | |
|---|---|---|
|  | SELECT No | Address |
| CH769 | 1 | 0h |
| CH770 | 1 | 4h |
| CH771 | 1 | 8h |
| CH772 | 2 | 0h |
| CH773 | 2 | 4h |
| CH774 | 2 | 8h |
| CH775 | 3 | 0h |
| CH776 | 3 | 4h |
| CH777 | 3 | 8h |
| CH778 | 4 | 0h |
| CH779 | 4 | 4h |
| CH780 | 4 | 8h |
| CH781 | 1 | 1h |
| CH782 | 1 | 5h |
| CH783 | 1 | 9h |
| CH784 | 2 | 1h |
| CH785 | 2 | 5h |
| CH786 | 2 | 9h |
| CH787 | 3 | 1h |
| CH788 | 3 | 5h |
| CH789 | 3 | 9h |
| CH790 | 4 | 1h |
| CH791 | 4 | 5h |
| CH792 | 4 | 9h |

Fig.75

CELL No.[47] — ATM CELL SETTING

| CH No. | ACM WRITE CONTROL ||
|---|---|---|
| | SELECT No | Address |
| CH1129 | 29 | 2h |
| CH1130 | 29 | 6h |
| CH1131 | 29 | Ah |
| CH1132 | 30 | 2h |
| CH1133 | 30 | 6h |
| CH1134 | 30 | Ah |
| CH1135 | 31 | 2h |
| CH1136 | 31 | 6h |
| CH1137 | 31 | Ah |
| CH1138 | 32 | 2h |
| CH1139 | 32 | 6h |
| CH1140 | 32 | 3h |
| CH1141 | 29 | 3h |
| CH1142 | 29 | 7h |
| CH1143 | 29 | Bh |
| CH1144 | 30 | 3h |
| CH1145 | 30 | 7h |
| CH1146 | 30 | Bh |
| CH1147 | 31 | 3h |
| CH1148 | 31 | 7h |
| CH1149 | 31 | Bh |
| CH1150 | 32 | 3h |
| CH1151 | 32 | 7h |
| CH1152 | 32 | Bh |

Fig.76

CELL No.[48]   ATM CELL SETTING

| CH No. | ACM WRITE CONTROL ||
|---|---|---|
|  | SELECT No | Address |
| CH1153 | 1 | 0h |
| CH1154 | 1 | 4h |
| CH1155 | 1 | 8h |
| CH1156 | 2 | 0h |
| CH1157 | 2 | 4h |
| CH1158 | 2 | 8h |
| CH1159 | 3 | 0h |
| CH1160 | 3 | 4h |
| CH1161 | 3 | 8h |
| CH1162 | 4 | 0h |
| CH1163 | 4 | 4h |
| CH1164 | 4 | 8h |
| CH1165 | 1 | 1h |
| CH1166 | 1 | 5h |
| CH1167 | 1 | 9h |
| CH1168 | 2 | 1h |
| CH1169 | 2 | 5h |
| CH1170 | 2 | 9h |
| CH1171 | 3 | 1h |
| CH1172 | 3 | 5h |
| CH1173 | 3 | 9h |
| CH1174 | 4 | 1h |
| CH1175 | 4 | 5h |
| CH1176 | 4 | 9h |

Fig.77

CELL No.[63] — ATM CELL SETTING

| CH No. | ACM WRITE CONTROL ||
|---|---|---|
| | SELECT No | Address |
| CH1513 | 29 | 2h |
| CH1514 | 29 | 6h |
| CH1515 | 29 | Ah |
| CH1516 | 30 | 2h |
| CH1517 | 30 | 6h |
| CH1518 | 30 | Ah |
| CH1519 | 31 | 2h |
| CH1520 | 31 | 6h |
| CH1521 | 31 | Ah |
| CH1522 | 32 | 2h |
| CH1523 | 32 | 6h |
| CH1524 | 32 | 3h |
| CH1525 | 29 | 3h |
| CH1526 | 29 | 7h |
| CH1527 | 29 | Bh |
| CH1528 | 30 | 3h |
| CH1529 | 30 | 7h |
| CH1530 | 30 | Bh |
| CH1531 | 31 | 3h |
| CH1532 | 31 | 7h |
| CH1533 | 31 | Bh |
| CH1534 | 32 | 3h |
| CH1535 | 32 | 7h |
| CH1536 | 32 | Bh |

TIME SLOT ASSIGNMENT CIRCUIT

BACKGROUND OF THE INVENTION

1. Field of the Invention

The present invention relates to a multiplex conversion apparatus in a digital synchronous network, more particularly relates to a time slot assignment (TSA) circuit for setting channels in such a multiplex conversion apparatus.

In a digital synchronous network, it is possible to set channels in the time domain (interchange the positions of channels in the rows of time slots) by assignment of time slots at a digital multiplex level (for example, synchronous transport signal (STS)-12, STS-48, etc.) and as a result it is possible to realize a multiplex conversion apparatus. The present invention deals with such a TSA circuit, in particular a TSA circuit which can easily handle increases in the transmission rate and increases in the volume of transmission and operates with high efficiency and offers a high degree of freedom in combination of channel settings.

2. Description of the Related Art

With the rate of transmission and the volume of communication both expected to increase in the future, a transmission system which is high in efficiency and which offers a high degree of freedom in combination of channel settings is being demanded. Along with the increase in the volume of communications, however, both the size of the circuit of course and also the number of channels have been increasing and as a result the number of combinations of channel settings has increased as well. If attempting to realize such combinations with the circuit of the related art, explained later, however, the number of nets becomes tremendous and the margin in timing becomes insufficient. Further, the layout on the chip becomes difficult. These and other difficulties can obstruct development.

While there have been remarkable advances made in the technology for integration of large size integrated circuits (LSIs) in recent years, there are still various limitations. These limitations are obstacles in realizing a TSA function in circuit design. More specifically, in the case of STS-48 (2.4 Gbps) level TSA (setting of channels), that is, STS-48 TSA, of the related art, it was sufficient to realize 2304 combinations of channels. As opposed to this, in the future with STS-192 TSA, it will be necessary to realize 36,864 combinations of channels. Consequently, the circuit would have to be 16 times the size of that for STS-48 TSA.

In addition to this increase in the size of the circuit, the rate of transmission (bit rate of signals to be processed) is also becoming higher, so naturally the power consumption is also increasing.

Consequently, if the conventional configuration of a TSA circuit comprised of only logic circuits is applied as it is to STS-192 TSA, there would be the problem of disadvantages in terms of the circuit size, power consumption, margin of timing, and degree of integration on the chip (number of nets) etc.

In view of this situation, as will be explained in detail later, the present invention first of all splits off and makes independent the TSA circuit. This split off independent TSA circuit is comprised of a working side TSA circuit and a protection side TSA circuit.

A look at these working side TSA circuit and protection side TSA circuit shows that in the conventional TSA circuit (2.4 Gbps), processing was performed in units of bytes and when the volume of transmission increases about 16 (=40/2.4)-fold, the above-mentioned number of combinations of channels would become a large 589,824. If using the conventional configuration of a TSA circuit as it is, simulation shows that the size of the circuit would increase 256-fold and that there would be the problem of an extreme difficulty in realizing the TSA circuit (40 Gbps) from the viewpoint of the margin layout etc.

The above TSA circuit (40 Gbps) is an independent working/protection type TSA circuit constituted by a mutually independent working side TSA circuit part and protection side TSA circuit part. That is, it is a TSA circuit in which TSA is neither performed from the working side to the protection side nor performed from the protection side to the working side.

Some users, however, may demand that TSA be also performed between the working side transmission data (40 Gbps) and the protection side transmission data (40 Gbps).

Such a mixed working/protection type TSA circuit would be an 80 (=40+40) Gbps TSA circuit. As explained above, the TSA circuit (2.4 Gbps) of the related art performs processing in byte units, so if the transmission volume increases as large as about 32 (=80/2.4)-fold, the number of combinations of channels would reach 2,359,296. Therefore if the conventional configuration of a TSA circuit is applied as it is, simulation shows that the circuit would increase in size 1024-fold and there would be the problem of realization of such a TSA circuit (80 Gbps) becoming substantially impossible from the viewpoint of the margin layout etc.

SUMMARY OF THE INVENTION

Accordingly, in consideration of the above problems, an object of the present invention is to provide a high speed and large capacity TSA circuit able to be realized by combination of a plurality of identical modular circuits without causing a tremendous increase in the size of the circuit.

To attain the above object, the present invention provides a TSA circuit which receives as input upper side incoming transmission data from a super high speed ring network and lower side incoming transmission data from a high speed ring network and outputs upper side outgoing transmission data to the super high speed ring network and lower side outgoing transmission data to the high speed ring network. The TSA circuit is provided with a TSA function block which has a time switch and a space switch to produce outgoing transmission data obtained by interchanging channels for the incoming transmission data in units of bits.

Due to this, a TSA circuit is realized which performs TSA processing on high speed and large volume incoming transmission data to interchange channels and output the resultant outgoing transmission data by a relatively small sized circuit configuration.

BRIEF DESCRIPTION OF THE DRAWINGS

The above object and features of the present invention will be more apparent from the following description of the preferred embodiments given with reference to the accompanying drawings, wherein:

FIG. 6 is a first part of a view of the frame format of an upper side incoming transmission data;

FIG. 7 is a second part of a view of the frame format of an upper side incoming transmission data;

FIG. 8 is a first part of a view of the frame format of a lower side incoming transmission data;

FIG. 9 is a second part of a view of the frame format of a lower side incoming transmission data;

FIG. 10 is a view of a second system configuration provided with the TSA circuit according to the present invention;

FIG. 14 is a first part of a view of the frame format of upper side transmission data of a working side in FIG. 11;

FIG. 15 is a second part of a view of the frame format of upper side transmission data of a working side in FIG. 11;

FIG. 16 is a first part of a view of the frame format of lower side transmission data of a working side in FIG. 11;

FIG. 17 is a second part of a view of the frame format of lower side transmission data of a working side in FIG. 11;

FIG. 18 is a first part of a view of the frame format of upper side transmission data of a protection side in FIG. 11;

FIG. 19 is a second part of a view of the frame format of upper side transmission data of a protection side in FIG. 11;

FIG. 20 is a first part of a view of the frame format of lower side transmission data of a protection side in FIG. 11;

FIG. 21 is a second part of a view of the frame format of lower side transmission data of a protection side in FIG. 11;

FIG. 22 is a view of the configuration of a TSA function module 25 in FIG. 12;

FIG. 32 is a first part of a view of a detailed example of the inside of the data memory in FIG. 30 and FIG. 31;

FIG. 33 is a second part of a view of a detailed example of the inside of the data memory in FIG. 30 and FIG. 31;

FIG. 34 is a third part of a view of a detailed example of the inside of the data memory in FIG. 30 and FIG. 31;

FIG. 35 is a fourth part of a view of a detailed example of the inside of the data memory in FIG. 30 and FIG. 31;

FIG. 36 is a first part of a view of an example of the operation of the data converting unit shown in FIG. 28;

FIG. 37 is a second part of a view of an example of the operation of the data converting unit shown in FIG. 28;

FIG. 38 is a first part of a view of an example of the operation of the address converting unit shown in FIG. 28;

FIG. 39 is a second part of a view of an example of the operation of the address converting unit shown in FIG. 28;

FIG. 40 is a third part of a view of an example of the operation of the address converting unit shown in FIG. 28;

FIG. 41 is a fourth part of a view of an example of the operation of the address converting unit shown in FIG. 28;

FIG. 42 is a fifth part of a view of an example of the operation of the address converting unit shown in FIG. 28;

FIG. 43 is a sixth part of a view of an example of the operation of the address converting unit shown in FIG. 28;

FIG. 44 is a seventh part of a view of an example of the operation of the address converting unit shown in FIG. 28;

FIG. 45 is an eighth part of a view of an example of the operation of the address converting unit shown in FIG. 28;

FIG. 50 is a view of a detailed example of the inside of the data memory in FIG. 48;

FIG. 51 is a view of a detailed example of the inside of the data memory in FIG. 49;

FIG. 52 is a first part of a view of an example of the operation of the data converting unit shown in FIG. 46;

FIG. 53 is a second part of a view of an example of the operation of the data converting unit shown in FIG. 46;

FIG. 54 is a third part of a view of an example of the operation of the data converting unit shown in FIG. 46;

FIG. 55 is a first part of a view of an example of the operation of the address converting unit shown in FIG. 46;

FIG. 56 is a second part of a view of an example of the operation of the address converting unit shown in FIG. 46;

FIG. 57 is a third part of a view of an example of the operation of the address converting unit shown in FIG. 46;

FIG. 58 is a fourth part of a view of an example of the operation of the address converting unit shown in FIG. 46;

FIG. 59 is a fifth part of a view of an example of the operation of the address converting unit shown in FIG. 46;

FIG. 60 is a sixth part of a view of an example of the operation of the address converting unit shown in FIG. 46;

FIG. 61 is a seventh part of a view of an example of the operation of the address converting unit shown in FIG. 46;

FIG. 62 is an eighth part of a view of an example of the operation of the address converting unit shown in FIG. 46;

FIG. 64 is a second part of a specific example of a TSA function module (36) of the type shown in FIG. 26;

FIG. 65 is a first part of a schematic view of an address control memory, data memory, and selector in FIG. 64;

FIG. 67 is a view of a detailed example of the inside of a data memory in FIG. 65 and FIG. 66;

FIG. 68 is a first part of a view of an example of the operation of the data converting unit shown in FIG. 63;

FIG. 69 is a second part of a view of an example of the operation of the data converting unit shown in FIG. 63;

FIG. 70 is a first part of a view of an example of the operation of the address converting unit shown in FIG. 63;

FIG. 71 is a second part of a view of an example of the operation of the address converting unit shown in FIG. 63;

FIG. 72 is a third part of a view of an example of the operation of the address converting unit shown in FIG. 63;

FIG. 73 is a fourth part of a view of an example of the operation of the address converting unit shown in FIG. 63;

FIG. 74 is a fifth part of a view of an example of the operation of the address converting unit shown in FIG. 63;

FIG. 75 is a sixth part of a view of an example of the operation of the address converting unit shown in FIG. 63;

FIG. 76 is a seventh part of a view of an example of the operation of the address converting unit shown in FIG. 63;

FIG. 77 is an eighth part of a view of an example of the operation of the address converting unit shown in FIG. 63;

DESCRIPTION OF THE PREFERRED EMBODIMENTS

Before describing the embodiments of the present invention, the related art and the disadvantages therein will be described with reference to the related figures.

Figure 78:
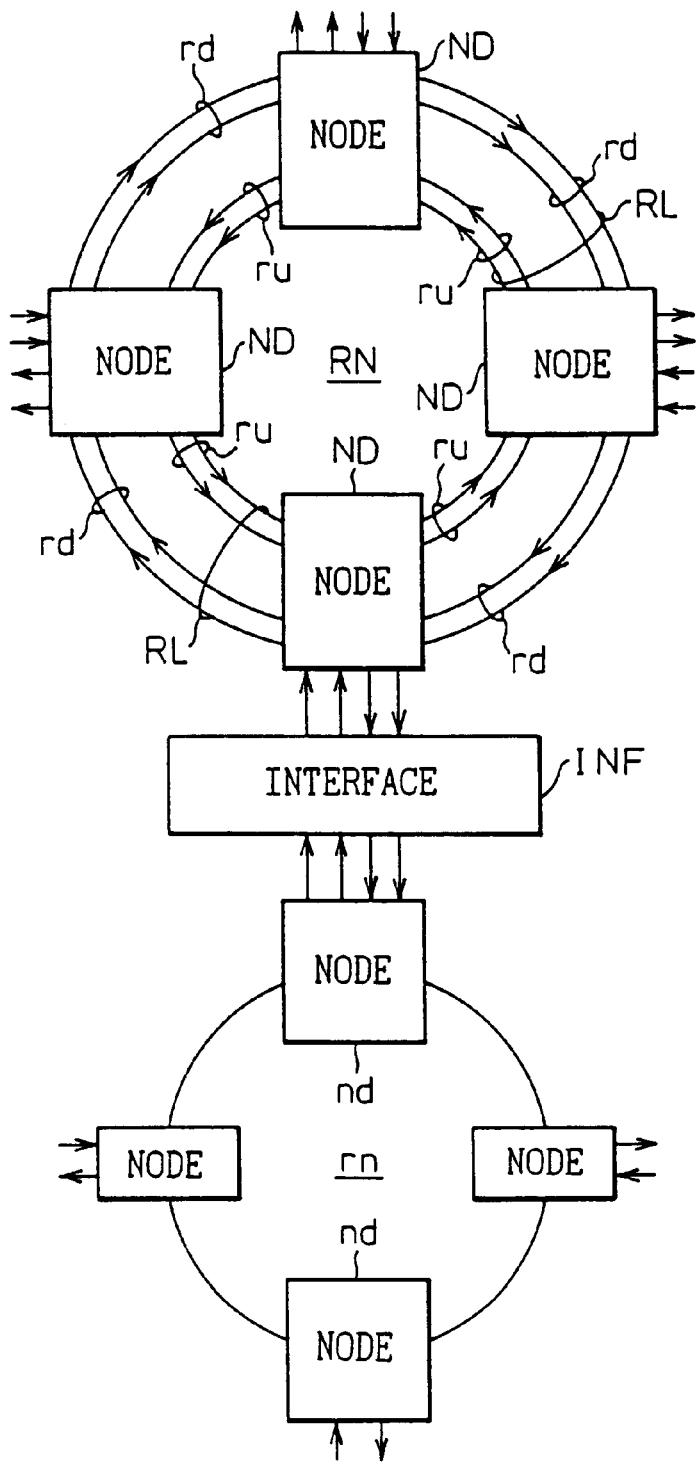
FIG. 78 is a view of a ring network of an example of application of the present invention.

FIG. 78 is a view of a ring network of an example of application of the present invention. In the figure, rn indicates a high speed ring network. A plurality of nodes (nd) are inserted along this ring, whereby an add drop multiplexer (ADM) ring is constituted as a whole. In the figure, for simplification, only one high speed ring network (rn) is shown. Here, the high speed ring network (rn) has a data transmission rate of for example 2.4 Gbps.

There have recently been rapid advances made in multimedia systems and software. Along with this, there is a demand for assembling a number of high speed ring networks (rn) to form a further larger ring network. A super high speed ring network (RN) has been introduced for this purpose. This connects high speed ring networks (rn) through interfaces INF.

The super high speed ring network (RN) is constituted by a ring transmission line RL. This ring transmission line RL is comprised of an upstream pair of optical fibers (ru) and a downstream pair of optical fibers (rd). A plurality of nodes (ND) are inserted into the pairs of optical fibers to constitute an add drop multiplex (ADM) ring as a whole. The data transmission rate of this super high speed ring network (RN) is for example 10 Gbps.

Figure 79:
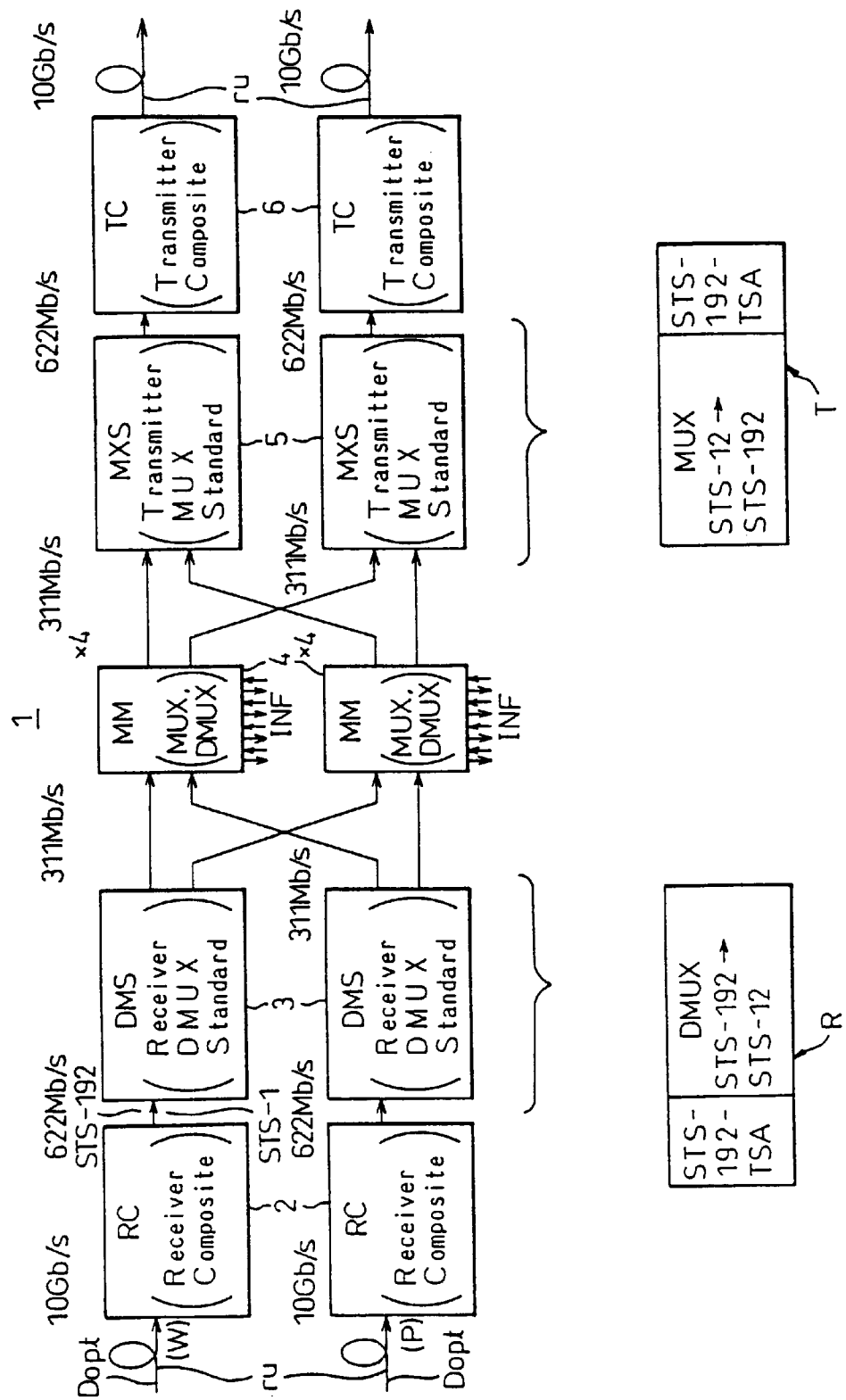
FIG. 79 is a block diagram of the main parts of the nodes (ND, nd) shown in FIG. 78.

FIG. 79 is a block diagram of the main parts of the noes (ND, nd) shown in FIG. 78. This main part in each case is the multiplex conversion apparatus 1. Note that in the figure, the node (ND) of the super high speed ring network (RN) side is shown as a representative example.

The multiplex conversion apparatus 1 comes in two types: one connected to the fore-mentioned upstream pair of optical fibers (ru) and one connected to the fore-mentioned downstream pair of optical fibers (rd). Both have the identical configuration, therefore in the figure the example of the former case (ru) is shown. Note that one of the pair of optical fibers (ru) is for the working side while the other of the optical fibers is for the protection side.

An optical data signal Dopt of for example 10 Gbps input from the left end of FIG. 79 is converted from an optical to an electrical signal (O/E) at a receiver unit (RC) 2 to obtain an electrical signal, for example, an STS-192 (Synchronous Transport Signal-192). This STS-192 is a signal comprised of 192 multiplexed channels of STS-1's (51.84 Mbps). Here, this STS-192 is converted in format to STS-12 (622 Mbps). Note that 16 groups of STS-12's fed from 16 routes are collected to constitute the STS-192.

The signal constituted by the collected 16 groups of STS-12's is demultiplexed into the 16 groups of STS-12's at the next demultiplex unit (DMS) and the overheads (OH) thereof are extracted. Then the result is further applied to the multiplex/demultuiplex unit (MUX.DMUX) 4. Here, the lines cross between the working side (W) and protection side (P) to switch from the working side and the protection side due to a fault etc. if it occurs.

The multiplex/demultiplex unit (MM) 4 drops (splits) data signals to the interface INF side shown in FIG. 78 and adds (inserts) data signals from that interface INF side.

The transmission side multiplex unit (MXS) 5 multiplexes again both the data signal added and dropped by the multiplex/demultiplex unit 4 and the data signal not added or dropped but passing through the node as it is, converts the 16 groups of STS-12's to an STS-192, and inputs the result to a transmitter composite unit (TC) 6. The transmitter composite unit (TC) 6 converts the electrical STS-192 to an optical signal (E/O) and sends it again to the upstream pair of optical fibers (ru).

In the blocks of the above-mentioned FIG. 79, the block R at the lower part of the figure means that the TSA (setting of channels) is performed on the super multiplex level of for example a 10 Gbps STS-192 at the reception side (drop side) and that simultaneously with this TSA, the format is converted from an STS-192 to an STS-12. On the other hand, the block T means that the TSA (setting of channels) is performed on the multiplex level of for example a 10 Gbps STS-192 at the transmission side (add side) and that preferably simultaneously with this TSA, the format is converted from an STS-12 to an STS-192.

If the above operations (R and T) are attempted to be performed based on the related art, there would be disadvantages in each of the points of the circuit size, power consumption, margin of timing, and degree of integration on the chip (number of nets) etc. The related art will be explained below.

Figure 80:
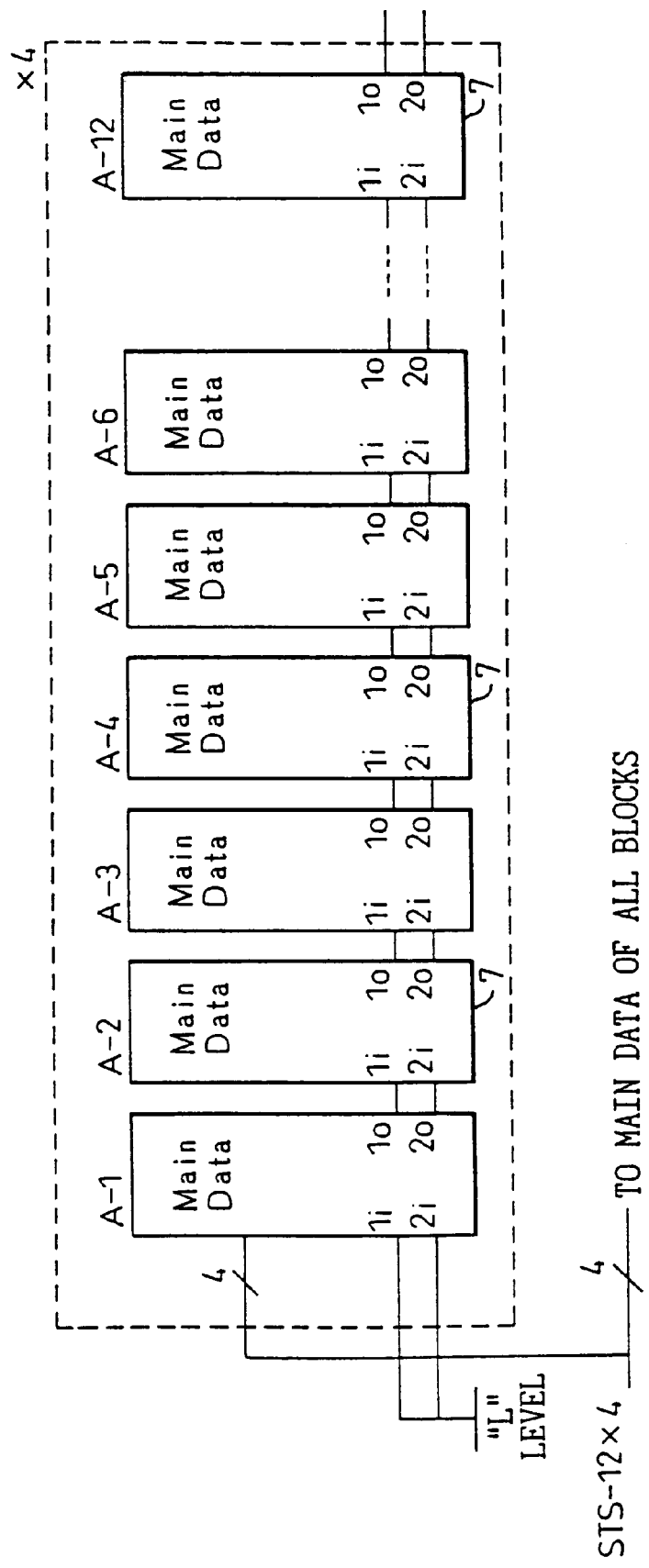
FIG. 80 is a view of the basics of a TSA circuit of the related art.
Figure 81:
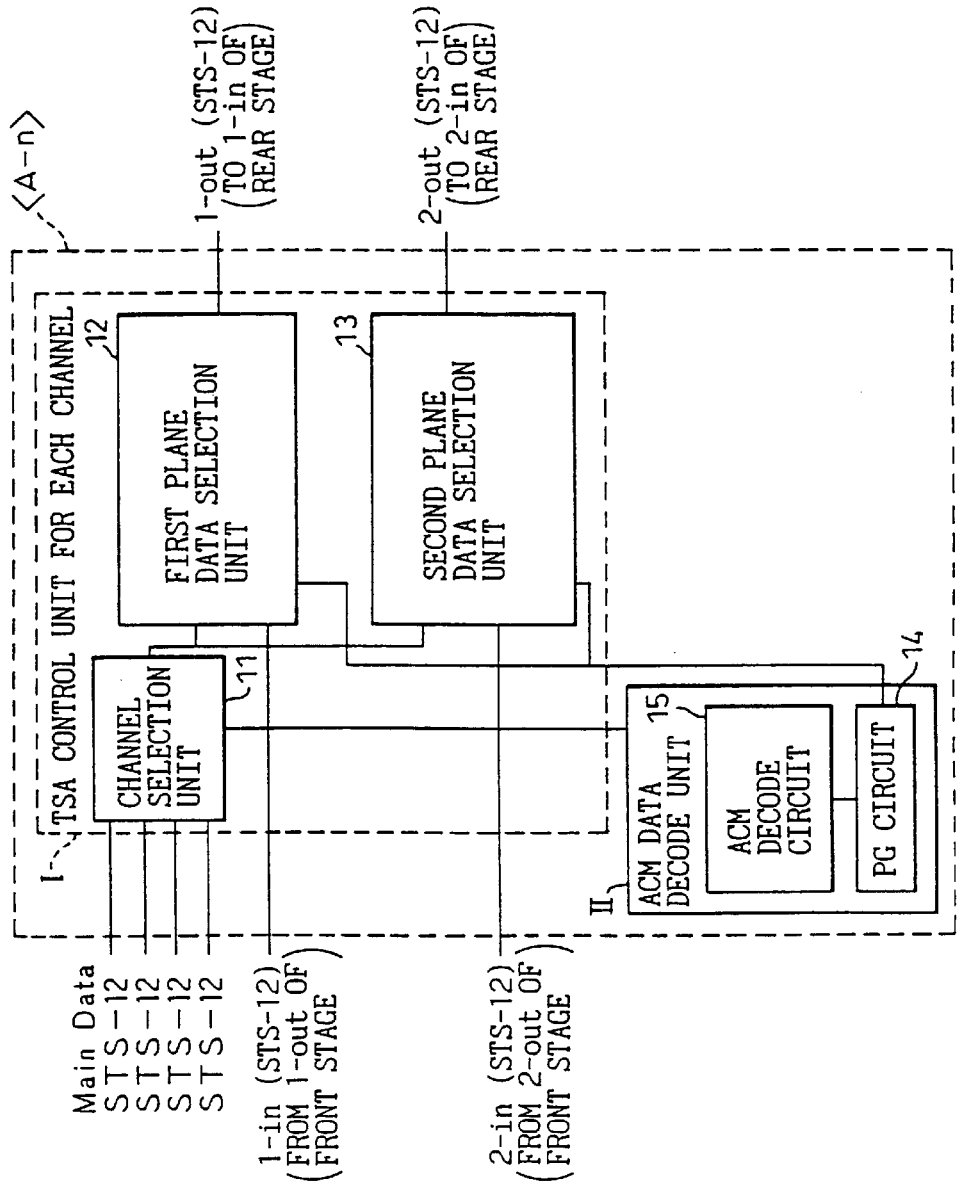
FIG. 81 is a view of details of one stage <A–n> in the circuit shown in FIG. 80.

FIG. 80 is a view of the basics of a TSA circuit of the related art; and FIG. 81 is a view of details of one stage <A=n> in the circuit shown in FIG. 80. The following explanation will be made with reference to FIG. 80 and FIG. 81. Note that the TSA circuit of the related art shown here is a TSA circuit built into a node (nd) inserted in the 2.4 Gbps (that is, STS-48) high speed ring network (rn) shown in FIG. 78.

The TSA circuit of the related art has two sets of a combining circuit and register for each channel (CH) unit.

TSA (channel setting) is performed for each block unit. By connecting these serially, the TSA for all channels (CH) is realized.

Further, since the transmission capacity is of an STS-48 (2.4 Gbps) level for example, that is, a relatively low speed data signal compared with the above STS-192 (10 Gbps), the TSA circuit can be realized by providing the simple circuits (shift registers 7) shown in FIG. 80 and FIG. 81 in channel (CH) units and connecting the same in cascade.

In FIG. 81, I is a channel unit TSA control unit. The control unit includes a channel selection unit 11 for 4:1 selection in the lengthwise direction of the main data signal by TSA (channel setting) from the outside, a first plane data selection unit 12 for selecting and holding the data from the channel selection unit 11 or the data from the previous channel unit TSA control unit I, and a second plane data selection unit 13 for selecting and holding the data from the channel selection unit 11 or the data from the previous channel unit TSA control unit I in the same way as the first plane data selection unit 12. The circuits of the first plane data selection unit 12 and the second plane data selection unit 13 are complementary in configuration. When the first plane data selection unit 12 is reading data, and the second plane data selection unit 3 is writing data, while conversely when the first plane data selection unit 12 is writing data, the second plane data selection unit 13 is reading data.

II indicates an address control memory (ACM) data decode unit. The unit includes a pulse generator (PG) circuit 14 for generating the timing of the CH unit TSA control unit I and an address control memory decode circuit 15 for decoding an address control memory code input from the outside.

Twelve pairs A of the above channel unit TSA control unit I and address control memory data decode unit II are connected serially as shown by A-1, A-2, . . . A-12 in FIG. 80 to enable channel setting (TSA) of STS-12. By providing four groups of this for the main signal (main data), TSA for all channels (CH) is realized. Note that the 1*i,* 1*o,* 2*i,* 2*o,* etc. shown in FIG. 80 are shown as 1-in, 1-out, 2-in, and 2-out in FIG. 81.

As explained above, with the rate of transmission and the volume of communications both expected to increase in the future, a transmission system which is high in efficiency and which offers a high degree of freedom of combination of channel settings is being demanded. Along with the increase in the volume of communications, however, both the size of the circuit of course and also the number of channels have been increasing and as a result the number of combinations of channel settings have increased as well. If attempting to realize such combinations with the circuit of the related art, however, the number of nets becomes tremendous and the margin in timing becomes insufficient. Further, the layout on the chip becomes difficult. These and other difficulties can obstruct development.

Further, as mentioned above, while there have been remarkable advantages made in the integration technology for LSIs in recent years, there are still various limitations. These limitations are obstacles in realizing the TSA function in circuit design. More specifically, in the STS-48 (2.4 Gbps) level TSA (setting of channels), that is, the STS-48-TSA, of the related art, it was sufficient to realize 2304 combinations of channels. As opposed to this, in the future, with the STS-192-TSA, it will be necessary to realize 36,864 combinations of channels. Consequently, the circuit would have to be 16 times the size of that of the STS-48-TSA.

In addition to this increase in the size of the circuit, the rate of transmission (bit rate of signal to be processed) is also becoming higher, so naturally the power consumption is also increasing.

Consequently, if the conventional configuration of a TSA circuit comprised of only logic circuits were applied as it was to the STS-192 TSA, there would be the problem of disadvantages in terms of the circuit size, power consumption, margin of timing, and degree of integration on the chip (number of nets) etc.

In view of this situation, the present invention provides first of all splits off independent TSA circuit. This split off independent TSA circuit is formed, as a routing means, at a portion interfacing the super high speed ring (RN) and the high speed ring network (rn) (shown in FIG. 78). Realization of such a routing means (TSA circuit) however is not simple. Referring again to FIG. 78, the above routing means (TSA circuit) is a main part of the interface INF in the figure.

This being so, the TSA circuit functions to perform the TSA between the working side transmission data Dwku of the super high speed ring network (RN) side (hereinafter also called the upper side) and the working side transmission data Dwkl of the high speed ring network (rn) side (hereinafter also called the lower side). Here, the upper side working side transmission data Dwku has a speed of 20 Gbps, while the lower side working side transmission data Dwkl also has a speed of 20 Gbps, so the TSA circuit is provided with a 40 (=20+20) Gbps working side TSA circuit.

Similarly, the TSA circuit functions to perform the TSA between the protection side transmission data Dptu of the super high speed ring network (RN) side (hereinafter also called the upper side) and the protection side transmission data Dptl of the high speed ring network (rn) side (hereinafter also called the lower side). Here, the upper side protection side transmission data Dptu has a speed of 20 Gbps, while the lower side protection side transmission data Dptl also has a speed of 20 Gbps, so the TSA circuit is provided with a 40 (=20+20) Gbps protection side TSA circuit.

A look at this working side TSA circuit and protection side TSA circuit shows that in the conventional TSA circuit (2.4 Gbps), processing was performed in units of bytes and when the volume of transmission increases about 16 (=40/2.4)-fold, the above-mentioned number of combinations of channels becomes a large 589,824. If using the conventional configuration of a TSA circuit as it is, simulation shows that the size of the circuit would increase 256-fold and that there would be the problem of an extreme difficulty in realizing the TSA circuit (40 Gbps) from the viewpoint of the margin layout etc.

The above TSA circuit (40 Gbps) is an independent working/protection type TSA circuit constituted by a mutually independent working side TSA circuit part and protection side TSA circuit part. That is, it is a TSA circuit in which TSA is neither performed from the working side to the protection side nor performed from the protection side to the working side.

Some users, however, may demand that TSA be also performed between the working side transmission data (40 Gbps) and the protection side transmission data (40 Gbps).

Such a mixed working/protection type TSA circuit would be an 80 (=40+40) Gbps TSA circuit. As explained above, the TSA circuit (2.4 Gbps) of the related art performs processing in byte units, so if the transmission volume increases as large as above 32 (=80/2.4)-fold, the number of combinations of channels would reach 2,359,296. Therefore, if the conventional configuration of a TSA circuit is applied as it is, simulation shows that the circuit would increase in size 1024-fold and there would be the problem of realization of such a TSA circuit (80 Gbps) becoming substantially impossible from the viewpoint of the margin layout etc.

Therefore, the present invention provides a high speed and large capacity TSA circuit able to be realized by combination of a plurality of identical modular circuits without causing a tremendous increase in the size of the circuit.

Figure 1:
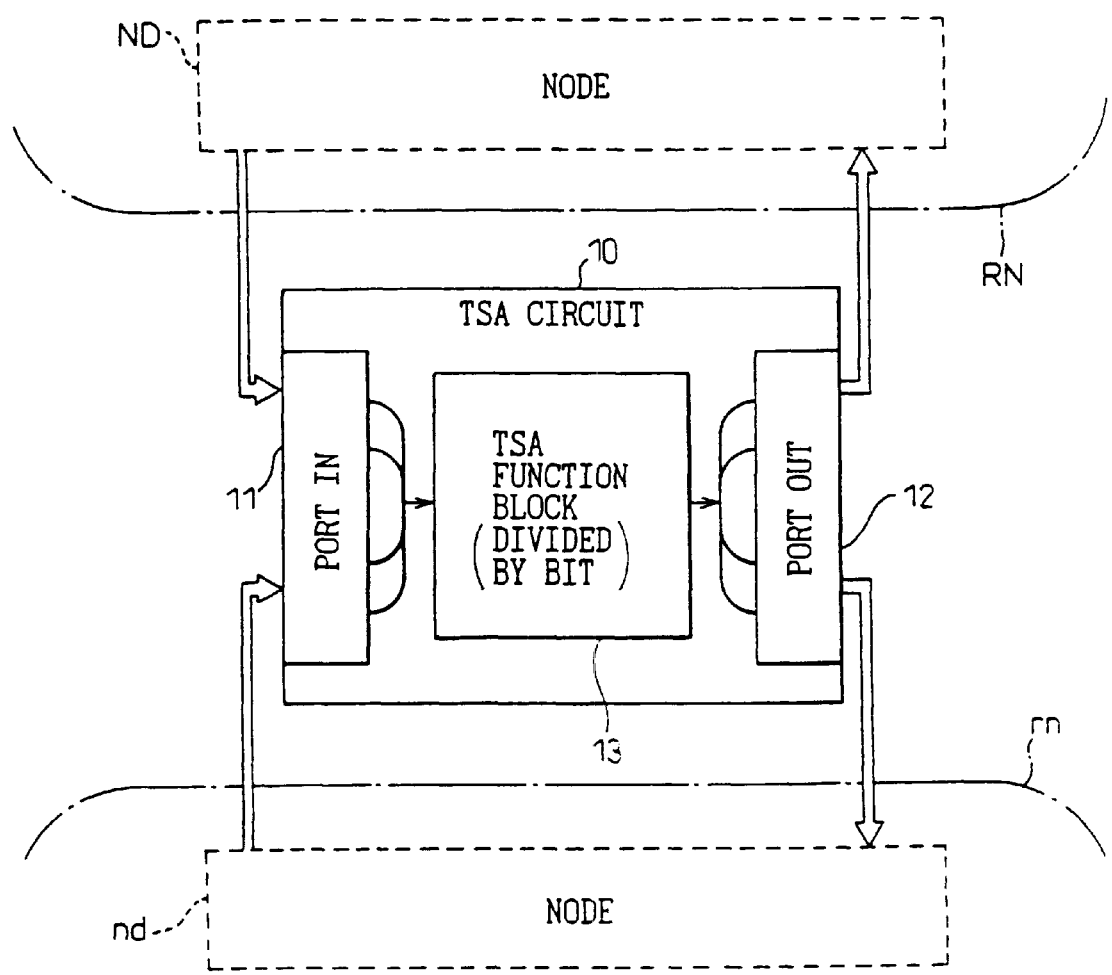
FIG. 1 is a view of the basic configuration of a TSA circuit according to the present invention.

FIG. 1 is a view of the basic configuration of a TSA circuit according to the present invention. In the figure, reference numeral 10 indicates a TSA circuit, 11 an input port (IN), 12 an output port (OUT), and 13 a TSA function block.

The other elements, that is, the nodes (ND) in the super high ring network (RN) and the nodes (nd) in the high speed ring network (rn), are as shown in FIG. 1.

The above components 11, 12 and 13 will be explained in further detail below.

The input port 11 receives as input the upper side incoming transmission data from the super high ring network (RN) and the lower side incoming transmission data from the high speed ring network (rn).

The upper side outgoing transmission data is output from the output port 12 to the super high speed ring network (RN) and the lower side outgoing transmission data is output to the high speed ring network (rn).

The TSA function block 13 has a time switch and a space switch therein and supplies outgoing transmission data, obtained by interchanging channels for the incoming transmission data from the input port 11 in bit units, to the output port 12.

According to conventional thinking, a TSA circuit is provided in the upper side node (ND) and also another TSA circuit is provided in the lower side node (nd).

This configuration, however, viewing the communications network as a whole, means as increased amount of hardware and therefore is uneconomical. Therefore, the present invention, in consideration of the common existence, in the related art, of the TSA circuits in both the nodes (ND) and the nodes (nd), adopts a TSA means combining these two into one. This TSA means is arranged at the interface portion between the upper side ring network (RN) and lower side ring network (rn). Specifically, this is the TSA circuit 10 according to the present invention.

More preferably, the TSA function block 13 is divided for each bit and performs the TSA. Specifically, the block 13 performs the TSA processing on the channels constituting the input groups of multiplex level (for example, STS-48) transmission data in bit units, that is, bit by bit.

For example, when the channel nos (numbers). 1 to 32 (one channel being comprised of 8 bits) are input, the above TSA function block 13 includes a first TSA function module which simultaneously processes the 32 most significant bits (MSB's) extracted from the respective channel nos. 1 to 32, a second TSA function module which simultaneously processes the 32 second bits extracted from the respective channel nos. 1 to 32, a third TSA function module which simultaneously processes the 32 third bits extracted from the respective channel nos. 1 to 32, . . . , and an eighth TSA function module which simultaneously processes the 32 least significant bits (LSB's) extracted from the respective channel nos. 1 to 32.

Here, the first to eighth TSA function modules operate exactly the same way, so may be the same as each other in configuration. As a result, it is possible to realize a 40 Gbps or 80 Gbps TSA circuit without an increase in the size of the circuit. Further, it is possible to realize a low power consumption TSA circuit.

Figure 2:
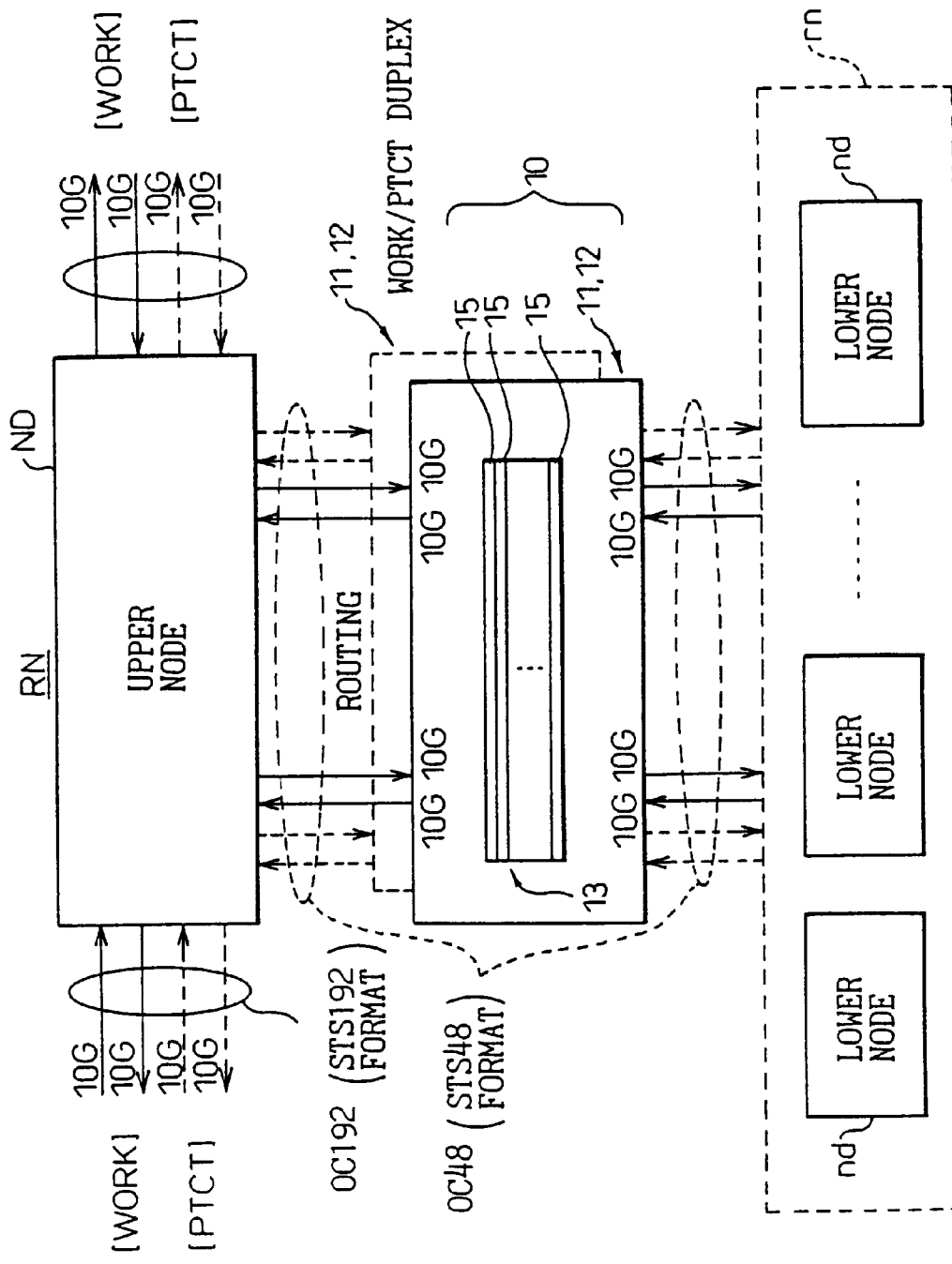
FIG. 2 is a view of a first system configuration provided with the TSA circuit of the present invention.

FIG. 2 is a view of a first system configuration provided with the TSA circuit according to the present invention. In the figure, the node (ND) of the super high speed ring network (RN) side (upper side) inserts (ADD), draws (DROP), and passes (THROUGH) the working side transmission data (e.g., 10 Gbps upstream data and 10 Gbps downstream data) and protection side (PTCT) transmission data (e.g., 10 Gbps upstream data and 10 Gbps downstream data).

On the other hand, the high speed ring network (rn) side (lower side) has a plurality of nodes (nd). Each node handles for example 2.4 Gbps transmission data. One tributary node (nd) among these nodes inserts (ADD) transmission data to the node (ND) side or draws (DROP) transmission data from the node (ND) side.

Therefore, the TSA circuit 10 of the present invention, which performs routing between the two ring networks (RN and rn), operates as a 40 Gbps TSA circuit. The TSA circuit 10 is comprised of the already mentioned input port 11, output port 12, and TSA function block 13. The TSA function block 13 is comprised of eight TSA function modules 15 which perform TSA processing on the 8 bits of transmission data from the MSB to LSB of, in bit units, each channel of the plurality of channels forming the incoming transmission data. It processes the working side transmission data by the working side TSA function block 13 (provided in the TSA circuit 10 shown by the solid line in FIG. 2) and processes the protection side transmission data by the protection side TSA function block (provided in the TSA circuit 10 shown by the dotted line in FIG. 2).

That is, the TSA function block in FIG. 2 is comprised of

<1> a working side TSA function block (13) for processing only the working side upper side incoming transmission data and lower side incoming transmission data and the working side upper side outgoing transmission data and lower side outgoing transmission data and <2> a protection side TSA function block (13) for processing only the protection side upper side incoming transmission data and lower side incoming transmission data and the protection side upper side outgoing transmission data and lower side outgoing transmission data.

Note that positions of the input port 11 and the output port 12 shown in FIG. 2 differ from the positions of the input port 11 and the output port 12 shown in FIG. 1, but there is no difference in the functions of these ports themselves.

Figure 3:
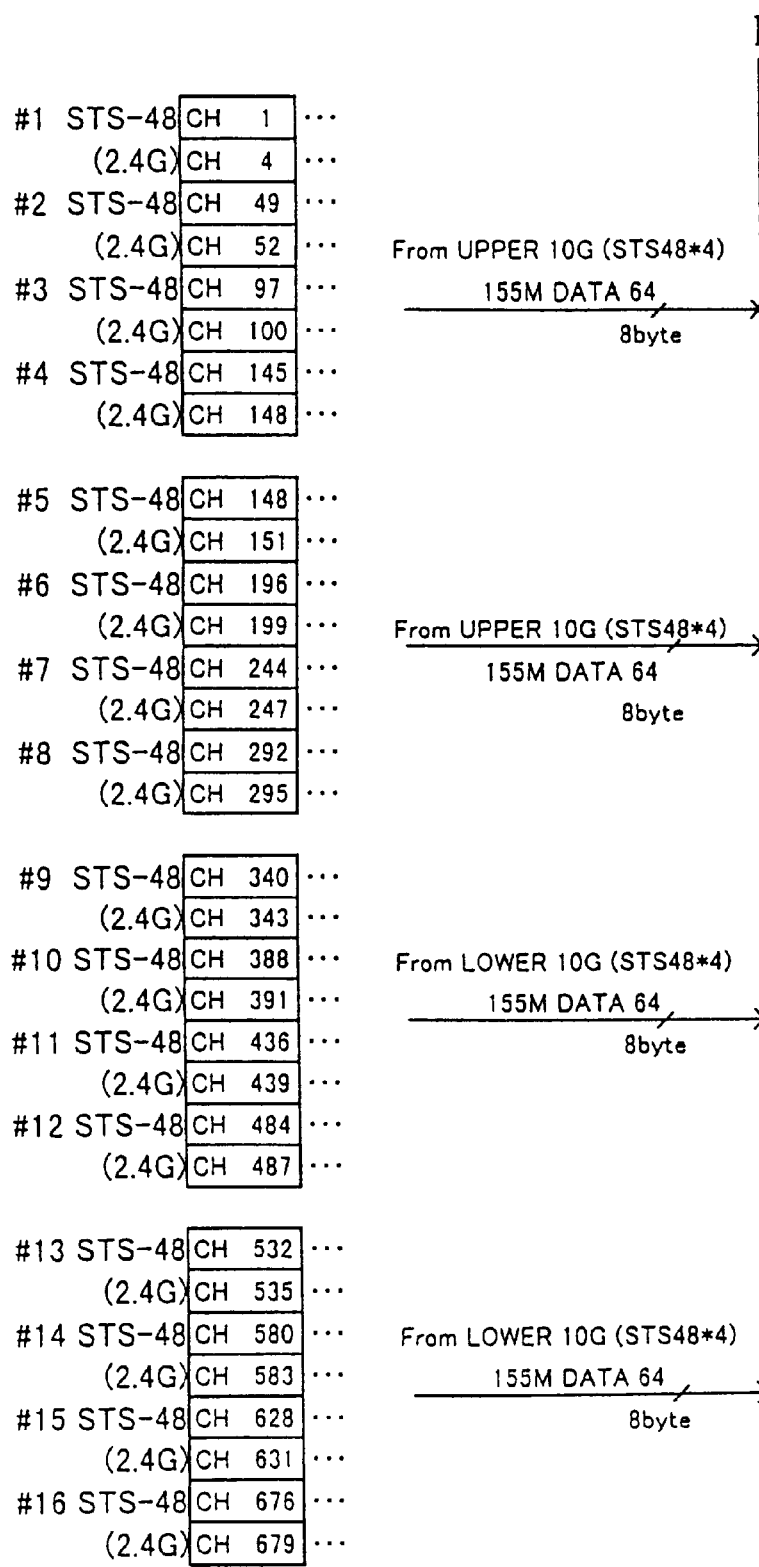
FIG. 3 is a first part of a view of a detailed example of the TSA function block in FIG. 2.
Figure 4:
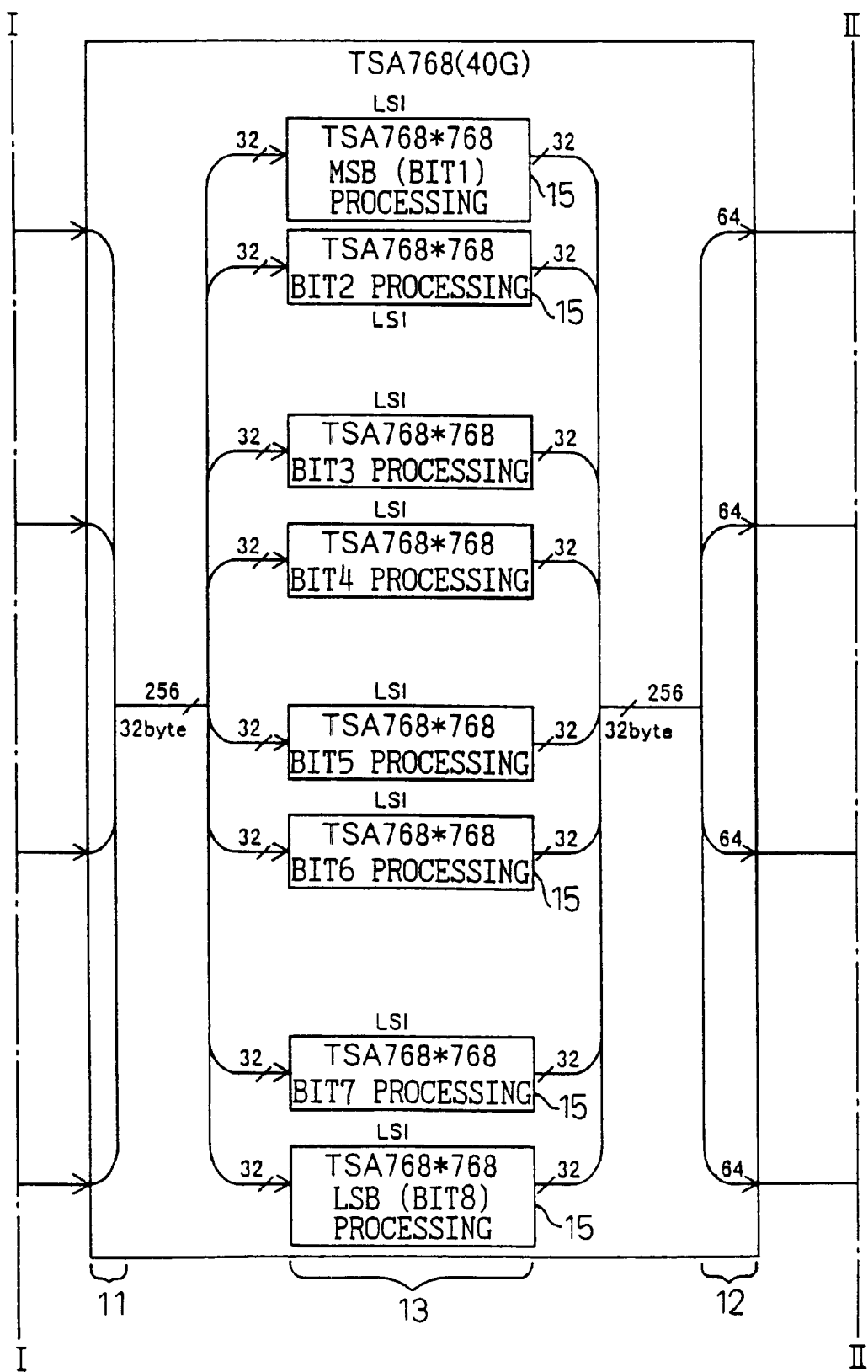
FIG. 4 is a second part of a view of a detailed example of the TSA function block in FIG. 2.
Figure 5:
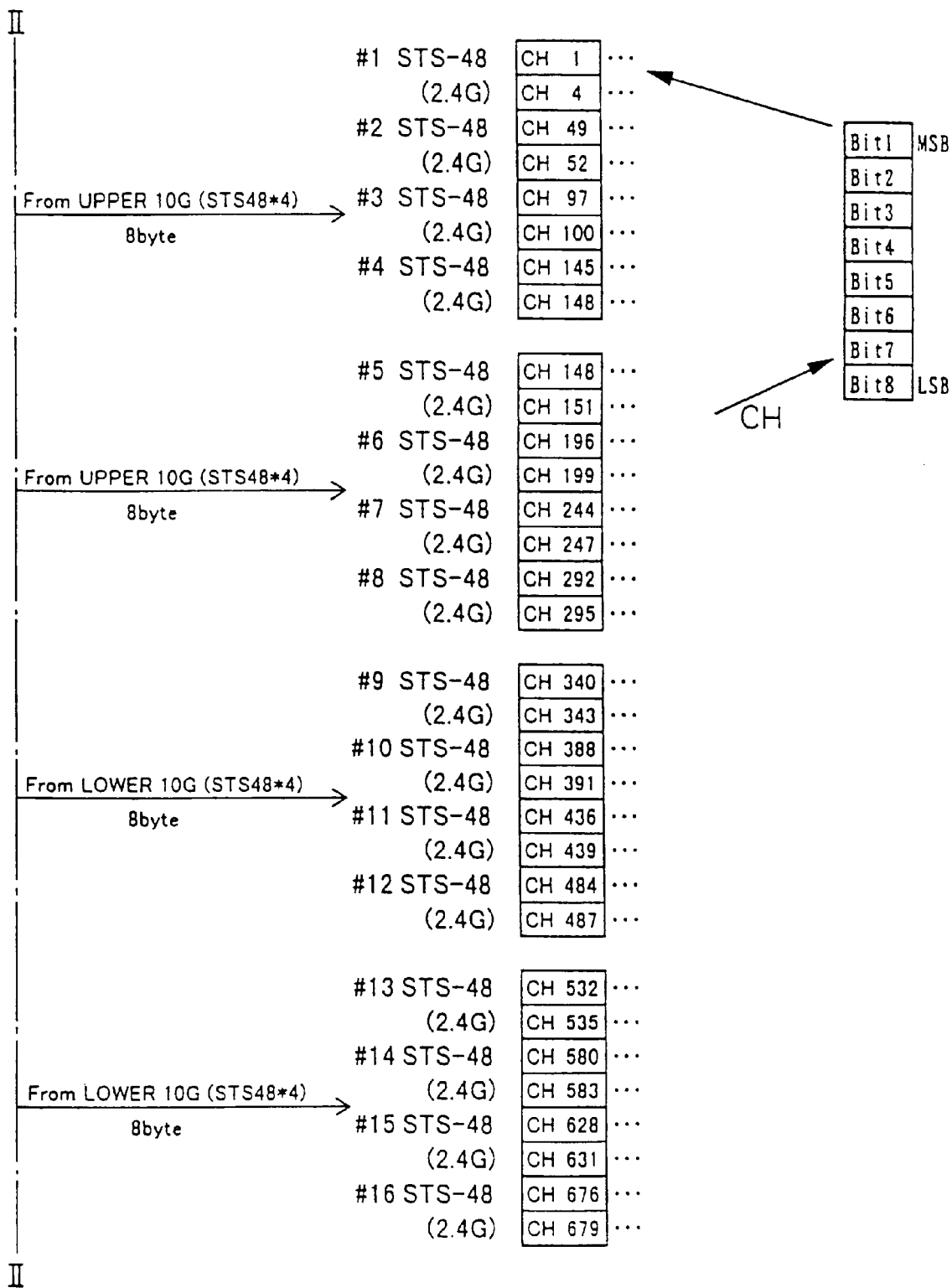
FIG. 5 is a third part of a view of a detailed example of the TSA function block in FIG. 2.

FIGS. 3 to 5 are first to third parts of a view of a detailed example of the TSA function block in FIG. 2. These figures show details of the working side TSA function block 13 in FIG. 2, but the protection side TSA function block in FIG. 2 has exactly the same configuration. FIG. 3 shows a detailed example of the upper side and lower side incoming transmission data, FIG. 4 shows a detailed example of the TSA function block 13, and FIG. 5 shows a detailed example of the upper side and lower side outgoing transmission data after TSA processing.

The input port 11 of FIG. 4 receives as input the upper side incoming transmission data (#1 to #8) and the lower side incoming transmission data (#9 to #16) shown in FIG. 3 as a predetermined number (in FIG. 3, "16") of multiplex level data groups (#1 to #16) each comprised of a plurality of channels (CH1, CH4, CH49 . . . ) of the same multiplex level—(in the figure, STS-48) formatted N—(N is a positive whole number, N=8 in the figure (see CH at top right of FIG. 5)) bit configuration.

Further, the upper side outgoing transmission data (#1 to #8) and the lower side outgoing transmission data (#9 to #16) shown in FIG. 5 are output from the output port 12 of FIG. 4 as the above predetermined number ("16") of multiplex level data groups (#1 to #16) each comprised of a plurality of channels (CH1, CH4, CH49 . . . ) of the same multiplex level—(shown by STS-48) formatted N—(N=8) bit configuration.

Here, the TSA function block 13 is comprised of N (N=8) number of TSA function modules 15 having the same configuration as each other. The eight TSA function modules 15 are allotted so as to perform processing, in bit units, on the eight bits, forming each channel of the multiplex level data group, from the MSB to the LSB (see MSB to LSB at top right of FIG. 5).

The TSA function modules 15 are shown in FIG. 4 as TSA767*768 (MSB (BIT1) processing) 15 to TSA768*768 (LSB (BIT8) processing) 15. Each is constituted by an LSI. The operations performed by these modules 15 (LSIs) are the same, however, the modules 15 process corresponding one of the divided bits. Note that "TSA768*768" shows the number of incoming channel (768) and the number of outgoing channels (768) of a 40 Gbps TSA function module. For reference, an 80 Gbps TSA function module would be indicated as "TSA1536*1536".

In FIG. 3, and FIG. 5, only part of the format of the incoming transmission data and part of the format of the outgoing transmission data are shown, but in the case of the above TSA768*768, the channels CH1 to CH768 are mapped by a predetermined format. This will be explained in detail next.

FIG. 6 and FIG. 7 are first and second parts of a view of the frame format of an upper side incoming transmission data. Further, FIG. 8 and FIG. 9 are first and second parts of a view of the frame format of a lower side incoming transmission data. Note that the frame formats of the upper side outgoing transmission data and lower side outgoing transmission data have identical frame formats as shown in these figures.

As shown in FIG. 6 to FIG. 9, 16 groups (#1 to #16) of the STS-48 (2.4 Gbps) level transmission data are input. Similarly, 16 groups (#1 to #16) of the STS-48 (2.4 Gbps) level transmission data are output. The STS-48×4 level transmission data corresponding to the above 4 groups (#1 to #4), is comprised of 155 Mbps×64 parallels and forms 8-byte (64 bit) parallels. The "64" shows the 64 (=8×8) obtained by multiplying the eight bits per byte by the 8 bytes of each channel for the channel nos. 1 to 4 (CH1, CH4 to CH145, CH148) shown in the lengthwise direction at the left end of FIG. 6. If designating these as one set (#1 to #4), there are further the three sets of #5 to #8, #9 to #12, and #13 to #16 and therefore there are four sets in total. The four sets constitute 32-byte parallels, that is, 155 Mbps×256 (=64×4) parallels. This corresponds to 40 Gbps.

As explained above, the TSA function module (TSA768*768) 15 has eight LSIs formed corresponding to the eight bits and individually performing the processing on the MSB (BIT1), BIT2, BIT3, . . . LSB (BIT8) forming each byte. The TSA function module (LSI) performing the processing on the MSB (BIT1) receives as input the MSB's (BIT1's), bundled together, of the incoming transmission data. TSA768*768 processing is executed in bit units and the result is sent out as the outgoing transmission data. The same is true for the processing of BIT2, BIT3, . . . LSB (BIT8).

By adopting such a bit-divided TSA circuit configuration, it becomes possible to use a single type of LSI for processing of individual bits and make them operate in parallel and simultaneously, and thereby 40 Gbps TSA processing of TSA768*768 processing, that is, 1 to 768 CH→1 to 768 CH, is realized without increasing the size of the circuit.

The first system configuration shown in FIG. 2 is a system configuration which uses independent working side/protection side TSA circuit and therefore does not transfer the transmission data between the working side and the protection side. However, a mixed working side/protection side TSA circuit able to transfer transmission data even between the working side and protection side would be required when considering maximum use of the system resources.

FIG. 10 is a view of a second system configuration having a TSA circuit according to the present invention and uses the above mixed working side/protection side TSA circuit (shown by 20 in the figure). The configuration of FIG. 10 is considerably close to the configuration of FIG. 2, but while, in FIG. 2, the independent TSA function blocks the working side and protection side respectively, the TSA function block 13 in the TSA circuit 20 of FIG. 10 performs processing for both the working side and protection side entirely.

That is, the TSA function block 13 of FIG. 10 is a working side/protection side TSA function block which processes the upper side incoming transmission data and the lower side incoming transmission data of both the working side and the protection side all together and outputs the upper side outgoing transmission data and lower side outgoing transmission data of both the working side and protection side all together.

Figure 11:
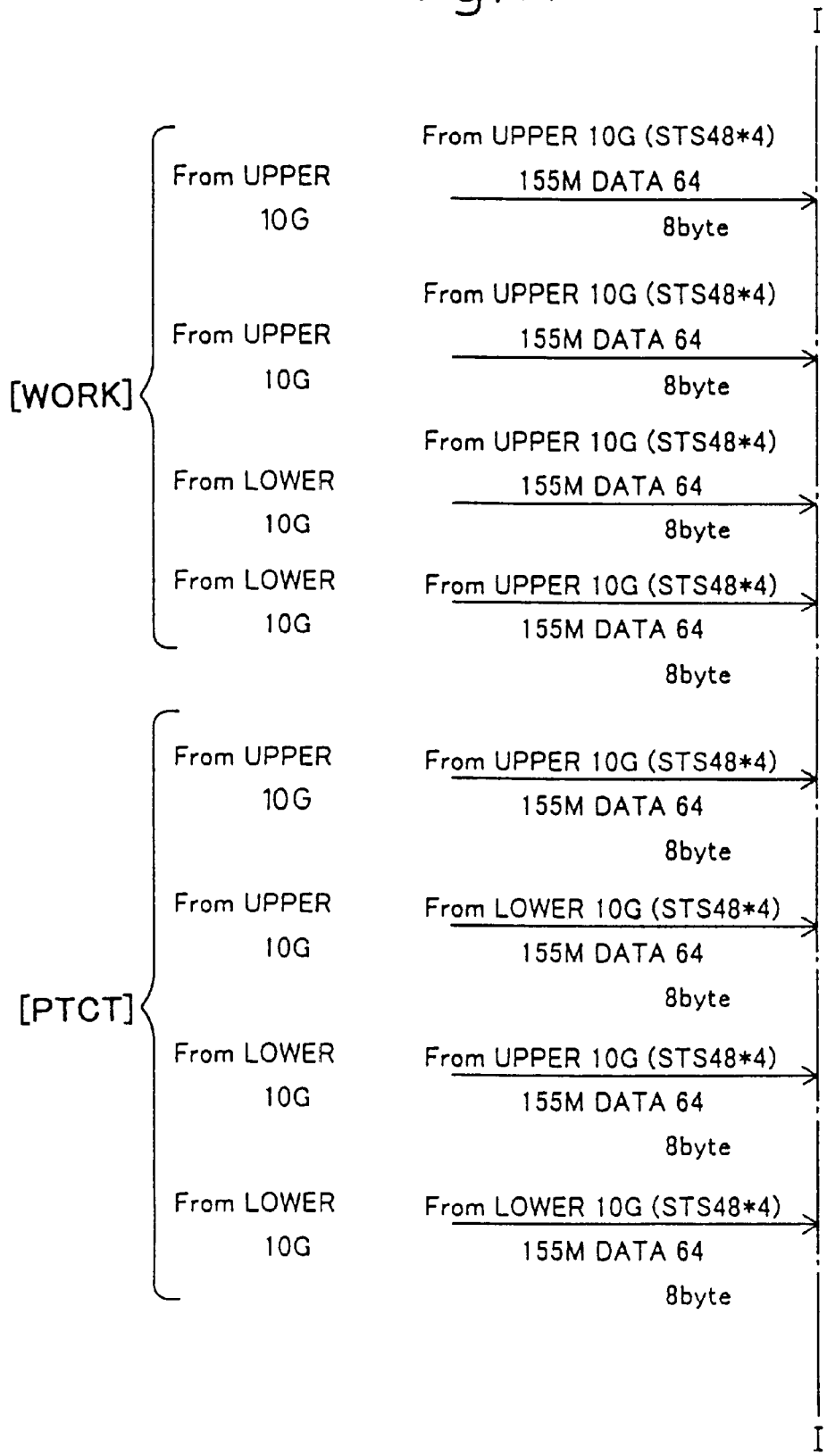
FIG. 11 is a first part of a view of a first detailed example of the TSA function block in FIG. 10.
Figure 12:
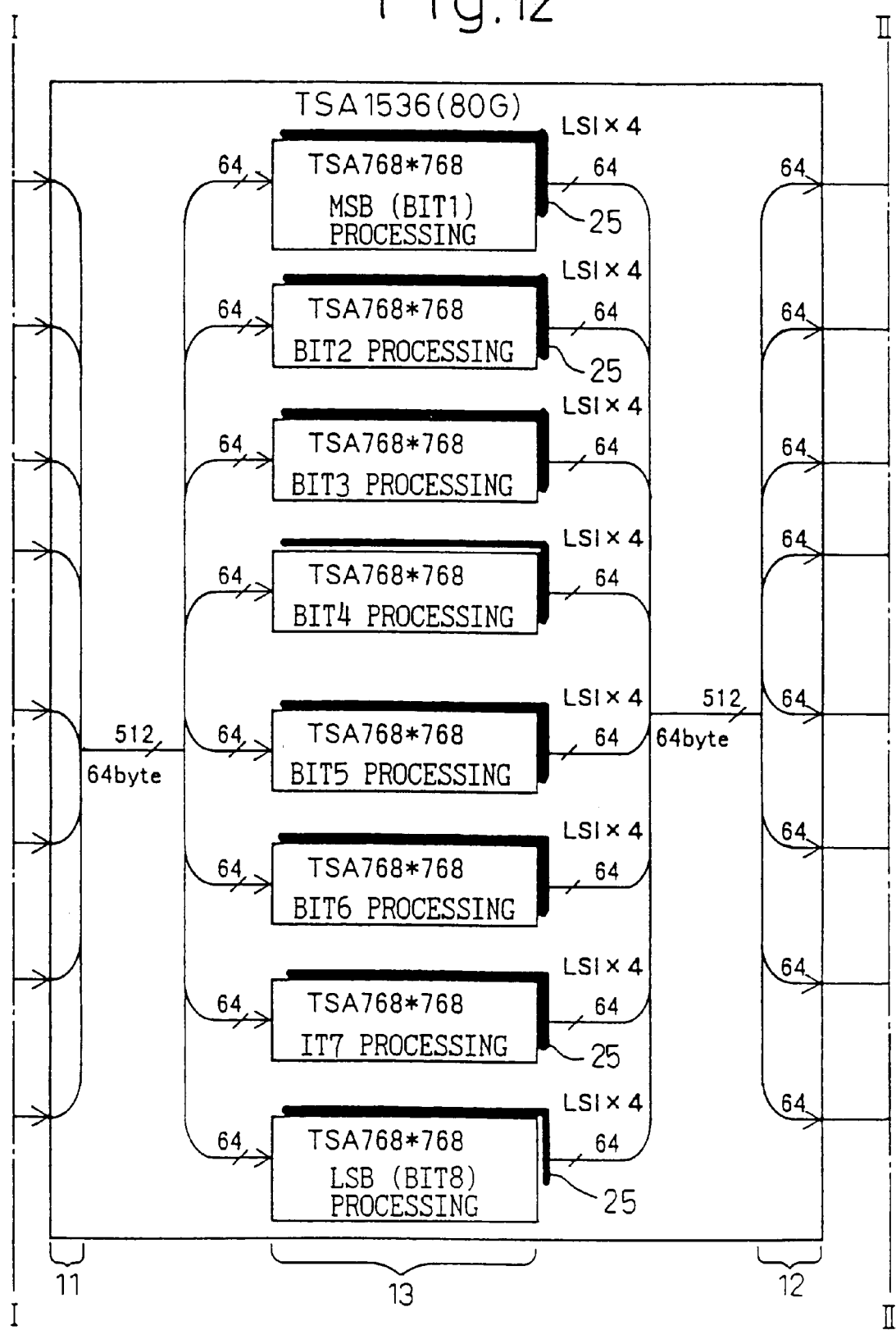
FIG. 12 is a second part of a view of a first detailed example of the TSA function block in FIG. 10.
Figure 13:
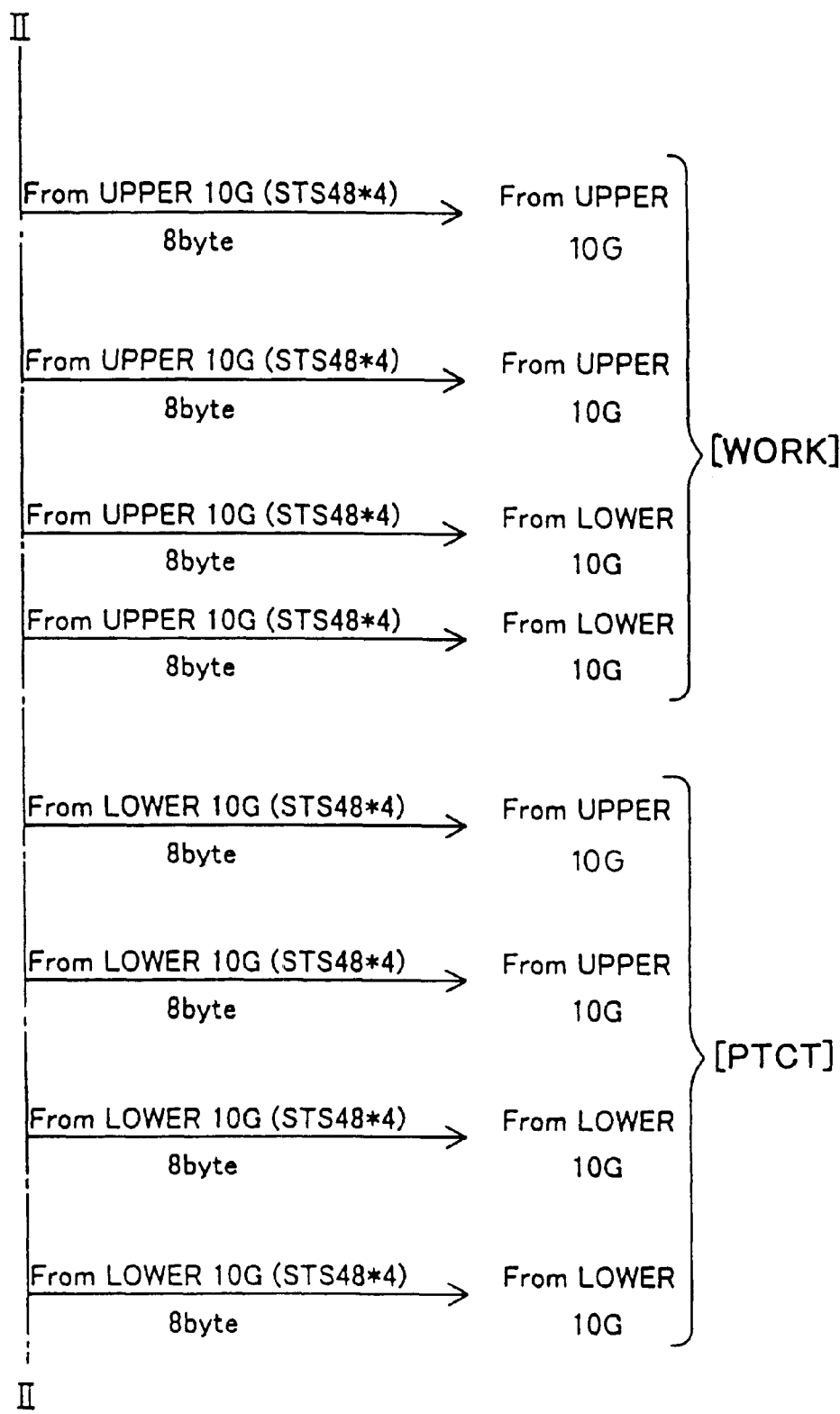
FIG. 13 is a third part of a view of a first detailed example of the TSA function block in FIG. 10.

FIGS. 11 to 13 are first to third parts of a view of a first detailed example of the TSA function block in FIG. 10. FIG. 11 shows a detailed example of the upper side and lower side incoming transmission data of both the working side and protection side, FIG. 12 shows a detailed example of the TSA function block 13, and FIG. 13 shows a detailed example of the upper side and lower side outgoing transmission data of both the working side and protection side after TSA processing.

The input port 11 of FIG. 12 receives an input the upper side incoming transmission data and the lower side incoming transmission data of both the working side and protection side shown in FIG. 11 as a predetermined number (for example, "8") of multiplex level data groups (#1 to #32) each comprised of a plurality of channels (CH1, CH4, CH49 . . . ) of the same multiplex level—(for example, STS-48) formatted N—(N is a positive whole number, for example, N=8) bit configuration.

Further, the upper side outgoing transmission data and the lower side outgoing transmission data of both the working side and protection side are output from the output port 12 of FIG. 12 as the above predetermined number ("8") of multiplex level data groups (#1 to #32) each comprised of a plurality of channels (CH1, CH4, CH49 . . . ) of the same multiplex level—(for example, STS-48) formatted N—(N= 8) bit configuration.

Here, the TSA function block 13 is comprised of N (N=8) number of TSA function modules 25 having the same configuration as each other. The eight TSA function modules 25 are allotted so as to perform processing, in but units, on the N number of bits (N=8), forming each channel of the multiplex level data group, from the MSB to the LSB.

The TSA function modules 25 are shown in FIG. 12 as TSA768*768 (MSB (BIT1) processing) 25 to TSA768*768 (LSB (BIT8) processing) 25. Each is constituted by four LSIs. The operations performed by these modules 25 (LSI×4) are the same, however, the modules 25 process corresponding one of the divided bits. The configuration of the TSA function modules 25 each having four LSIs will be explained later.

FIGS. 14 and 15 are first and second parts of a view of the frame format of upper side transmission data of a working side (WORK) in FIG. 11; FIGS. 16 and 17 are first and second parts of a view of the frame format of lower side transmission data of a working side (WORK) in FIG. 11; FIGS. 18 and 19 are first and second parts of a view of the frame format of upper side transmission data of a protection side (PCTC) in FIG. 11; and FIGS. 20 and 21 are first and second parts of a view of the frame format of lower side transmission data of a protection side (PCTC) in FIG. 11. Note that the frame formats of the upper side outgoing transmission data and the lower side outgoing transmission data of both the working side and protection side have identical frame formats as shown in these figures.

As shown in FIGS. 14 to 21, 32 groups (#1 to #32) of the STS-48 (2.4 Gbps) level transmission data are input. Similarly, 32 groups (#1 to #32) of the STS-48 (2.4 Gbps) level transmission data are output. The STS-48 level transmission data is comprised of 155 Mbps×64 parallels and forms 8-byte parallels. The "64" shows the 64 (=8×8) obtained by multiplying the eight bits per byte by the 8 bytes of each channel for the channels #1 to #4 (CH1, CH4 to CH145, CH148) shown in the lengthwise direction at the left end of FIG. 14 for example. If designating these as one set (#1 to #4), there are further the seven sets of #5 to #8, #9 to #12, #13 to #16 to #29 to #32 and therefore there are eight sets in total. The eight sets constitute 64-byte parallels, that is, 155 Mbps×512 (=64×8) parallels. This corresponds to 80 Gbps (TSA1536).

As explained above, the TSA function module (TSA768*768) 25 has 32 (=8×4) LSIs formed corresponding to the bits and individually performing the processing on the MSB (BIT1), BIT2, BIT3, . . . LSB (BIT8) forming each byte. The TSA function module (LSI) performing the processing on the MSB (BIT1) receives as input the MSB's (BIT1's) bundled together, of the incoming transmission data. TSA768*768 processing is executed in bit units and the result is sent out as the outgoing transmission data. The same is true for the processing of BIT2, BIT3, . . . LSB (BIT8).

By adopting such a bit-divided TSA circuit configuration, it becomes possible to use a single type of LSI for processing of individual bits and make them operate in parallel and simultaneously, and thereby 80 Gbps TSA processing of 1 to 1536 CH→1 to 1536 CH is realized without increasing the size of the circuit.

FIG. 22 is a view of the configuration of the TSA function module 25 shown in FIG. 12.

Each of the above-mentioned N (for example, N=8) number of TSA function modules 25 is comprised of first and second TSA function submodules 26-1 and 26-2 and third and fourth TSA function submodules 26-3 and 26-4 having the same configuration as the TSA function module 25.

The first and second TSA function submodules 26-1 and 26-2 commonly receive as input the former half channel group (1 to 768 CH) corresponding to the former half of the channels (1 to 1536 CH) forming the upper side incoming transmission data and lower side incoming transmission data of both the working side and protection side.

The third and fourth TSA function submodules 26-3 and 26-4 commonly receive as input the latter half channel group (769 to 1536 CH) corresponding to the latter half of the channels (1 to 1536 CH) forming the upper side incoming transmission data and lower side incoming transmission data of both the working side and protection side.

Further, the second TSA function submodule 26-2 performs processing for interchanging channels of any of the former half channel group (1 to 768 CH) with channels of any of the latter half channel group (769 to 1536 CH). The third TSA function submodule 26-3 performs processing for interchanging channels of any of the latter half channel group (769 to 1536 CH) with channels of any of the former half channel group (1 to 768 CH).

These first to fourth TSA function submodules 26-1 to 26-4 are each comprised of an LSI No. 1 to LSI No. 4. In FIG. 12, the indications "LSI×4" near the TSA modules 25 denotes the LSI No. 1 to LSI No. 4. The eight LSIs of No. 1 of the eight modules, from the TSA function module 25 performing the processing on the MSB (BIT1) to the TSA function module 25 performing the processing on the LSB (BIT8), play exactly the same roles. Similarly, the LSI Nos. 2, the LSI Nos. 3, and the LSI Nos. 4 of the eight modules play the same roles.

The TSA function submodules 26-1 to 26-4 are further provided with zero mask processing units (the location of the zero mask processing unit in the LSI is shown later in FIG. 47). The zero mask processing unit is classified into a first zero mask processing unit and a second zero mask processing unit.

The first zero mask processing unit invalidates the data of the former half channel group when there are any channels of the former half channel group (1 to 768 CH), in the first and second TSA function submodules 26-1 and 26-2, to be interchanged with channels from the third and fourth TSA function submodule 26-3 and 26-4 side.

The second zero mask processing unit invalidates the data of the latter half channel group when there are any channels of the latter half channel group (769 to 1536 CH), in the third and fourth TSA function submodules 26-3 and 26-4, to be interchanged with channels from the first and second TSA function submodule 26-1 and 26-2 side.

Referring to FIG. 22, a first combining unit 27 and second combining unit 28 are provided at the output stages of the four TSA function submodules 26-1 to 26-4. These are all realized by for example OR gates.

The first combining unit 27 combines the outputs of the first and third TSA submodules 26-1 and 26-3, while the second combining unit 28 combines the outputs of the second and fourth TSA submodules 26-2 and 26-4.

The actual operation of the TSA function module 25 of FIG. 22 is explained next.

The TSA1536*768 processing (1–1536CH→1–768CH) is performed by the LSI No. 1 (26-1) and the LSI No. 3 (26-3), while the TSA1536*768 processing (1–1536CH→769–1536CH) is performed by the LSI No. 2 (26-2) and the LSI No. 4 (26-4). As the individual operations, the LSI No. 1 handles the 1–768CH (40G) to be TSA'ed from the incoming transmission data of 1–768CH (40G) to the outgoing transmission data of 1–768CH, where only TSA settings from the 1–768CH are valid. When such a setting is made, it performs the TSA. Further, when there is a TSA setting from the 769–1536 CH, it is invalid. The so set channel CH is output after the above zero mask processing is performed. For example, when there is a TSA setting of CH1→CH2, the data of the incoming CH1 is contained in the output CH2. When there is a TSA setting of CH999→CH555, the zero mask processed data is contained in the output CH555.

The LSI No. 3 handles the 769–1536 CH (40G) to be TSA'ed from the incoming transmission data of 769–1536 CH (40G) to the outgoing transmission data of 1–768 CH, where only TSA settings from the 769–1536 CH are valid. When such a setting is made, it performs the TSA. Further, when there is a TSA setting from the 1–768 CH, it is invalid. The so set channel CH is output after the above zero mask processing is performed. For example, when there is a TSA setting of CH1→CH2, the zero mask processed data is contained in the output CH2. When there is a TSA setting of CH999→CH555, the data of the incoming CH999 is contained in the output CH555.

As will be understood from the above example, the LSI No. 1 and the LSI No. 3 perform complementary operations. By obtaining the "OR" of these outputs at the first combining unit 27, the TSA1538*768 processing (1–1536 CH→1–768 CH) is performed.

Similarly, the LSI No. 2 handles the 1–768 CH (40G) to be TSA'ed from the incoming transmission data of 1–768CH (40G) to the outgoing transmission data of 769–1536CH, where only TSA settings from the 1–768CH are valid. When such a setting is made, it performs the TSA. Further, when there is a TSA setting from the 769–1536 CH, it is invalid. The so set channel CH is output after the above zero mask processing is performed. For example, when there is a TSA setting of CH20→CH800, the data of the incoming CH20 is contained in the output CH800. When there is a TSA setting of CH1212→CH1441, the zero mask processed data is contained in the output CH1441.

The LSI No. 4 handles the 769–1536 CH (40G) to be TSA'ed from the incoming transmission data of 769–1536 CH (40G) to the outgoing transmission data of 769–1536 CH, where only TSA settings from the 769–1536 CH are valid. When such a setting is made, it performs the TSA. Further, when there is a TSA setting from the 1–768 CH, it is invalid. The so set channel CH is output after the above zero mask processing is performed. For example, when there is a TSA setting of CH20→CH800, the zero mask processed data is contained in the output CH800. When there is a TSA setting of CH1212→CH1441, the data of the incoming CH1212 is contained in the output CH1441.

As will be understood from the above example, the LSI No. 2 and the LSI No. 4 perform complementary operations. By obtaining the "OR" of the outputs at the second combining unit 28, the TSA1536*768 processing (1–1536 CH→769–1536 CH) is performed.

Further, by combining (bundling) these two complementary sets of outputs, it is possible to realize TSA1536 processing (1–1536 CH→1–1536 CH) (80 Gbps TSA).

Figure 23:
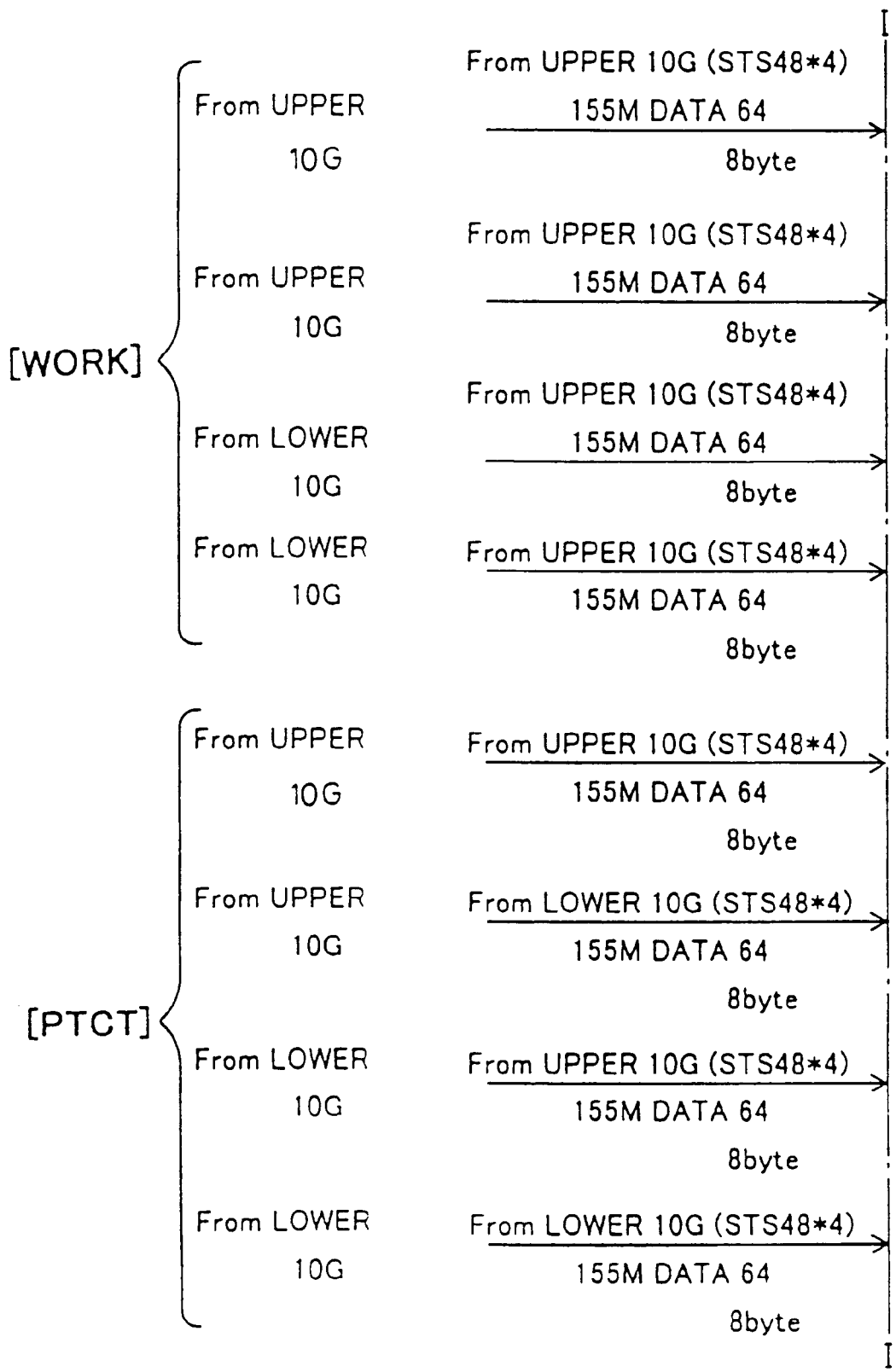
FIG. 23 is a first part of a view of a second detailed example of the TSA function block in FIG. 10.
Figure 24:
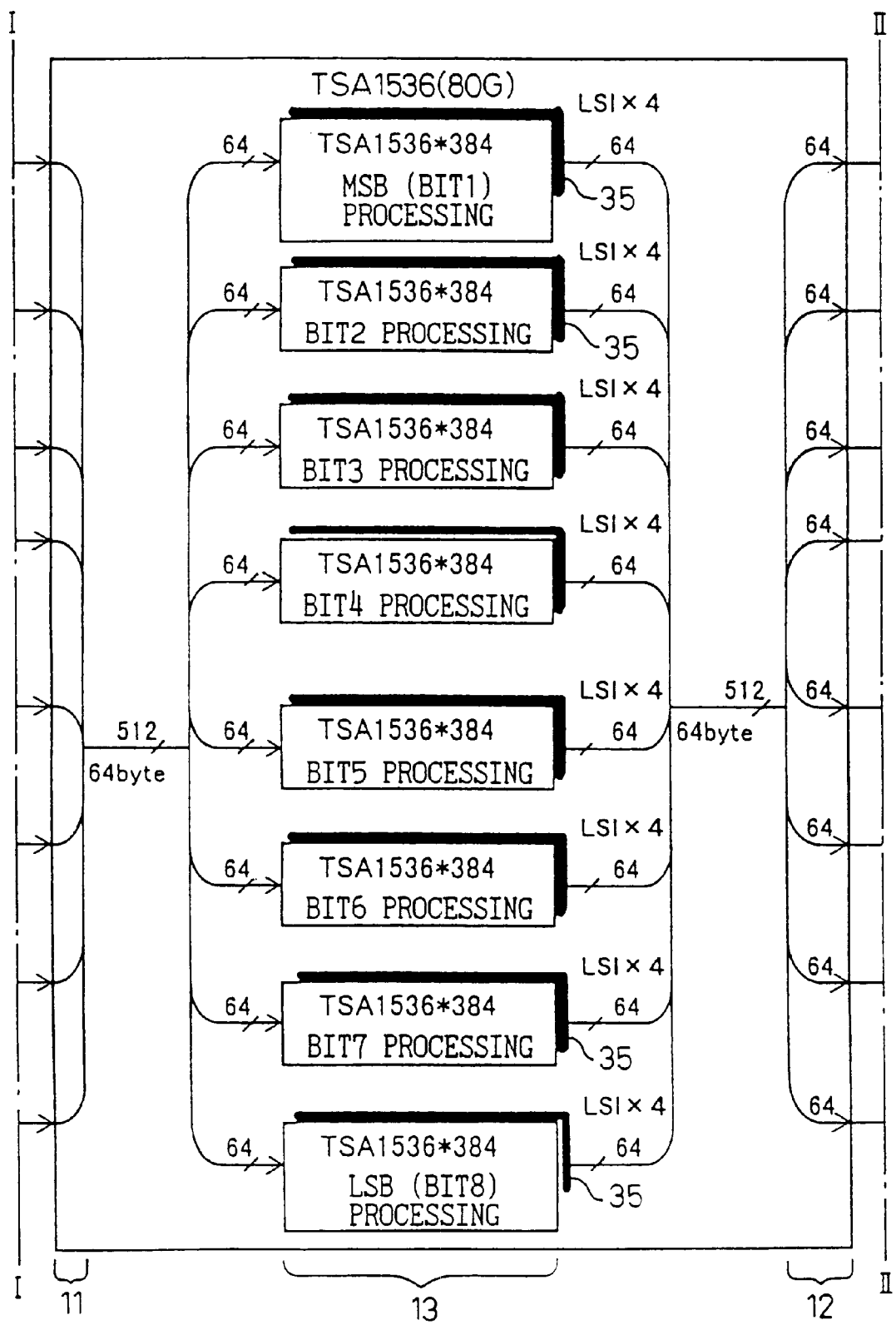
FIG. 24 is a second part of a view of a second detailed example of the TSA function block in FIG. 10.
Figure 25:
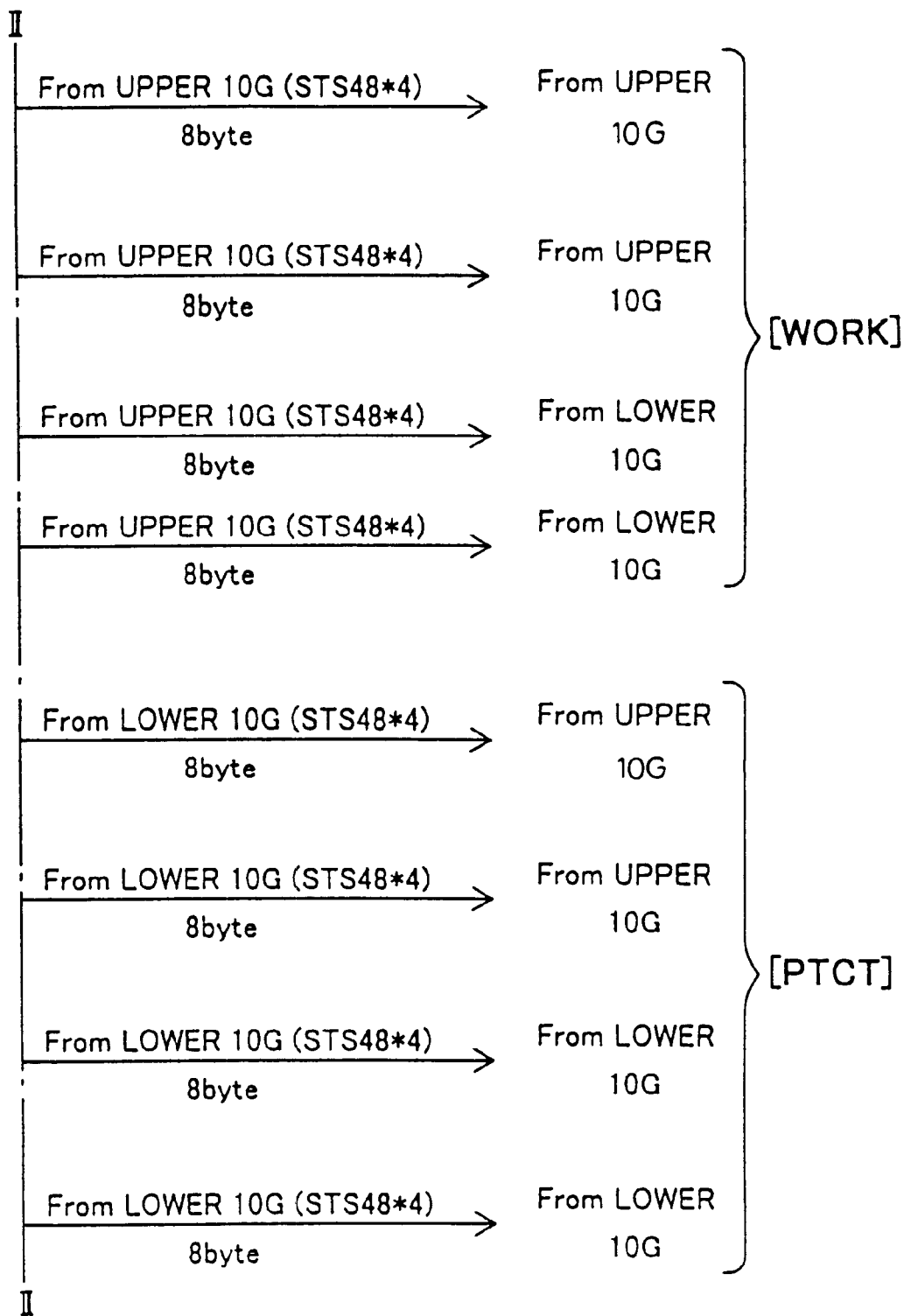
FIG. 25 is a third part of a view of a second detailed example of the TSA function block in FIG. 10.

FIGS. 23 to 25 are first to third parts of a view of a second detailed example of the TSA function block in FIG. 10.

FIG. 23 is exactly the same as the already explained FIG. 11, while FIG. 25 is exactly the same as the already explained FIG. 13. Therefore, the frame formats of the incoming transmission data in FIG. 23 have identical data formats as shown in FIGS. 14 to 21.

The difference with the first detailed example of the TSA function block shown in FIG. 12 is that use is made of the TSA function modules 35 instead of the TSA function modules 25 (FIG. 12).

These TSA function modules 35 are shown in FIG. 24 as the TSA1536*384 (MSB (BIT1) processing) 35 to TSA1536*384 (LSB (BIT8) processing) 35. Each is comprised of four LSIs. The operations performed by these modules 35 (LSI×4) are the same, however, the modules 35 process corresponding one of the divided bits. The configuration of the TSA function modules 35 constituted by four LSIs (No. 1 to No. 4) is shown in FIG. 26.

Figure 26:
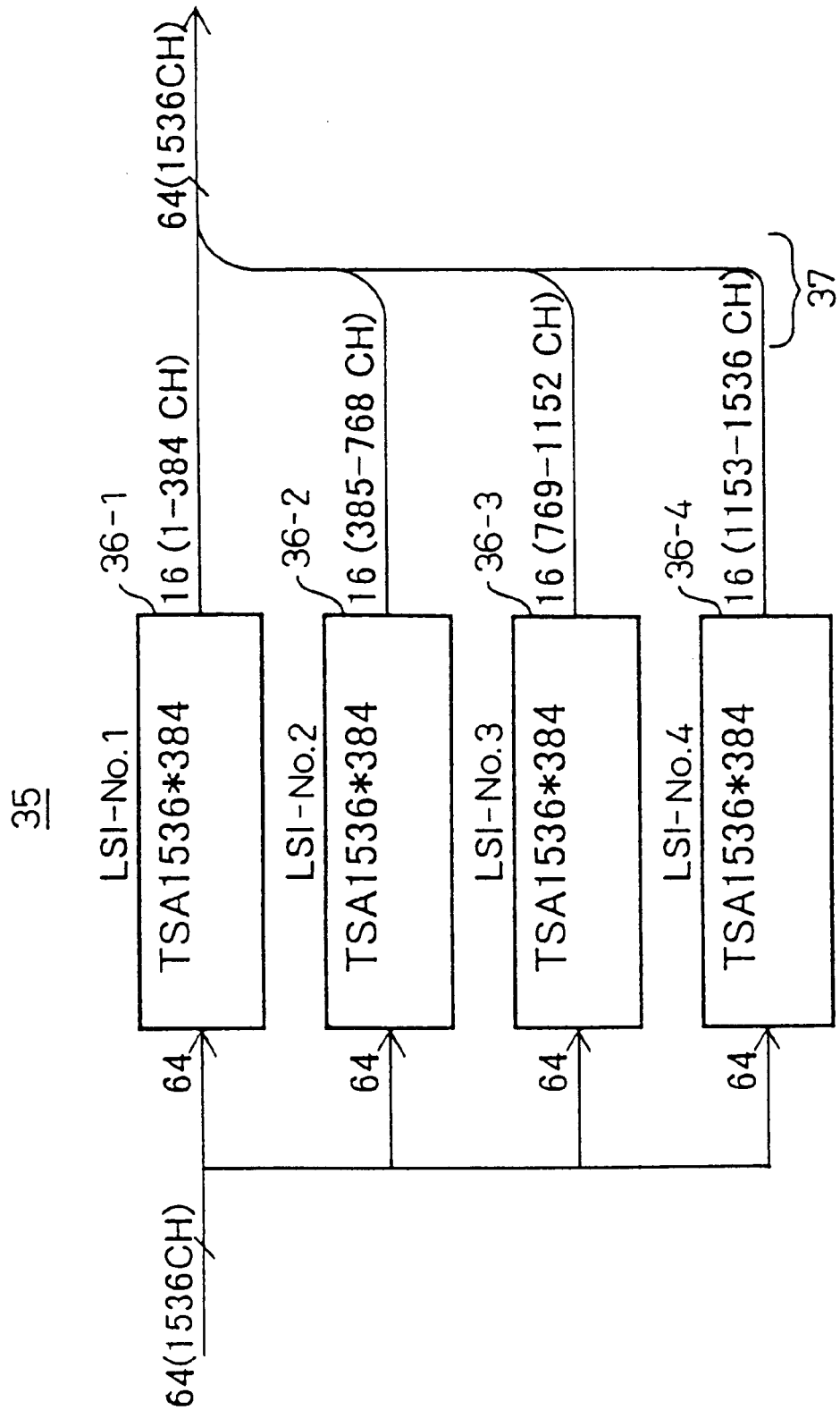
FIG. 26 is a view of the configuration of a TSA function module 35 in FIG. 24.

FIG. 26 is a view of the configuration of the TSA function module 35 shown in FIG. 24.

Each of the N (N=8) number of TSA function modules 35 shown in FIG. 24 is comprised of M (in FIG. 26, M=4) number of TSA function submodules (36-1 to 36-4) of the same configuration as this TSA function module.

The four TSA function submodules 36-1 to 36-4 commonly receive as inputs all of the channels (1 to 1536 CH) forming the upper side incoming transmission data and lower side incoming transmission data of both the working side and protection side. On the other hand, the data of first quarter channels (1 to 384 CH) to fourth quarter channels (1153 to 1536 CH) obtained by dividing the channels equally by M (in FIG. 26, M=4) are processed by respective submodules 36-1 to 36-4.

Further provision is made of a combining unit 37 for combining the outputs from the M (M=4) number of TSA function submodules.

The operation of the TSA function module 35 of FIG. 26 is explained next.

The TSA1536*384 processing (1–1536 CH→1–364 CH) is performed by the LSI No. 1 (36-1), the TSA1536*384 processing (1–1536 CH→385–768 CH) is performed by the LSI No. 2 (36-2), the TSA1536*384 processing (1–1536 CH→769–1152 CH) is performed by the LSI No. 3 (36-3), and the TSA1536*384 processing (1–1536 CH→1153–1536 CH) is performed by the LSI No. 4 (36-4).

By combining (bundling) the transmission data output from the LSI No. x (x=1, 2, 3, or 4) at a combining part 37, TSA1536 processing in bit units becomes possible.

For example, if the TSA's are set such that CH1→CH300, CH2→CH600, CH3→CH900, and CH4→CH1200, since the LSI No. 1 (36-1) handles the TSA processing for only the 1–384 CH, the TSA is performed for only CH1→CH300 and the incoming transmission data of CH1 is contained at the position of the CH300 of the outgoing transmission data. Other TSA settings, that is, CH2→CH600, CH3→CH900, or CH4→CH1200, are ignored and no TSA processing is performed.

Similarly, since the LSI No. 2 (36-2) handles the TSA processing for only the 385–768 CH, the TSA is performed for only CH2→CH600 and the incoming transmission data of CH2 is contained at the position of the CH600 of the outgoing transmission data. Other TSA settings, that is, CH1→CH300, CH3→CH900, or CH4→CH1200, are ignored and no TSA processing is performed.

Similarly, since the LSI No. 3 (36-3) handles the TSA processing for only the 769–1152 CH, the TSA is performed for only CH3→CH900 and the incoming transmission data of CH3 is contained at the position of the CH900 of the outgoing transmission data. Other TSA settings, that is, CH1→CH300, CH2→CH600, or CH4→CH1200, are ignored and no TSA processing is performed.

Similarly, since the LSI No. 4 (36-4) handles the TSA processing for only the 1153–1536 CH, the TSA is performed for only CH4→CH1200 and the incoming transmission data of CH4 is contained at the position of the CH1200 of the outgoing transmission data. Other TSA settings, that is, CH1→CH300, CH2→CH600, or CH3→CH900, are ignored and no TSA processing is performed.

As will be understood from the above examples, the inlets of the four LSIs receive the same 1536 CH, while the outlets of the LSIs are divided into the four 1–384 CH, 385–768 CH, 769–1152 CH, and 1153–1536 CH. By combining (bundling) these divided outputs, the TSA1536*1536 processing is realized.

Next, a specific example of the configuration of the TSA function modules 15, TSA function submodules (26-1 to 26-4), and TSA function submodules (36-1 to 36-4) used in the present invention will be shown. The modules 15, 26-1 to 26-4, and 36-1 to 36-4 are exactly the same in basic configuration.

Figure 27:
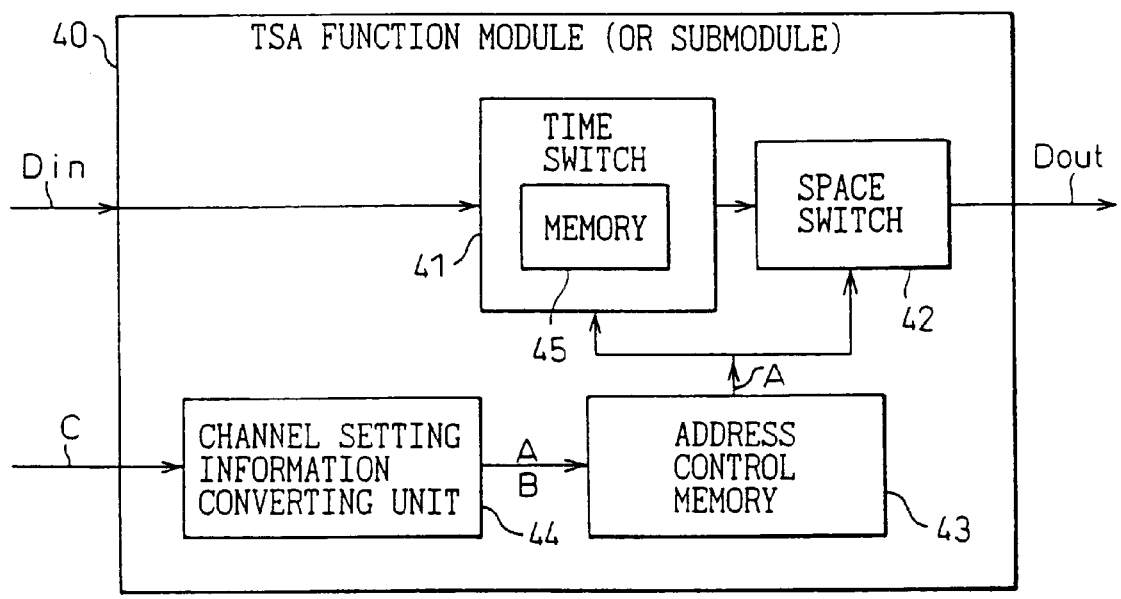
FIG. 27 is a view of an example of the basic configuration of a TSA function module or submodule used in the present invention.

FIG. 27 is a view of an example of the basic configuration of the TSA function module or submodule used in the present invention.

The TSA function module (or submodule) 40, as illustrated, is provided with a time switch 41, a space switch 42, a channel setting information converting unit 44, and an address control memory 43.

The time switch 41 is provided with a transmission data memory 45 for writing the transmission data (Din) sequentially and performs switching in the time domain on the transmission data (Din).

The space switch 42 performs switching in the space domain on the output from the time switch 41.

The address control memory 43 outputs a channel setting address A for controlling the time switch 41 and space switch 42.

The channel setting information converting unit 44 converts the channel setting information C supplied from the outside to the channel setting address A and the access address B of the address control memory 43.

The components 41, 42, and 43 of the above TSA circuits 10 and 20 are preferably configured as follows:

Looking at the time switch 41, the transmission data memory 45 is comprised of a random access memory (RAM). The incoming transmission data is written into the RAM as the transmission data (Din) and is read out from the RAM based on the channel setting address A. Here, the "incoming transmission data" is an STS-48 signal according to the above example.

Next, looking at the space switch 42, the incoming transmission data is output from the time switch 41. The space switch 42 selects one channel from that output in accordance with the channel setting address A.

Looking at the address control memory 43, the address control memory 43 is comprised of a RAM. A channel setting address A from the channel setting information converting unit 44 for (i) writing the incoming transmission data in the transmission data memory 45 and reading the same from the transmission data memory 45 and for (ii) selecting one channel from the output from the time switch 41 at the space switch 42, is written at random in the address control memory 43 by using the access address B of the address control memory 43 supplied from the channel setting information converting unit 44 and is read out serially to the time switch 41 and space switch 42.

Due to the introduction of the above-mentioned memories (44, 45), it is possible to realize channel setting with a high degree of freedom and high efficiency without enlarging the size of the circuit for, e.g., a 40 Gbps or 80 Gbps super high speed transmission line.

Figure 28:
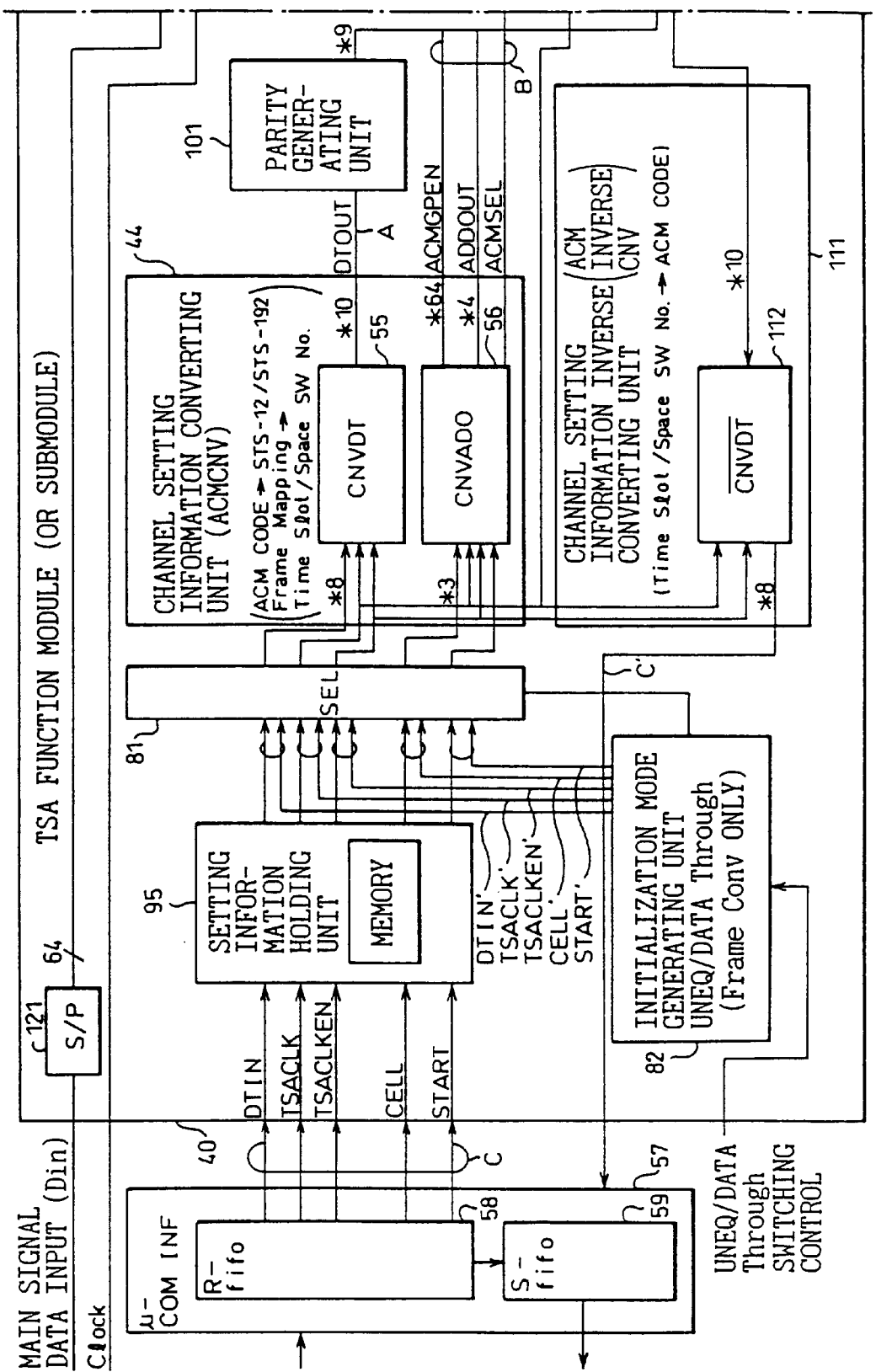
FIG. 28 is a first part of a view of a specific example of a TSA function module (or submodule)
Figure 29:
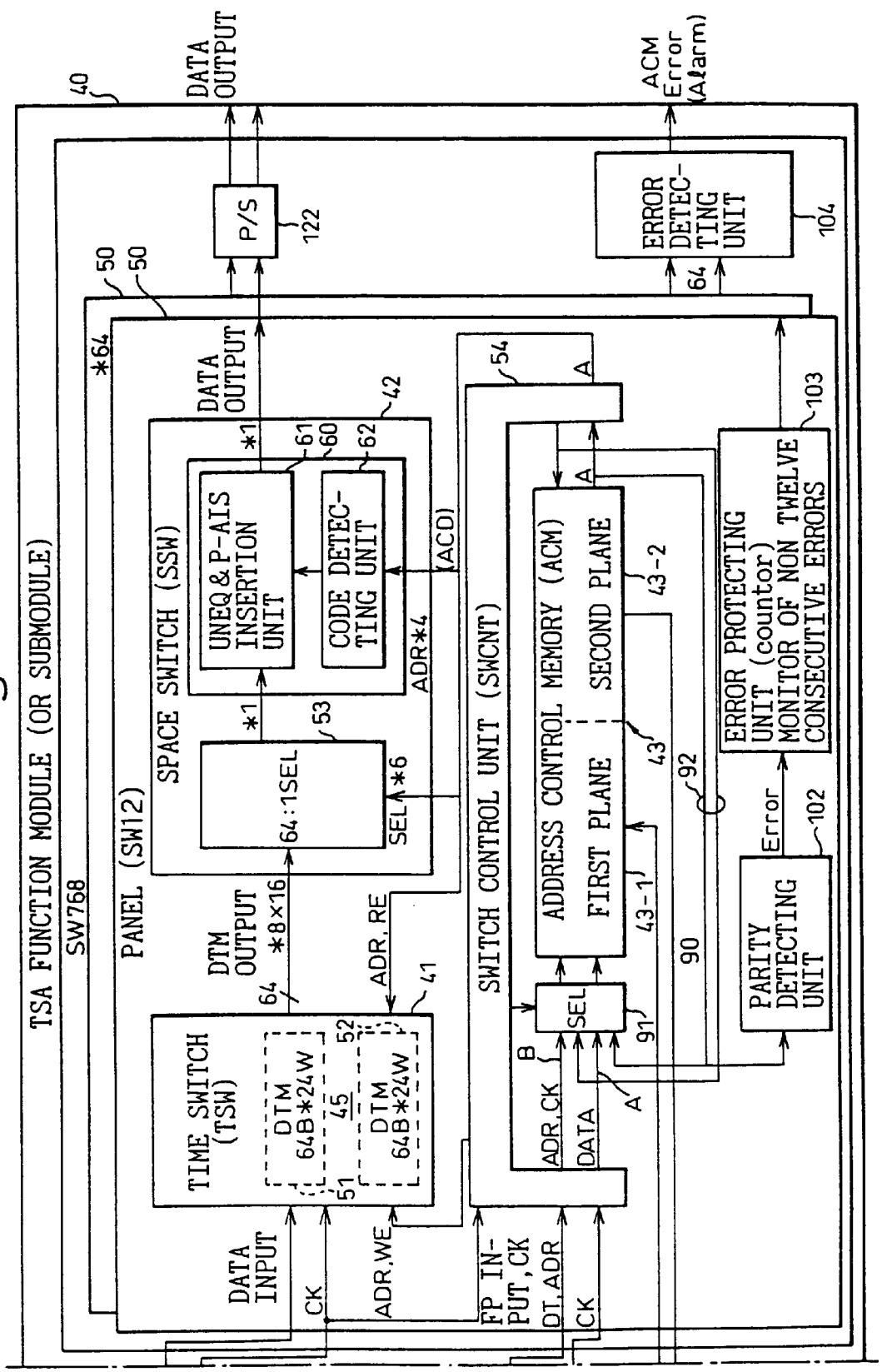
FIG. 29 is a second part of a view of a specific example of a TSA function module (or submodule)

FIGS. 28 and 29 are first and second parts of a view of a specific example of a TSA function module (or submodule).

Referring to FIGS. 28 and 29, the main signal data input (already explained incoming transmission data) shown at the top left of FIG. 28 is serially input to the time switch 41 in the TSA function module (or submodule) 40. When switching in the time domain, that is, interchange of channels, is performed at the time switch 41, the output of the time switch 41 is input to the space switch 42, where switching in the space domain, i.e., interchange of routes is performed. The result is sent out as the data output (already explained outgoing transmission data).

The control of the switching at the time switch 41 and space switch 42 is performed by a switch controller (SWCNT) 54 in accordance with the channel setting address A read out serially from the address control memory 43.

The already explained channel setting address A and the already explained access address B are given to the address control memory 43 through the switch controller 54 from the channel setting information converting unit (also referred the address control memory converter (ACMCNV)).

The above channel setting address A and access address B are produced by the channel setting information converting unit 44 based on the channel setting information C supplied from the outside.

The channel setting information C (FIG. 28) from the outside is for example given from a microcomputer interface (μ-COM INF) 57. The interface 57 is comprised of a receiving FIFO (R-FIFO: receiving first-in first-out) 58 for receiving and storing a channel setting code supplied from a microcomputer (not shown) and a sending FIFO (S-FIFO: sending FIFO) 59. The FIFO 59 checks the suitability of the channel setting code and returning the result of the check to the above microcomputer. The channel setting code stored in the receiving FIFO 58 (FIG. 28) is input, as the above channel setting information C, to the above channel setting information converting unit (ACMCNV) 44.

The channel setting information converting unit (ACMCNV) 44 is configured by a data converting unit (CNVDT) 55 and address converting unit (CNVADD) 56. The data converting unit 55 converts the above channel setting information C to the above channel setting address A (channel setting data ) (DTOUT in the figure), while the address converting unit 56 converts the above channel setting information C to the access address B of the control memory 43 (ACMGPEN, ADDOUT, ATMSEL).

The above channel setting address A and access address B are supplied through the switch controller (SWCNT) 54 to the address control memory 43, while the channel setting address A (channel setting data) is written at random in the address control memory 43 in accordance with the access address B.

Note that in FIG. 28, an example of conversion of the channel setting address A is shown as "ACM CODE→Time Slot/Space SW No.". "ACM CODE" indicates the channel setting information, while "Time Slot No." and "Space SW No." indicate the setting information for the time switch 41 and the setting information for the space switch 42 both shown in FIG. 29.

Referring again to FIG. 29, a total of 64 panels 50 the same as the panel 50 mounting the fore-mentioned time switch 41, space switch 42, address control memory 43, and switch controller 54 are provided (for this 64, see the "64" in FIG. 12). These 64 panels 50 all have identical configurations, so the explanation will be given with reference to the first panel 50 illustrated (same below). The panels 50 are indicated as SW12 since the output is 12 channels out of the incoming 192 channels.

First, looking at the time switch 41, the main part is the fore-mentioned transmission data memory 45 comprised preferably of a RAM. In the illustrated example, it is comprised of two data memories (DTM) 51 and 52. Each has a 64-bit (B)×24-word (W) configuration. The main signal data input (incoming transmission data) (Din) input to the time switch 41 is a 128-bit parallel signal. Since the above RAM normally has a maximum size of 64 bits, two data memories 51 and 52 (64×2=128) are provided. Further, the data memories (51 and 52) have a two-plane configuration (12W per plane). When the first plane is used for writing, the second plane is used for reading. Conversely, when the first plane is used for reading, the second plane is used for writing. Therefore, the total becomes 24 words (24W).

The operation of writing the incoming transmission data (Din) to the data memories 51 and 52 is performed by sequential write addresses (ADR, WE, where WE means "write enable") from the switch controller (SWCNT) 54. The read operation is performed by the read address (ADR, RE), that is, the channel setting address A.

Therefore, the 128-parallel bit output (data memory output) read from the data memories 51 and 52 are input to the next space switch 42. Here, only the necessary transmission data is selected from the 192 channels of signals by a selector (SEL) 53. The selector 53 is indicated as "64:1 SEL". What the selector (64:1 SEL) 53 should select is determined by a 6-bit selection signal SEL. This signal SEL is contained in the channel setting address A (Space SW No.).

In FIG. 29, an auxiliary signal generating means 60 is provided in the space switch 42. The auxiliary signal generating means 60 responds to an auxiliary signal insertion code ACD contained in the channel setting address A output from the address control memory 43 and inserts the auxiliary signal into the related channel among the plurality of channels.

An example of auxiliary signals, there are a first auxiliary signal normally called a UNEQ indicating that the channel is not in use and a second auxiliary signal normally called a P-AIS indicating that a fault has occurred in the channel.

In this case, the auxiliary signal generating means 60 is provided with a code detecting unit 62 for detecting the auxiliary signal insertion code ACD and an auxiliary signal insertion unit (UNEQ & P-AIS inserting unit) 61 for generating the first auxiliary signal (UNEQ) and the second auxiliary signal (P-AIS) and inserting it in the channel when the auxiliary signal insertion code ACD is detected.

Referring to FIG. 28, there is further provided an initialization mode generating unit 82 which inputs an initialization command (DTIN') for initializing the TSA circuit itself to the channel setting information converting unit 43 at the time of start up of the apparatus.

When the above initialization is required, the initialization mode generating unit 82 sends a switch signal to the selector (SEL) 81 shown in FIG. 28 to switch from the normal lines (DTIN to START) to the lines (DTIN', TSACLK', TSACLKEN', CELL', and START') at the time of initialization, so that the signal from the initialization mode generating unit 82 is input to the channel setting information converting unit 44.

When the TSA circuit slowly starts up at the time of startup of the apparatus as a whole, unnecessary data ends up being output from the TSA circuit before the end of the startup. This unnecessary data may obstruct the quick stabilization of the apparatus as a whole.

Therefore, the TSA circuit itself is initialized so as to achieve a quick start of the TSA circuit. This is done by the above initialization command (DTIN'). At this stage, no channel setting has been performed, so it is necessary to generate a suitable initialization mode in the TSA circuit, which mode does not contradict the condition to be satisfied when channels are not set yet. As preferable examples, the initialization command may be (i) a command for making the auxiliary signal (UNEQ) be output from the TSA circuit, which UNEQ indicating that a channel constituting the incoming transmission data is not in use or (ii) a command for making the auxiliary signal (DATA THROUGH) be output from the TSA circuit, which DATA THROUGH indicating that the incoming transmission data should be passed through the TSA circuit as it is.

The above initialization command is output from the initialization mode generating unit 82 after for example a power-on reset.

Therefore, at the time of initialization of the TSA circuit, it is possible to prevent indefinite channel settings due to the above unnecessary data and start service immediately after initialization.

In FIG. 29, the address control memory 43 has a two-plane configuration of a first memory plane 43-1 and a second memory plane 43-2. Here, the operation for writing the channel setting address A in the address control memory 43 and the operation for reading the written channel setting address A from the address control memory 43 are performed alternately at the first memory plane 43-1 and the second memory plane 43-2. That is, when the first memory plane 43-1 is operating as a read plane, the second memory plane 43-2 is operating as a write plane, while conversely when the first memory plane is operating as a write plane, the second memory plane is operating as a read plane.

If some sort of fault occurs at a stage before the address control memory 43, the fault will result in further mistaken data being overwritten during the operation of reading data (channel setting address A) from the address control memory 43 (here, a single-plane configuration is considered). This being the case, naturally a mistaken channel setting will be performed which will lead in turn to mistaken operation of the system.

Therefore, the address control memory 43 is used so as to completely isolate the data read plane from the data write plane so that a channel setting during service will not have a direct effect on the working lines even if such fault occurs.

In FIG. 29, when a channel setting address A finishes being written in one of the first memory plane 43-1 and second memory plane 43-2, a copy means 90 cooperating with the address control memory 43 copies the written channel setting address A in the other of the first memory plane 43-1 and second memory plane 43-2. Further, when a new channel setting address A is given, the above operation for writing the address in the other plane is performed only for the part changed with respect to the immediately preceding channel setting address A.

At the time of the next channel setting, that is, when a new channel setting address A is given, since the memory need to be rewritten only for the portion changed between the new and old channel setting addresses A, the channel setting time can be greatly shortened.

The copy means 90 is realized by a selector (SEL) 91 and a feedback loop 92. The feedback loop 92 acts to return the data (channel setting address A), finished being written in the memory plane (for example 43-1), to the selector 91.

The selector 91 writes the above returned data on the memory plane (for example 43-2) other than the memory plane finished being written in and finishes copying the same.

In FIG. 28, a setting information holding unit 95 is provided for storing the channel setting information C supplied from the outside such as the microcomputer interface 57 and for supplying the stored information to the channel setting information converting unit 44.

In FIGS. 28 and 29, provision is made of a parity generating unit 101 for adding a parity bit to the channel setting address A from the channel setting information converting unit 44 and a parity detecting unit 102 for reading, from the address control memory 43, the channel setting address A to which the parity bit has been added through the parity generating unit 101 and written in the address control memory 43, and for checking the parity of the same. By using this parity bit, it becomes possible to raise the quality of the data of the channel setting information (channel setting address A) and maintain a highly reliable channel setting.

Further, provision is made of an error protecting unit 103 and an error detecting unit 104 for effectively processing the results of the parity check.

In FIG. 28, provision is made of a channel setting information inverse converting unit 111 which operates inversely from the channel setting information converting unit 44 for monitoring if the channel setting information C given from an outside microcomputer (not shown) connected through the microcomputer interface 57 was converted correctly to the channel setting address A at the channel setting information converting unit 44 and correctly written in the address control memory 43. The inverse converting unit 111 feed backs the channel setting address A written in the address control memory 43 to the channel setting information inverse converting unit 111 and reproduces the original channel setting information C'. Further, it transfers this to the fore-mentioned microcomputer. The microcomputer confirms if the returned channel setting information C' matches with the sent original channel setting information C. The data inverse converting unit (CNVDT) 112 corresponds to the data converting unit (CNVDT) 55.

In FIG. 28, the main signal data input is first received by the S/P converting unit 121. This S/P converting unit 121 converts the 32 parallel input data (see "32" in FIG. 4) to 64 parallels for matching with the size of the address control memory 43.

In FIG. 29, a P/S converting unit 122 is placed at the final stage of the main signal data. This P/S converting unit 122 converts the main signal data (STS-12), output from the 64 groups of panels 50 each extracting any of the STS-12 data from the STS-768 data, to serial data.

Figure 30:
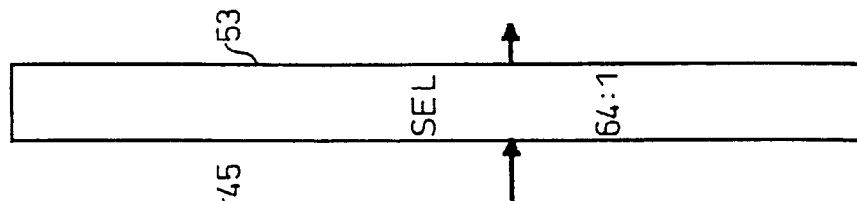
FIG. 30 is a first part of a schematic view of an address control memory, data memory, and selector in FIG. 29.
Figure 31:
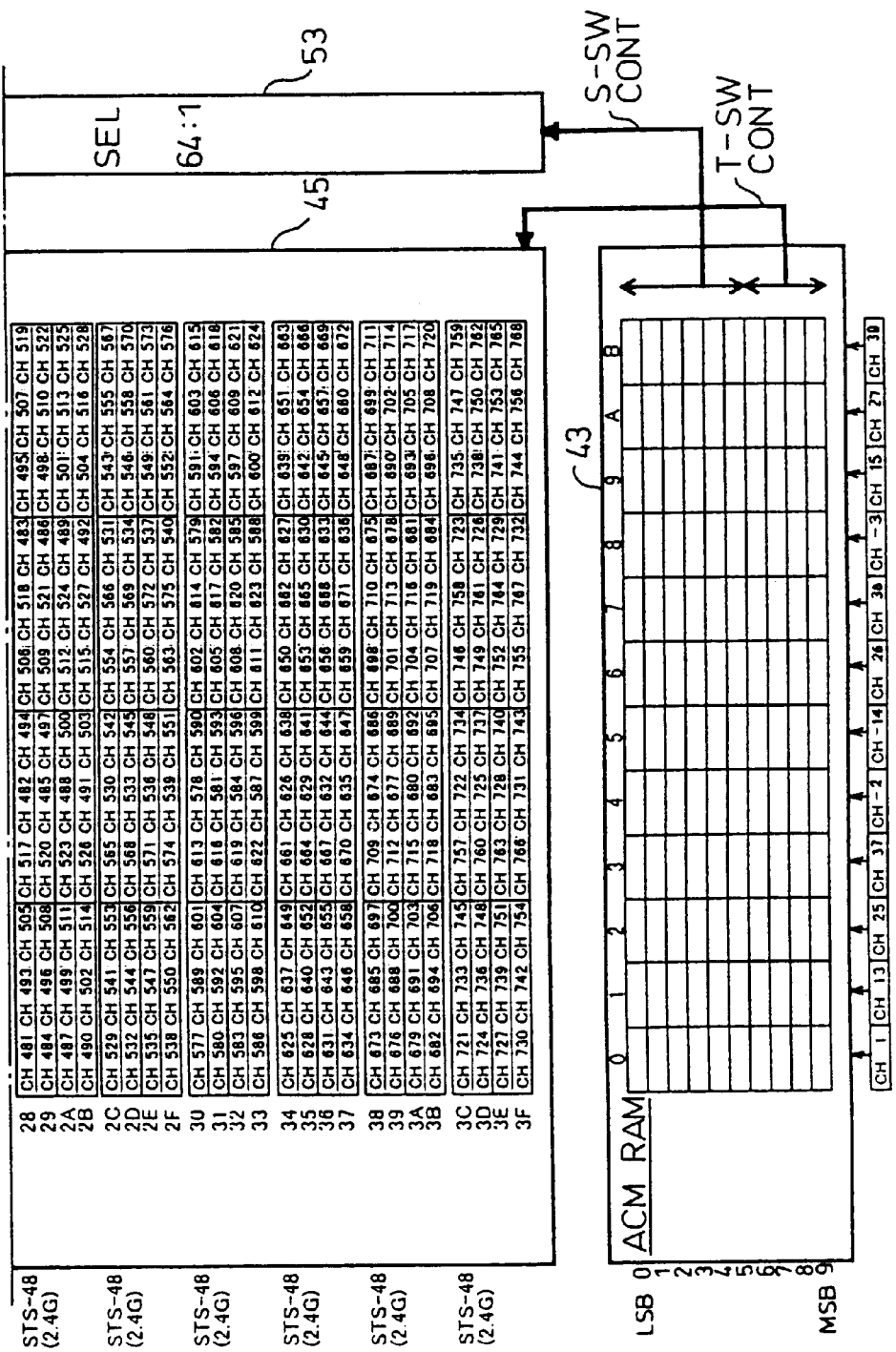
FIG. 31 is a second part of a schematic view of an address control memory, data memory, and selector in FIG. 29.

FIGS. 30 and 31 are first and second parts of a schematic view of the address control memory, data memory, and selector in FIG. 29.

FIGS. 32 to 35 are first to fourth parts of a view of a detailed example of the inside of the data memory in FIGS. 30 and 31.

Referring to FIG. 30, the transmission data is sequentially written in the data memories 51 and 52 and the transmission data written in the data memories is randomly read, and thereby the time switch is realized. The transmission data transferred through the time switch is applied to the selector (64:1) 53 to realize the space switch.

The time switch is controlled by the time-switch control (T-SW CONT) routine, while the space switch is controlled by the space-switch control (S-SW CONT) routine. The control is performed based on the channel setting address information A and channel setting information C written in the RAM forming the address control memory 43.

FIGS. 36 and 37 are first and second parts of a view of an example of the operation of the data converting unit shown in FIG. 28.

As explained with reference to FIG. 28, the data converting unit (CNVDT) 55 converts the channel setting information C, given from the outside, to the channel setting address A and sends the address A to the address control memory 43. The ATM cell setting code of FIG. 36 corresponds to the above channel setting information C (for example, the command for inserting the incoming transmission data of the CH12 into the CH39 to make the outgoing transmission data), the address control memory cell code in FIG. 37 corresponds to the above channel setting address A, the time switch control (T-SW CONT) information shown in FIG. 31 is given by the data memory time slot no. of FIG. 37, and the space switch control information shown in FIG. 31 is given by the space switch no. of FIG. 37.

Note that as shown in the lower parts of FIGS. 36 and 37, the UNEQ or P-AIS information is transferred as it is without conversion (THROUGH) to the address control memory (ACM) side.

FIGS. 38 to 45 are first to eighth parts of a view of an example of the operation of the address converting unit shown in FIG. 28.

As explained with reference to FIG. 28, the address converting unit (CNVAD) 56 converts the channel setting information C, given from the outside to the access address B of the address control memory 43. The write operation to the address control memory 43 is controlled by the access address B. In this address B, the "ACMGPEN" shown in FIG. 28 is shown as the "SELECT No." in FIGS. 38 to 45, while the "ADDOUT" shown in FIG. 28 is shown as the "Address" in FIGS. 38 to 45. The "SELECT No." indicates one of 64 panels 50 shown in FIG. 29.

The ATM cell setting of FIGS. 38 to 45 is represented by the channel number, contained in the channel setting information C, which designates the channel to insert therein the outgoing transmission data. Note that the information C is given by the format of the ATM cell. The series of information from the 0th cell to 31st cell (the cells [6] to [29] in the middle being omitted) is given cyclically.

Explaining the operation of the TSA module 15 shown in FIG. 4 in brief based on the above specific example, the main signal data is written sequentially in the TSW unit 41 (data memory 45 is two-plane configuration of write plane and read plane).

Data is read sequentially from the address control memory 43 in which the address control memory cell code shown in FIGS. 36 and 37 (data memory time slot number and space switch no.) is written. The time slots (lateral direction) in the STS-12 units are interchanged by the data memory 45, and the selection in the vertical direction among STS-12 (among 64 groups) is performed by the space switch 42. Sixty-four groups are used for realizing this for the STS-768. TSA is performed for each bit of the main signal data (CH) by this set of 64 groups.

Figure 46:
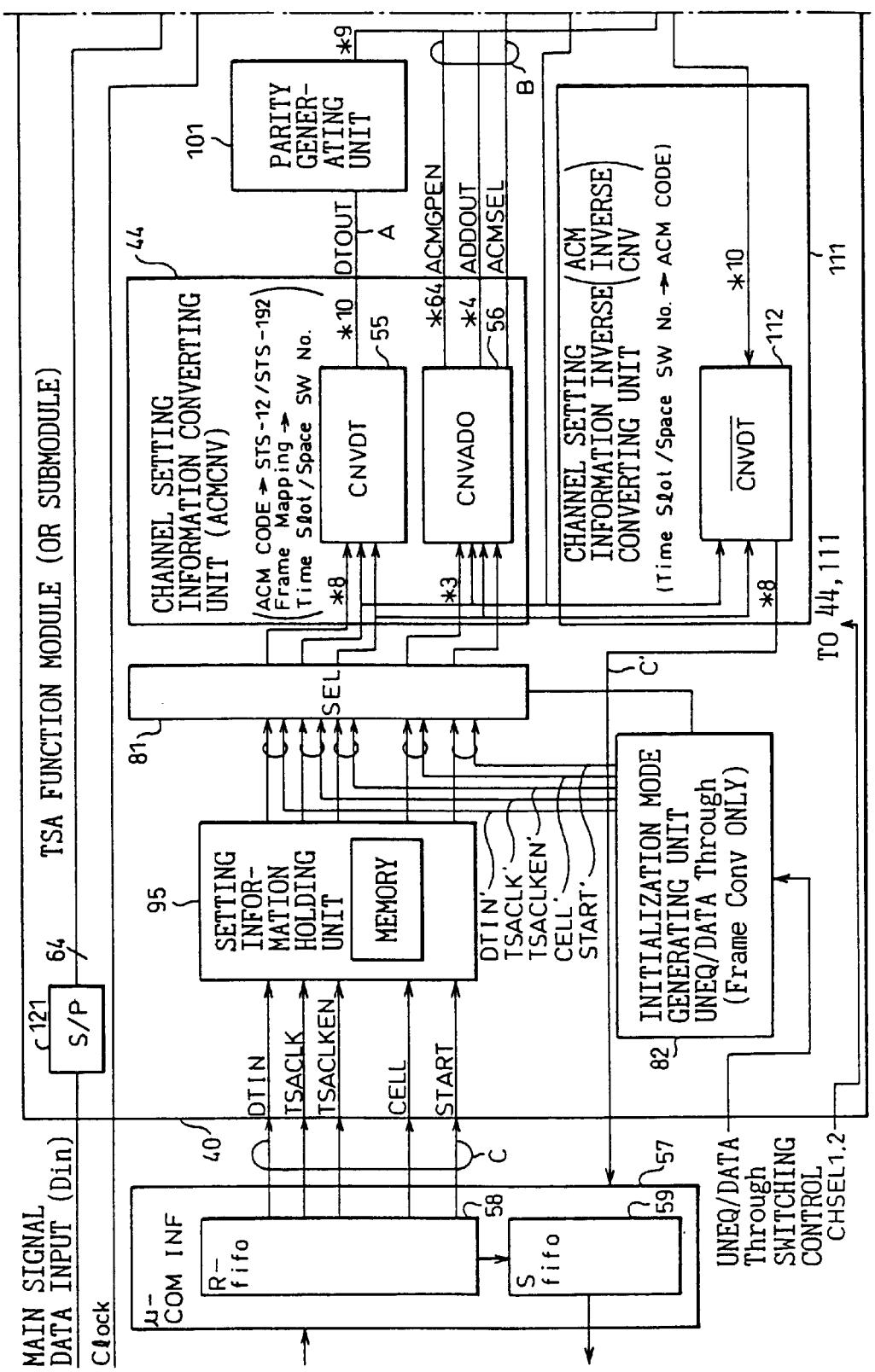
FIG. 46 is a first part of a view of a specific example of a TSA function module of the type shown in FIG. 22.
Figure 47:
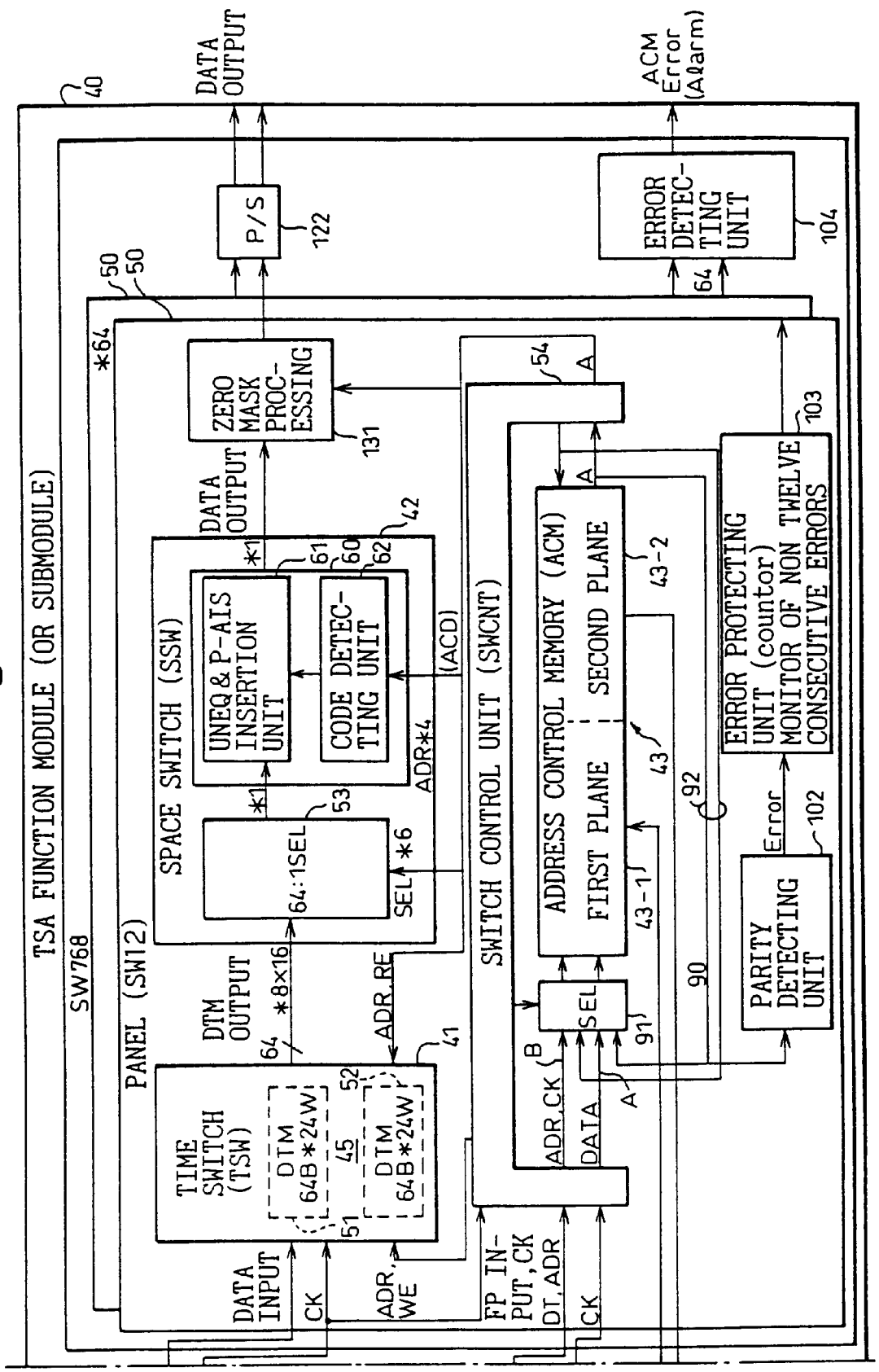
FIG. 47 is a second part of a view of a specific example of a TSA function module of the type shown in FIG. 22.

A look at the TSA function module 25 of the configuration of FIG. 12 and FIG. 22 shows the following:

FIGS. 46 and 47 are first and second parts of a view of a specific example of a TSA function module (26) of the type shown in FIG. 22.

The majority of these FIGS. 46 and 47 is the same as FIGS. 28 and 29. The difference between them is that, first, in FIG. 46, the channel selection signals CHSEL1 and 2 shown at the bottom left are added. The selection signals are 2-bit signals. The four LSI Nos. 1 to 4 shown in FIG. 22 are discriminated by these 2-bit signals. That is, 32 of the same LSIs (TSA768) are divided into four groups by the discrimination signal to give four groups×eight bits worth of classes and realize TSA1536.

Next, referring to FIG. 47, the zero mask processing unit 131 appears for the first time in this figure. The role of the zero mask processing unit 131 is as was already explained in FIG. 22.

Figure 48:
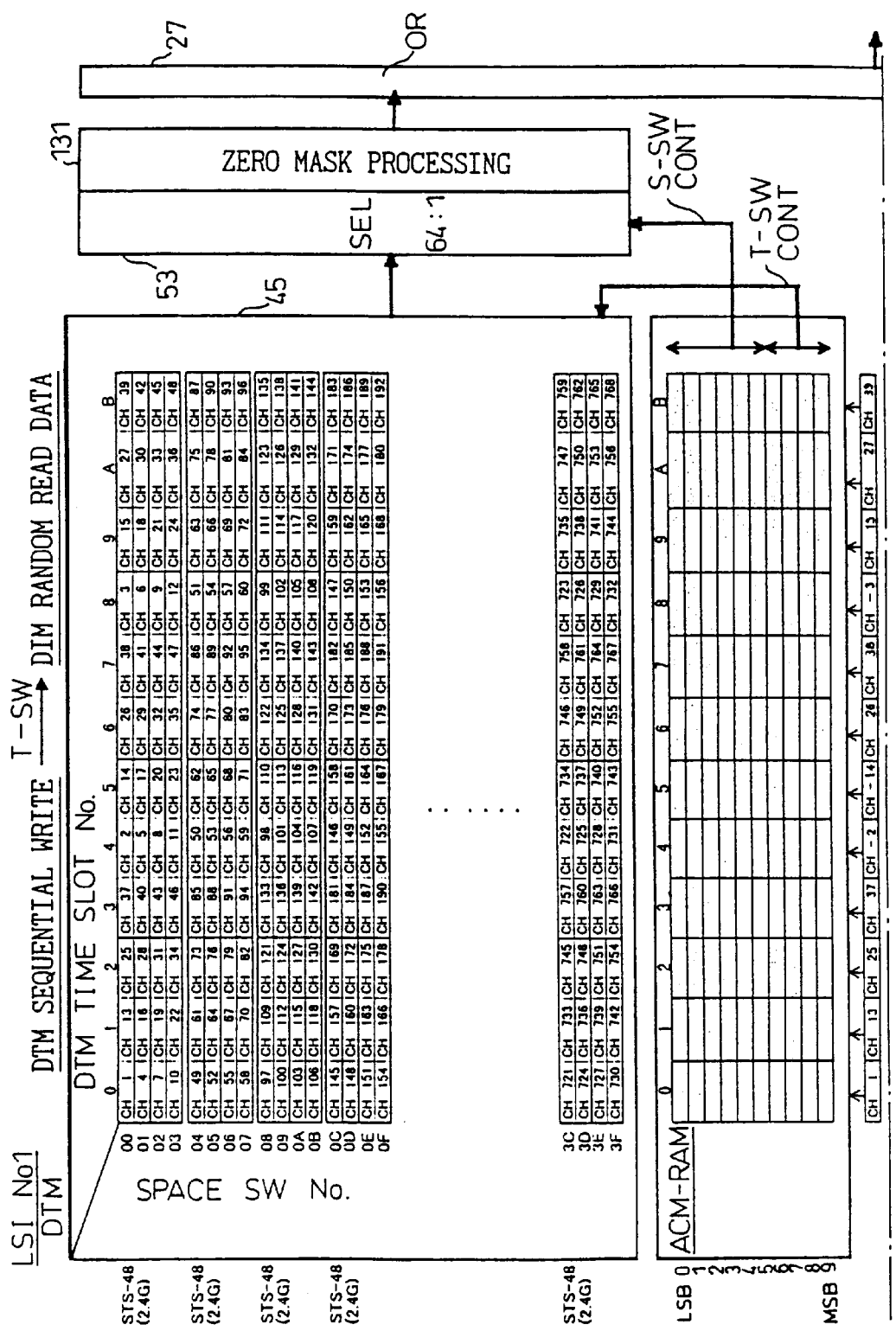
FIG. 48 is a first part of a schematic view of an address control memory, data memory, and selector in FIG. 47.
Figure 49:
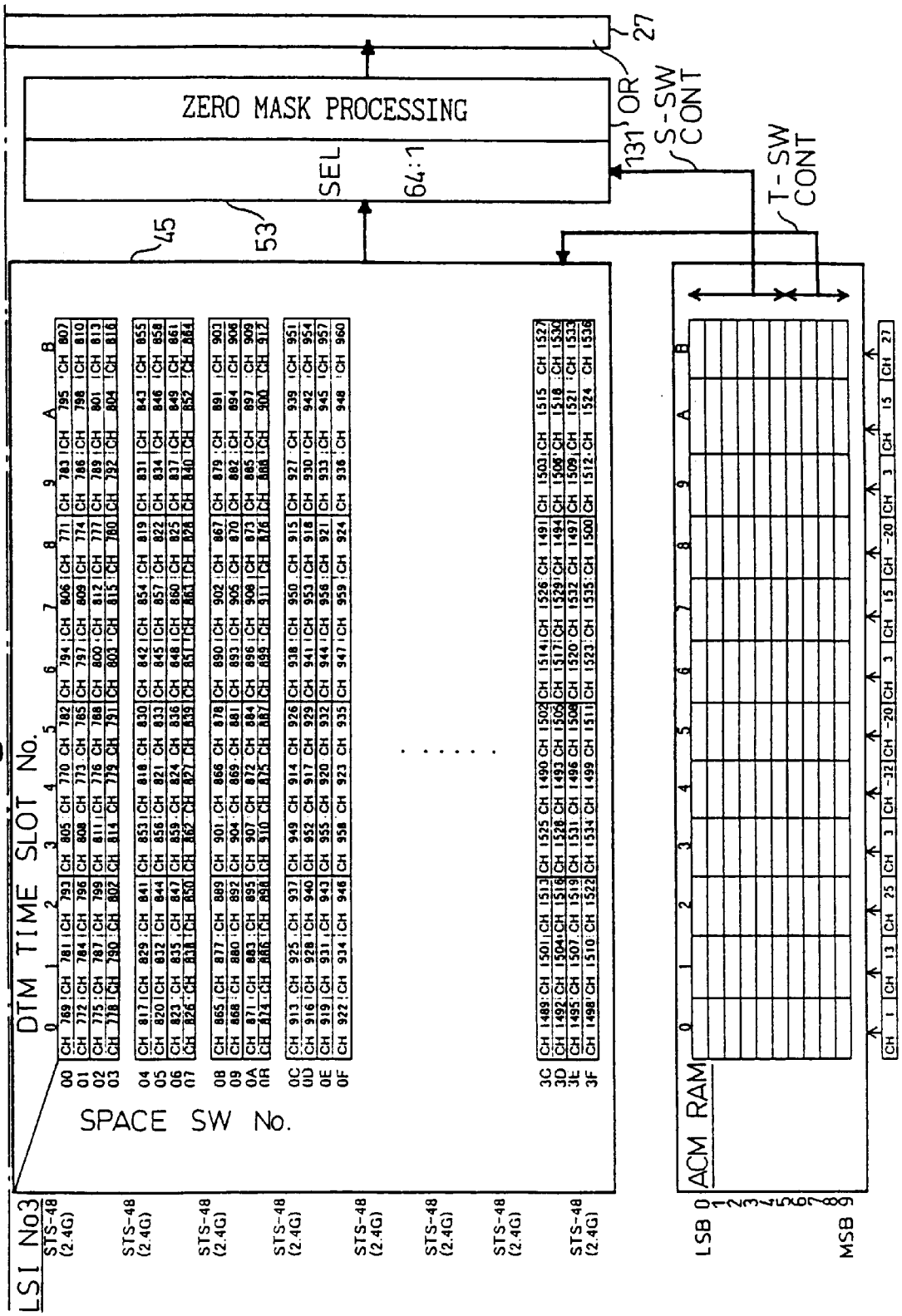
FIG. 49 is a second part of a schematic view of an address control memory, data memory, and selector in FIG. 47.

FIGS. 48 and 49 are first and second parts of a schematic view of an address control memory, data memory, and selector in FIG. 47; FIG. 50 is a view of a detailed example of the inside of the data memory in FIG. 48; and FIG. 51 is a view of a detailed example of the inside of the data memory in FIG. 49.

FIGS. 48 and 49 are basically the same as FIGS. 30 and 31. In FIGS. 48 and 49, however, the zero mask processing unit 131 is added. Further, the outputs of the zero mask processing units 131 of the two systems are output through an OR. Note that FIGS. 48 and 49 show the case of the LSI No. 1 and the LSI No. 3 of FIG. 22, but the same is true for the LSI No. 2 and the LSI No. 4.

FIGS. 52 to 54 are first to third parts of a view of an example of the operation of the data converting unit shown in FIG. 46.

FIGS. 52 to 54 are basically the same as the forementioned FIGS. 36 and 37, but in FIGS. 52 to 54, there is conversion to a zero mask code for the channels CH769 to CH1536 as to the LSI No. 1 and LSI No. 2, while there is conversion to a zero mask code for the channels CH1 to CH768 as to the LSI No. 3 and LSI No. 4.

FIGS. 55 to 62 are first to eighth parts of a view of an example of the operation of the address converting unit shown in FIG. 46.

FIGS. 55 to 62 are basically the same as the forementioned FIGS. 38 to 45. FIGS. 55 to 58, however, correspond to the case where the LSI No. 1 and LSI No. 3 are valid (however, description relating to cell [2] to cell [29] is omitted), while FIGS. 59 to 62 correspond to the case where the LSI No. 2 and LSI No. 4 are valid (however, description relating to cell [34] to cell [61] is omitted).

Explaining the operation of the TSA function module 25 shown in FIG. 22 based on the above specific example, the main signal data is sequentially written into the TSW unit 41 (data memory 45 has two-plane configuration of write plane and read plane). Data is read sequentially from the address control memory 43 in which the address control memory cell code (data memory time slot no. and space switch no.) shown in FIGS. 52 to 54 is written. The time slots (lateral direction) in the STS-12 units are interchanged by the data memory 45, and the selection in the vertical direction among STS-12's (64 groups) is performed by the space switch 42. Sixty-four groups are used for realizing the above for STS-1536. TSA for each bit of the main signal data (CH) is performed by four of these sets of 64 groups. At this time, the four sets performing the TSA for each bit operate differently according to the control signal. <1> performs 1–768 CH→1–768 CH TSA, <2> performs 1–768 CH→769–1536 CH TSA, <3> performs 769–1536 CH→1–768 CH TSA, and <4> performs 769–1536 CH→769–1536 CH TSA. <1> and <3> operate complementarily (one of the two settings is always valid and the invalid setting side performs zero mask processing). By obtaining the OR of the output data, TSA1536*768 processing (1–1536 CH→1–768 CH) is performed. In the same way, <2> and <4> operate complementarily. By obtaining the OR of the output data, TSA1536*768 processing (1–1536 CH→769–1536 CH) is performed. By bundling (combining) these physically, TSA1536*1536 processing is performed in bit units.

Figure 63:
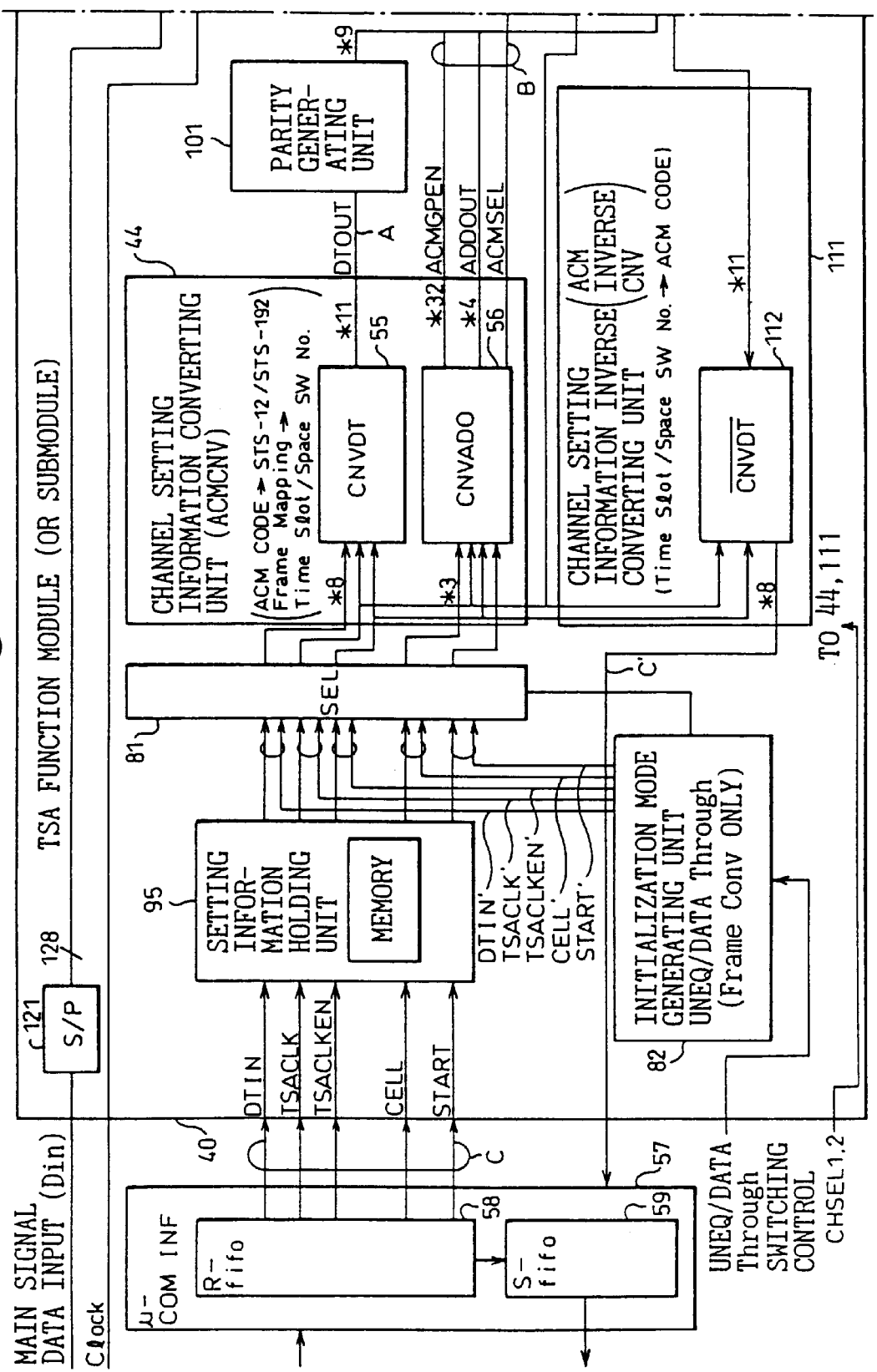
FIG. 63 is a first part of a specific example of a TSA function module (36) of the type shown in FIG. 26.

Finally, a look at the TSA function module 35 of the configuration of FIG. 24 and FIG. 26 shows the following:

FIGS. 63 and 64 are first and second parts of a view of a specific example of a TSA function module (36) of the type shown in FIG. 26.

The majority of these FIGS. 63 and 64 is the same as FIGS. 28 and 29. In the case of FIGS. 63 and 64, however, the fore-mentioned selection signals CHSE1 and 2 are added, there are 128 outputs of the S/P converting unit 121 at the top left of FIG. 63, and the selector of FIG. 64 is a 128:1 selector. In addition, the number of the bit lines is changed as illustrated.

Figure 66:
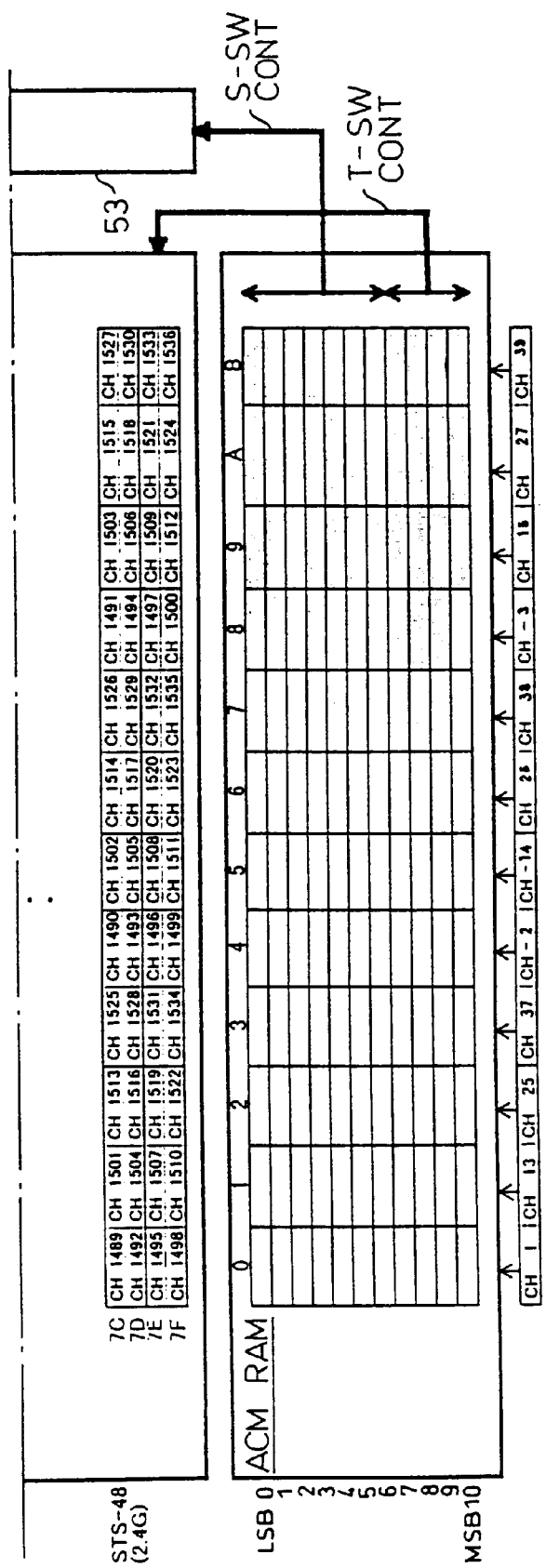
FIG. 66 is a second part of a schematic view of an address control memory, data memory, and selector in FIG. 64.

FIGS. 65 and 66 are first and second parts of a schematic view of the address control memory, data memory, and selector in FIG. 64.

FIG. 67 is a view of a detailed example of the inside of the data memory in FIGS. 65 and 66.

FIGS. 65 to 67 are basically the same as the above explained FIGS. 30 and 31.

FIGS. 68 and 69 are first and second parts of a view of an example of the operation of the data converting unit shown in FIG. 63. FIGS. 68 and 69 are basically the same as the above-explained FIGS. 36 and 37.

FIGS. 70 to 77 are first to eighth parts of a view of an example of the operation of the address converting unit shown in FIG. 63.

FIGS. 70 to 77 are basically the same as the forementioned FIGS. 38 to 45. FIGS. 70 and 71, however, correspond to the case of the LSI No. 1 (36-1) of FIG. 26 being valid (however, cell [1] to cell [14] are omitted), FIGS. 72 and 73 correspond to the case of the LSI No. 2 (36-2) of FIG. 26 being valid (however, cell [16] to cell [31] are omitted), FIGS. 74 and 75 correspond to the case of the LSI No. 3 (36-3) of FIG. 26 being valid (however, cell [32] to cell [47] are omitted), and FIGS. 76 and 77 correspond to the case of the LSI No. 4 (36-4) of FIG. 26 being valid (however, cell [48] to cell [63] are omitted).

Explaining the operation of the TSA function module 35 shown in FIG. 26 based on the above specific example, the main signal data is sequentially written into the time switch 41 (data memory 45 has two-plane configuration of write plane and read plane). Data is read sequentially from the address control memory 43 in which the address control memory cell code (data memory time slot no. and space switch no.) shown in FIGS. 68 and 69 is written. The time slots (lateral direction) in the STS-12 units are interchanged by the data memory 45, and the selection in the vertical direction among STS-12's (128 groups) is performed by the space switch 42. One hundred twenty-eight groups are used for realizing the above for the STS-1536. TSA for each bit of the main signal data (CH) is performed by four of these sets of 128 groups. At this time, the four sets performing the TSA for each bit operate differently according to the control signal. <1> performs 1–1536 CH→1–384 CH TSA, <2> performs 1–1536 CH→385–768 CH TSA, <3> performs 1–1536 CH→769–1152 CH TSA, and <4> performs 1–1536 CH→1153–1536 CH TSA. By bundling (combining) these outputs physically, TSA1536*1536 processing is performed in bit units. Therefore, there are eight of these configurations per channel.

Summarizing the advantageous effects of the invention, as explained above, according to the present invention, it is possible to realize TSA processing on high speed and large volume transmission data such as 40 Gbps, 80 Gbps etc. by a simple architecture without increasing the size of the circuit and by a combination of LSIs having the same configuration. Therefore, it is also possible to reduce the power consumption of the circuit.

What is claimed is:

1. A time slot assignment circuit comprising:

an input port which receives as input upper side incoming transmission data from a first ring network side of first data transmission rate and lower side incoming transmission data from a second ring network side of second data transmission rate, wherein the first data transmission rate is greater than the second data transmission rate;

an output port from which the upper side outgoing transmission data is output to the first ring network side and the lower side outgoing transmission data is output to the second ring network side; and a time slot assignment function block which has a time switch and a space switch and supplies said upper side and lower side outgoing transmission data, obtained by interchanging channels for said upper side and lower side incoming transmission data from said input port to said output port, wherein said interchanging is performed by processing, in bit units, on N bits forming each of said channels, from the most significant bit to the least significant bit, for the respective bits individually, wherein said input port receives an input said upper side incoming transmission data and said lower side incoming transmission data as a predetermined number of multiplex level data groups each including a plurality of channels of the same multiplex level-formatted N-bit configuration, where N is a positive whole number;

said upper side outgoing transmission data and said lower side outgoing transmission data are output from said output port as the above predetermined number of multiplex level data groups each comprised of a plurality of channels of the same multiplex level-formatted N-bit configuration; and said time slot assignment function block is comprised of N time slot assignment function modules having the same configuration as each other and the N number of time slot assignment function modules are alloted so as to perform processing, in bit units, on the N bits forming each channel of the multiplex level data group, from the most significant bit to the least significant bit.

2. A time slot assignment circuit as set forth in claim 1, wherein:

said input port receives as input said upper side incoming transmission data and said lower side incoming transmission data as a predetermined number of multiplex level data groups each comprised of a plurality of channels of the same multiplex level-formatted N- (N is a positive whole number) bit configuration;

said upper side outgoing transmission data and said lower side outgoing transmission data are output from said output port as the above predetermined number of multiplex level data groups each comprised of a plurality of channels of the same multiplex level-formatted N-bit configuration; and said time slot assignment function block is comprised of N number of time slot assignment function modules having the same configuration as each other and the N number of time slot assignment function modules are alloted so as to perform processing, in bit units, on the N bits, forming each channel of the multiplex level data group, from the most significant bit to the least significant bit.

3. A time slot assignment circuit as set forth in claim 1, wherein said time slot assignment function block is comprised of a working side time slot assignment function block for processing only the working side upper side incoming transmission data and lower side incoming transmission data and the working side upper side outgoing transmission data and lower side outgoing transmission data and a protection side time slot assignment function block for processing only the protection side upper side incoming transmission data and lower side incoming transmission data and the protection side upper side outgoing transmission data and lower side outgoing transmission data.

4. A time slot assignment circuit as set forth in claim 1, wherein said time slot assignment function block is a working side/protection side time slot assignment function block which processes the upper side incoming transmission data and the lower side incoming transmission data of both the working side and the protection side all together and outputs the upper side outgoing transmission data and lower side outgoing transmission data of both the working side and protection side all together.

5. A time slot assignment circuit as set forth in claim 4, wherein:

the input port receives as input the upper side incoming transmission data and the lower side incoming transmission data of both the working side and the protection side as a predetermined number of multiplex level data groups each comprised of a plurality of channels of the same multiplex level-formatted N- (N is a positive whole number) bit configuration;

the upper side outgoing transmission data and the lower side outgoing transmission data of both the working side and protection side are output from the output port as the above predetermined number of multiplex level data groups each comprised of a plurality of channels of the same multiplex level-formatted N-bit configuration; and the time slot assignment function block is comprised of N number of time slot assignment function modules having the same configuration as each other and the N number of time slot assignment function modules are allotted so as to perform processing, in bit units, on the N number of bits, forming each channel of the multiplex level data group, from the most significant bit to the least significant bit.

6. A time slot assignment circuit as set forth in claim 5, wherein:

each of the above-mentioned N number of time slot assignment function modules is comprised of first and second time slot assignment function submodules and third and fourth time slot assignment function submodules having the same configuration as the time slot assignment function module;

said first and second time slot assignment function submodules commonly receive as input the former half channel group corresponding to the former half of the channels forming the upper side incoming transmission data and lower side incoming transmission data of both the working side and protection side;

said third and fourth time slot assignment function submodules commonly receive as input the latter half channel group corresponding to the latter half of the channels forming the upper side incoming transmission data and lower side incoming transmission data of both the working side and protection side;

said second time slot assignment function submodule performs processing for interchanging channels of any of the former half channel group with channels of any of the latter half channel group; and said third time slot assignment function submodule performs processing for interchanging channels of any of the latter half channel group with channels of any of the former half channel group.

7. A time slot assignment circuit as set forth in claim 6, wherein:

said first and second time slot assignment function submodules are provided with a first zero mask processing unit which invalidates the data of the former half channel group when there are any channels of the former half channel group, in the first and second time slot assignment function submodules and, to be interchanged with channels from the third and fourth time slot assignment function submodule side, said third and fourth time slot assignment function submodules are provided with a second zero mask processing unit which invalidates the data of the latter half channel group when there are any channels of the latter half channel group, in the third and fourth time slot assignment function submodules, to be interchanged with channels from the first and second time slot assignment function submodule side.

8. A time slot assignment circuit as set forth in claim 7, wherein further provision is made of a first combining unit which combines the outputs of the first and third time slot assignment submodules and a second combining unit which combines the outputs of the second and fourth time slot assignment submodules.

9. A time slot assignment circuit as set forth in claim 5, wherein:

each of the N number of time slot assignment function modules is comprised of M number of time slot assignment function submodules of the same configuration as this time slot assignment function module and the M number of time slot assignment function submodules commonly receive as inputs all of the channels forming the upper side incoming transmission data and lower side incoming transmission data of both the working side and protection side, while the data of first divided channels to M-th divided channels obtained by dividing the channels equally by M are processed by respective submodules.

10. A time slot assignment circuit as set forth in claim 9, further provided with a combining unit for combining the outputs from the M number of time slot assignment function submodules.

11. A time slot assignment circuit as set forth in claim 1, further comprised of a time switch which is provided with a transmission data memory for writing the incoming transmission data sequentially and performs switching in the time domain on the incoming transmission data;

a space switch which performs switching in the space domain on the output from the time switch;

an address control memory which outputs a channel setting address for controlling the time switch and space switch; and a channel setting information converting unit which converts channel setting information supplied from the outside to the channel setting address and access address of the address control memory.

12. A time slot assignment circuit as set forth in claim 11, wherein the transmission data memory is comprised of a random access memory and the incoming transmission data is written into the random access memory and is read out from the random access memory based on the channel setting address.

13. A time slot assignment circuit as set forth in claim 11, wherein the transmission data is output from the time switch and the space switch selects one channel from that output in accordance with the channel setting address.

14. A time slot assignment circuit as set forth in claim 11, wherein:

the address control memory is comprised of a random access memory and a channel setting address from the channel setting information converting unit, for writing the incoming transmission data in the transmission data memory and reading the same from the transmission data memory and for selecting one channel from the output from the time switch at the space switch, is written at random into the address control memory by using the access address of the address control memory supplied from the channel setting information converting unit and is read out serially to both the time switch and space switch.

* * * * *